US012657434B2

(12) United States Patent
Zeighami et al.

(10) Patent No.:  US 12,657,434 B2
(45) Date of Patent:     Jun. 16, 2026

(54) SYSTEMS AND METHODS FOR A NEURAL NETWORK DATABASE FRAMEWORK FOR ANSWERING DATABASE QUERY TYPES

(71) Applicant: University of Southern California, Los Angeles, CA (US)

(72) Inventors: Sepanta Zeighami, Los Angeles, CA (US); Cyrus Shahabi, Los Angeles, CA (US)

(73) Assignee: UNIVERSITY OF SOUTHERN CALIFORNIA, Los Angeles, CA (US)

( * ) Notice: Subject to any disclaimer, the term of this patent is extended or adjusted under 35 U.S.C. 154(b) by 536 days.

(21) Appl. No.: 18/218,958

(22) Filed: Jul. 6, 2023

(65) Prior Publication Data

US 2024/0020515 A1      Jan. 18, 2024

Related U.S. Application Data

(60) Provisional application No. 63/358,608, filed on Jul. 6, 2022.

(51) Int. Cl.
*G06N 3/045*         (2023.01)
*G06N 3/042*         (2023.01)
*G06N 3/08*          (2023.01)

(52) U.S. Cl.
CPC ............. *G06N 3/045* (2023.01); *G06N 3/042* (2023.01); *G06N 3/08* (2013.01)

(58) Field of Classification Search
CPC .......... G06N 3/084; G06N 3/047; G06N 3/08; G06N 3/045; G06N 3/0455; G06N 5/01; G06N 3/042; G06N 3/0985; G06N 3/09; G06N 20/00
See application file for complete search history.

(56) References Cited

U.S. PATENT DOCUMENTS

| | | | | |
|---|---|---|---|---|
| 2019/0303475 A1* | 10/2019 | Jindal | ............... | G06F 16/24534 |
| 2020/0320428 A1* | 10/2020 | Chaloulos | .............. | G06N 20/00 |
| 2021/0397975 A1* | 12/2021 | Al-Omari | .............. | G06N 3/126 |
| 2022/0366133 A1* | 11/2022 | Potash | .................. | G06F 16/355 |
| 2024/0169213 A1* | 5/2024 | Letunovskiy | .......... | G06N 3/045 |

* cited by examiner

*Primary Examiner* — Mohammad A Siddiqi
(74) *Attorney, Agent, or Firm* — Nixon Peabody LLP

(57)          ABSTRACT

A neural network database is disclosed. A learning task to teach a single model to answer any query is formulated. The example neural network database learns existing patterns between query input and output and by exploits the query and data distributions through a decision tree having multiple neural network leaf nodes representing partitions of the queries from the database. The neural network architecture is used to answer different query types efficiently. A generic neural network database framework can learn to answer different query types such as distance to nearest neighbor queries and range aggregate queries. The example neural database answers these two query types with orders of magnitude improvement in query time over the state-of-the-art competitions, and by constructing a model that takes only a fraction of data size.

14 Claims, 33 Drawing Sheets

400

| Dataset | No. records | Dim. |
|---------|-------------|------|
| GloVe | 1,191,887 | 25, 50 100, 200 |
| GIST | 1,000,000 | 960 |
| KDD | 4,898,431 | 36 |
| IPUMS | 70,187 | 60 |

700

714

710

712

720

732

734

730

800

| Dataset | No. records |
|---------|-------------|
| N, GMM2 GMM4, U | 100,000 |
| PM2.5 | 41,757 |
| TPC1 | 2,653,123 |
| TPC10 | 26,532,166 |

Figures 15A, 15B:
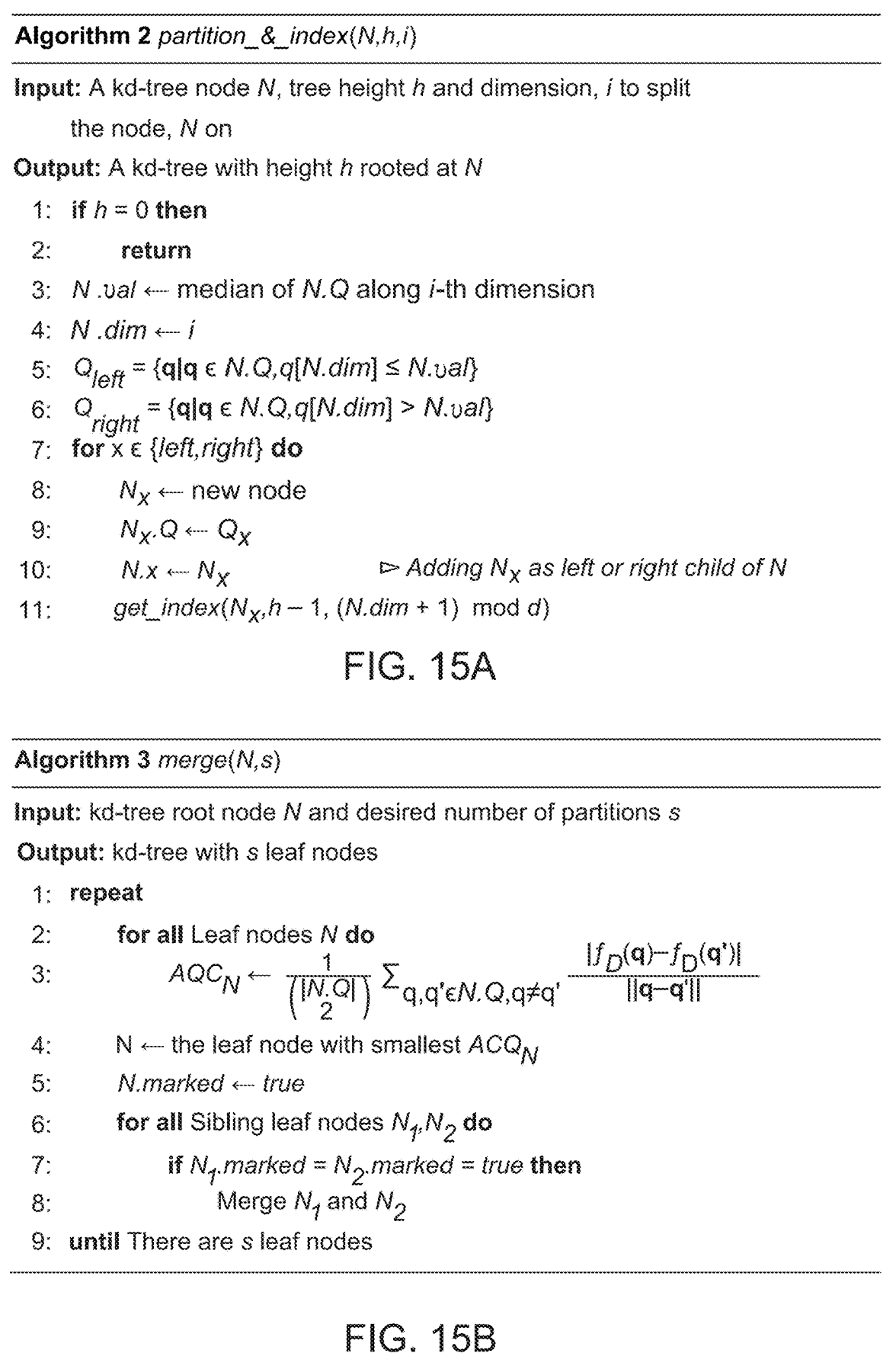

Algorithm 2 *partition_&_index(N,h,i)*

---

Input: A kd-tree node $N$, tree height $h$ and dimension, $i$ to split
      the node, $N$ on

Output: A kd-tree with height $h$ rooted at $N$

1:  if $h = 0$ then

2:      return

3:  $N.val \leftarrow$ median of $N.Q$ along $i$-th dimension

4:  $N.dim \leftarrow i$

5:  $Q_{left} = \{q | q \in N.Q, q[N.dim] \leq N.val\}$

6:  $Q_{right} = \{q | q \in N.Q, q[N.dim] > N.val\}$

7:  for $x \in \{left, right\}$ do

8:      $N_x \leftarrow$ new node

9:      $N_x.Q \leftarrow Q_x$

10:     $N.x \leftarrow N_x$        ▷ *Adding $N_x$ as left or right child of N*

11:     *get_index*$(N_x, h - 1, (N.dim + 1) \mod d)$

Algorithm 3 *merge(N,s)*

---

Input: kd-tree root node $N$ and desired number of partitions $s$

Output: kd-tree with $s$ leaf nodes

1:  repeat

2:      for all Leaf nodes $N$ do

3:      $AQC_N \leftarrow \dfrac{1}{\binom{|N.Q|}{2}} \sum_{q,q' \in N.Q, q \neq q'} \dfrac{|f_D(q) - f_D(q')|}{\|q - q'\|}$ 4:      $N \leftarrow$ the leaf node with smallest $ACQ_N$ 5:      $N.marked \leftarrow true$ 6:      for all Sibling leaf nodes $N_1, N_2$ do

7:        if $N_1.marked = N_2.marked = true$ then

8:          Merge $N_1$ and $N_2$

9:  until There are $s$ leaf nodes

Figures 15C, 15D:
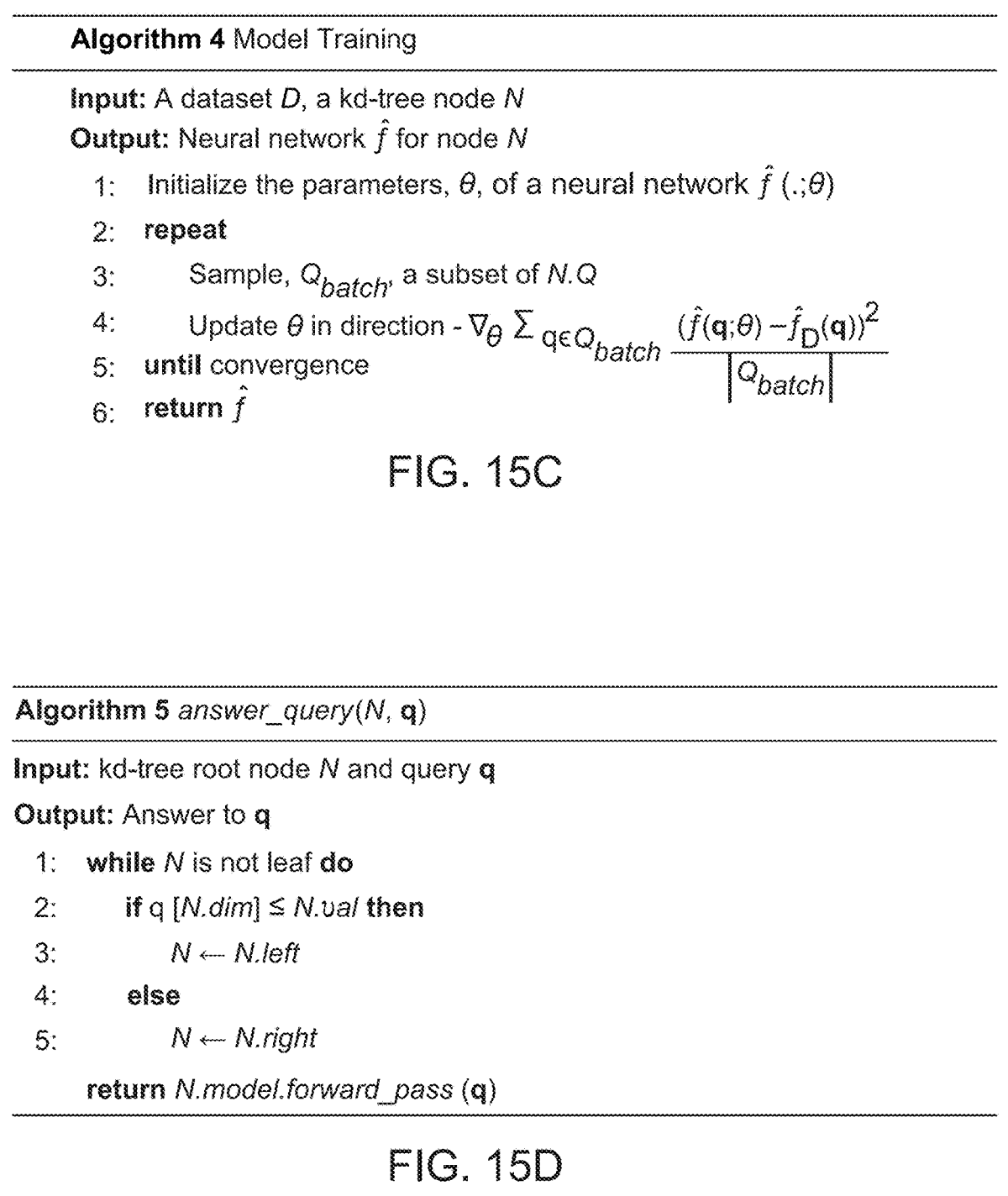

Algorithm 4 Model Training

---

Input: A dataset $D$, a kd-tree node $N$

Output: Neural network $\hat{f}$ for node $N$

1:    Initialize the parameters, $\theta$, of a neural network $\hat{f}(.;\theta)$ 2:   repeat

3:      Sample, $Q_{batch}$, a subset of $N.Q$

4:      Update $\theta$ in direction $-\nabla_\theta \sum_{q \in Q_{batch}} \dfrac{(\hat{f}(q;\theta) - \hat{f}_D(q))^2}{|Q_{batch}|}$ 5:   until convergence 6:   return $\hat{f}$

Algorithm 5 *answer_query($N$, q)*

---

Input: kd-tree root node $N$ and query q

Output: Answer to q

1:   while $N$ is not leaf do

2:      if q $[N.dim] \leq N.val$ then

3:        $N \leftarrow N.left$

4:      else

5:        $N \leftarrow N.right$ return $N.model.forward\_pass$ (q)

| Dataset | G5, G10, G20 | PM | TPC1, TPC10 | VS |
|---|---|---|---|---|
| # Points | $10^5$ | $4.17 \times 10^4$ | $2.65 \times 10^6, 2.65 \times 10^7$ | $10^5$ |
| Dim | 5, 10, 20 | 4 | 13 | 3 |

1800

1820

2300

Impact of Training Si:

2310
2320

2314
2324
2312
2322

No. Samples

2330

Test to Train Distance

2340

2342

2344

No. Samples

2400

2410

| Dataset | Normalized AQC STD | % Improved (Merging) | % Improved (No Merging) |
|---------|--------------------|-----------------------|--------------------------|
| VS | 1.02 | 47.6 | 44.1 |
| PM | 0.30 | 22.8 | 18.6 |
| TPC1 | 0.17 | 23.5 | 6.7 |
| G5 | 0.41 | 12.0 | 13.2 |
| G10 | 0.10 | 6.8 | 6.8 |
| G20 | 0.07 | 14.6 | 14.6 |
| Correlation with STD | | 0.87 | 0.94 |

2600

2620

2700

2710

2720

2800

2820

2840

1

SYSTEMS AND METHODS FOR A NEURAL NETWORK DATABASE FRAMEWORK FOR ANSWERING DATABASE QUERY TYPES

PRIORITY CLAIM

This disclosure claims the benefit of and priority to U.S. Provisional Application 63/358,608, filed on Jul. 6, 2022. The contents of that application are incorporated by reference in their entirety.

TECHNICAL FIELD

This disclosure relates generally to methods and systems of allowing rapid database queries. More specifically, a neural network database that uses multiple neural networks trained from partitions of queries of a database to respond to a type of query is disclosed.

BACKGROUND

Answering database queries fast, with low storage cost and high accuracy are important performance goals in a database system. An example trade-off for improving query time includes increasing space consumption for the database, thus increasing storage expense. Two common query types include nearest neighbor query and a range aggregate query.

An algorithm that performs operations on the points in the database is referred to as a combinatorial algorithm. Combinatorial solutions for improving query times have been studied extensively in the past decades for various query types such as nearest neighbor queries and range aggregate queries. Such combinatorial solutions perform well under many scenarios. However, specifically for nearest neighbor queries and range aggregate queries, two issues arise when using combinatorial solutions. First, curse of dimensionality, results in performance degradation for high dimensional data. This issue affects both nearest neighbor queries and range aggregate queries partly due to inefficiency of indexing methods in high dimensions. In fact, neural network based dimensionality reduction methods are often used to avoid such problem. However, designing a neural network architecture that can be easily trained, can answer the queries fast and accurately, and can scale with dimensionality and data size is not straightforward.

A second issue is that unnecessary calculations are often performed by combinatorial methods to obtain an answer. For instance, while only the distance to k-th nearest neighbor for distance-based outlier detection is needed, existing combinatorial methods find all the k nearest neighbors. Most existing methods cannot exploit distribution of data and query points. Further, although these issues exist specifically for nearest neighbor and range aggregate queries, similar issues exist for other query types as well. Finally, combinatorial solutions lack generality, and therefore, an algorithm for the nearest neighbor query is not applicable to range aggregate queries.

Current query algorithms can be classified into three groups: algorithms for the nearest neighbor, algorithms for range aggregate queries, and machine learning methods for database queries and combinatorial optimization. For example, nearest neighbor queries have been studied for decades in the computer science literature and is a key building block for various applications in machine learning and data analysis. For various applications, such as similarity search on images, it is important to be able to perform the query fast, a problem that becomes hard to address in high-dimensional spaces. As a result, more recent research has focused on approximate nearest neighbor query. Generally speaking, all the known methods iterate through a set of candidate approximate nearest neighbors and prune the candidate set to find the final nearest neighbors. The known algorithms for nearest neighbor queries can be categorized into locality-sensitive hashing (LSH), product quantization, tree-based methods, and graph-based searching. LSH-based and quantization-based methods map the query point to multiple buckets which are expected to contain similar points. Finding a small candidate set is difficult, and as dimensionality increases more candidate points need to be checked. Moreover, the size of the candidate set increases with k, for all the algorithms. That is, more points need to be searched when k increases.

Approximate query processing (AQP) has many applications in data analytics, with queries that contain an aggregation function and a selection predicate, to report statistics from the data. Broadly speaking, the methods can be divided into sampling-based methods and model-based methods. Sampling-based methods use different sampling strategies (e.g., uniform sampling or stratified sampling) and answer the queries based on the samples. Model-based methods develop a model of the data that is used to answer queries. The models can be of the form of histograms, wavelets, data sketches or regression and density based models. Generally, these works follow two steps. First, a model of the data is created. Then, a method is proposed to use these data models to answer the queries. However, such approaches are created to and can only answer specific queries.

Thus, known models are created to explain the data, rather than a model that predicts the query answer. For instance, regression and density based models are models of the data that are created independent of potential queries. The modeling choice based on predicting the query answer allows for orders of magnitude performance improvement. Secondly, specific models can answer specific queries, (e.g., a model that answers only COUNT, SUM, AVG, VARIANCE, STD-DEV and PERCENTILE aggregations).

There has been a recent trend to replace different database components with learned models. Most of the effort has been in either indexing (on one dimensional indexes, with extensions to multiple dimensions, using Bloom filters, and key-value stores) or approximate query processing (learning data distribution with a model, using reinforcement learning for query processing, and learning models based on the data to answer queries). Thus, these known methods replace a certain database operation (e.g., retrieving the location of a record for the case of indexing) by a learned model. Herein, the example neural network database methods and systems may answer any query that can be performed by a model, since any query is a function that can be approximated. Solving this problem requires a learning method with strong representation power, which motivates the use of neural networks. This is in contrast with simpler models. While machine learning has been used to solve various combinatorial optimization problems, no known methods consider performing different queries on the same database.

For example, range aggregate queries (RAQs) are an integral part of many applications, where, often, fast and approximate answers for the queries are desired. Range aggregate queries (RAQs) are intrinsic to many real-world applications, such as calculating net profit for a period from sales records or average pollution level for different regions for city planning. Due to large volume of data, exact answers can take too long to compute and fast approximate answers may be preferred. In such scenarios, there is a time/space/accuracy trade-off, where algorithms can sacrifice accuracy for time or space. For example, consider a geospatial database containing latitude and longitude of location signals of individuals and, for each location signal, the duration the individual stayed in that location. A potential RAQ on this database, useful for understanding the popularity of different Points of Interests, is to calculate the average time spent by users in an area.

Recent work has studied answering RAQs using machine learning (ML) models, where a model of the data is learned to answer the queries. However, there is no theoretical understanding of why and when the ML based approaches perform well. Furthermore, since the ML approaches model the data, they fail to capitalize on any query specific information to improve performance in practice.

Thus there is a need for a method for rapidly answering queries without using the storage capacity required for a database. There is also a need for a neural network solution that may be effective for analysis of different query types to a database. There is also a need for a query solution that improves in speed from using convention database query algorithms.

SUMMARY

The term embodiment and like terms, e.g., implementation, configuration, aspect, example, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

One disclosed example is a system for answering database queries. The system includes a query input for accepting a query of a first type of query to a database. A decision tree includes leaf nodes, each leaf node corresponding to a partition of queries from the database. A set of neural networks executed by a processor coupled to the query input are each trained to output a response to the first type of query corresponding to one of the partitions. The training is based on a training set of queries in the partition and correct answers to the queries from the database. A corresponding partition is determined for the query by the decision tree. An output outputs the output of a corresponding neural network to the determined partition in response to the query.

A further implementation of the example system is where each of the neural networks has an identical structure. Another implementation is where each of the neural networks is trained by minimizing the average approximation error. Another implementation is where each neural network includes a plurality of layers that includes a first layer and a last layer. The last layer includes a number of units corresponding to the output dimensionality of the query function. Another implementation is where batch normalization is used for all the layers. Sine activation is used for the first layer and swish activation is used for the first layer and a set of intervening layers between the first layer and last layer. Another implementation is where each of the neural networks are retrained to respond to queries corresponding to a second query type different from the first query type. Another implementation is where the first query type includes one of a nearest neighbor, a distance to nearest neighbor query and a range aggregate query. Another implementation is where the partitions include a merged partition that combines two initial partitions. The merged partition corresponds to one of the neural networks. Another implementation is where the system includes an evaluation module executed by the processor operable to evaluate the first type of query and select either the database or the corresponding neural network to answer the query. Another implementation is where the data in the database is multi-dimensional data.

Another disclosed example is a method of querying a database. A query of a first query type is received. The query is matched to a partition of a plurality of partitions of queries of a database. The plurality of partitions are organized in a decision tree. A neural network corresponding to the matched partition is selected. The neural network is trained from a dataset of queries and answers from the database. The selected neural network is activated to output an answer to the query.

A further implementation of the example method is where each of the neural networks is trained by minimizing the average approximation error. Another implementation is where each of the plurality of neural networks has an identical structure. Another implementation is where each neural network includes a plurality of layers, including a first layer and a last layer. The last layer includes a number of units corresponding to the output dimensionality of the query function. Another implementation is where batch normalization is used for all the layers. Sine activation is used for the first layer and swish activation is used for the first layer and a set of intervening layers between the first layer and last layer. Another implementation is where the example system includes retraining the plurality of neural networks to respond to queries corresponding to a second query type different from the first query type. Another implementation is where the first query type includes one of a nearest neighbor, a distance to nearest neighbor query and a range aggregate query. Another implementation is where the partitions include a merged partition that combines two initial partitions. The merged partition corresponds to one of the neural networks. Another implementation is where the example system includes evaluating the query and selecting either the database or the corresponding neural network of the plurality of neural networks to answer the query.

Another example is a non-transitory computer readable medium having stored thereon software instructions that, when executed by a processor, cause the processor to receive a query of a first query type. The instructions cause the processor to match the query to a partition of a plurality of partitions of queries of a database. The plurality of partitions are organized in a decision tree. A neural network corresponding to the matched partition is selected. The neural network is trained from a dataset of queries and answers from the database. The selected neural network is activated to output an answer to the query.

BRIEF DESCRIPTION OF THE DRAWINGS

In order to describe the manner in which the above-recited disclosure and its advantages and features can be obtained, a more particular description of the principles described above will be rendered by reference to specific examples illustrated in the appended drawings. These drawings depict only example aspects of the disclosure, and are therefore not to be considered as limiting of its scope. These principles are described and explained with additional specificity and detail through the use of the following drawings:

FIG. 8 shows a table of datasets used for a second set of experiments for evaluating range aggregate queries;

FIGS. 15A-15D are code listings of algorithms used to train and operate the example neural network database via the process in FIG. 14;

DETAILED DESCRIPTION

Figure 1:
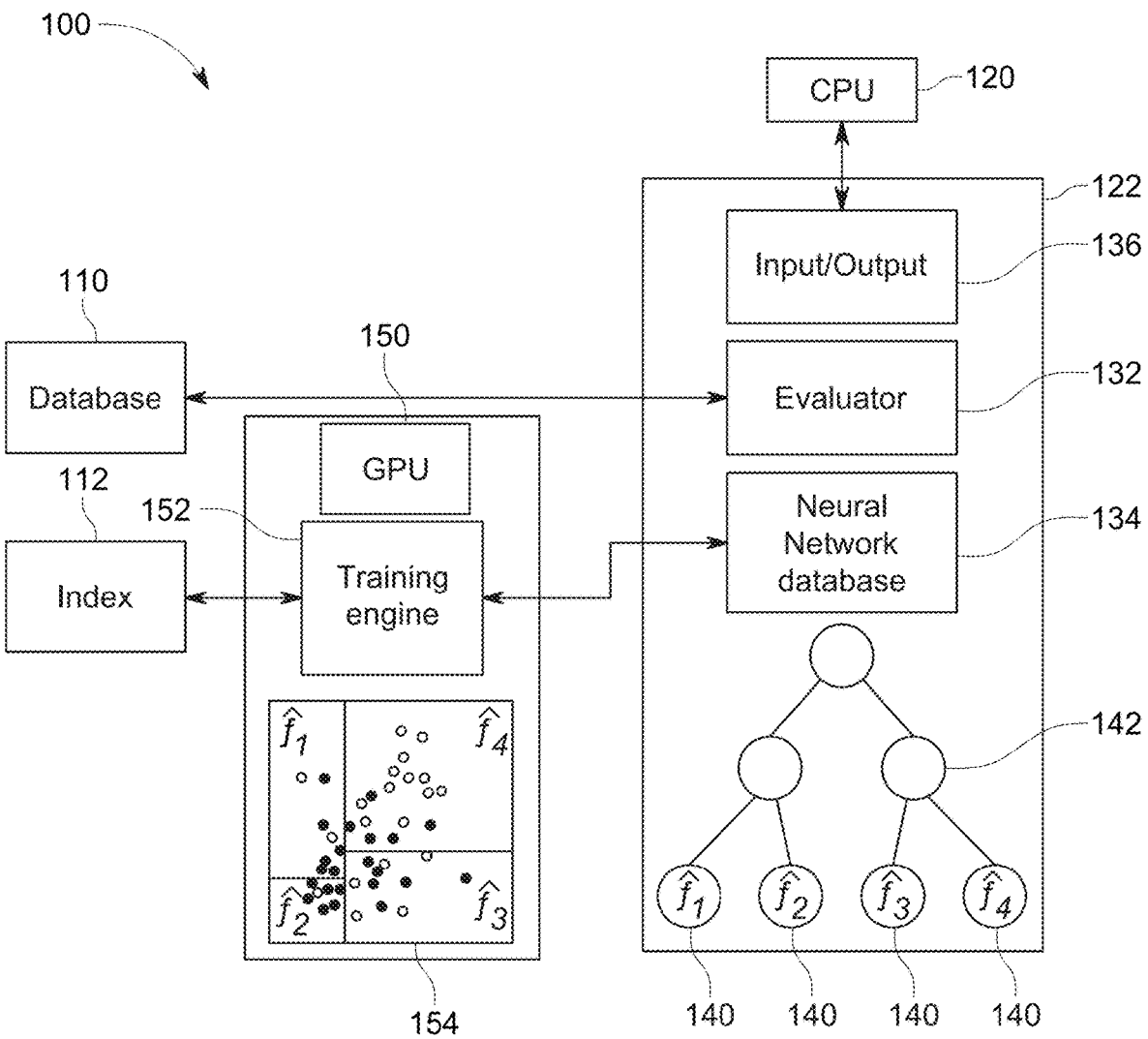
FIG. 1 shows an example neural network database framework.

Unless defined otherwise, technical and scientific terms used herein have the same meaning as commonly understood by one of ordinary skill in the art to which this invention belongs. One skilled in the art will recognize many methods and materials similar or equivalent to those described herein, which could be used in the practice of the present invention. Indeed, the present invention is in no way limited to the methods and materials specifically described.

In some embodiments, properties such as dimensions, shapes, relative positions, and so forth, used to describe and claim certain embodiments of the invention are to be understood as being modified by the term "about."

The example system and method is based on database applications where exact answers are not required and an approximate, but fast answer to a query, is preferred. For instance, an exact answer to the range aggregate query of calculating an average pollution level for different time periods and regions for city planning may take too long due to large volume of data, but an approximate answer may be as valuable as an answer for a full query. Other applications include analytical applications on large datasets, such as calculating average sales volume over a time period or total number of restaurant visits on a particular day. Another example is distance-based outlier detection on a video stream, or selecting video frames for training a vision model from a video stream. Other applications include information retrieval (e.g., from videos or documents), where given a query one wants to find the most related piece of information available in the videos (or documents). These examples require algorithms that compute the distance to the k-th nearest neighbor of the frames of a video stream over an existing database of images on the fly. The need for fast answers is often aggravated by the limitations of the device performing the computation. For example, Internet of Things (IoT) and edge devices with limited processing/ storage capacity are being utilized more often to capture videos and perform these operations. In some examples, a degree of accuracy can be reduced for faster query response time to allow for processing of more video frames. Range aggregate queries and distance to nearest neighbor queries are two important underlying query types for which approximate answers are acceptable.

The present disclosure is directed toward methods and systems of a framework that can learn an algorithm for one query type such as an aggregate query. The same framework can be used to learn an algorithm for another query type, such as distance to the k-th nearest neighbor query, while outperforming the state-of-the-art methods for both of query types. Although an algorithm outperforming the state-of the-art in either of the two query types is significant on its own, a learned framework can not only be useful for a specific query type but can be generalizable to multiple query types (specifically query types that are traditionally studied separately, e.g., nearest neighbor queries and range aggregate queries). As such, the disclosed methods can improve the performance of a query response system while also saving time when designing the query response system.

In one implementation, queries can be considered as functions that can be approximated. This allows formulation of a learning task, i.e., to learn a model, to answer a query. In this disclosure, a query instance is a particular query input, while a query function is the general relationship between query inputs and their corresponding outputs (function). To be specific, a query type (or a query function) on a database defines what the output should be for a query instance on the database and can be seen as a function mapping the query space to some output space (e.g., for the nearest neighbor query on a d-dimensional database, query space is all the points in R d and output space is all the points in the database). Algorithms may be seen as functions approximating the query function, or, in other words, as function approximators. This observation generalizes "Indexes are models" of to queries are functions that can be approximated. Using this terminology, where any algorithm is seen as a function approximating a query function, a traditional B-tree as well as RMI approximate an index query function, nearest neighbor query function can be approximated by combinatorial methods, which build an index structure to prune the space and use the index to find nearest neighbors, and range aggregate query functions which use indexing and sampling to estimate query answers. The approximation error is zero in many cases such as for B-trees.

In some implementations, representing query types as functions that can be approximated opens the path for using learned function approximators (such as a neural network), instead of combinatorial methods for answering database queries. Searching the algorithm space translates into searching for good parameters of (or, in other words, learning) a function approximator. In one example, the algorithm space is adjusted to the set of parameters of a neural network because it can be searched efficiently. Therefore, for the problem of using learned function approximators to answer database queries, and/or for the specific query types of distance to nearest neighbor query and range aggregate query, a learned neural network can provide better time/ space/accuracy trade-offs than existing methods in practice.

A novel framework based on a neural database is provided in order to address the above mentioned issues for different query types such as nearest neighbor queries and range aggregate queries. The novel framework allows for effi- ciently answering the two different query types of range aggregate queries and distance to nearest neighbor queries. By viewing database queries as functions, a neural network framework can approximate the query function well. The neural network then can be used to replace the database for answering the queries. In one example, the framework is query-type agnostic. The framework thus makes no assump- tion about the query type learned, and yet provides orders of magnitude performance gains for the specific queries. The example neural network framework uses samples of queries from a query distribution and their corresponding answers to learn the query function by minimizing the average approximation error. During a pre-processing step, the example neural network based database (such as an example termed NeuroDB) learns a model from the answers given by a corresponding combinatorial algorithm. In this step, the example neural network database uses these solved instances to search an algorithm space. The algorithm space is the set of parameters of a neural network. At test time, the neural network database uses the model to answer the queries efficiently, eliminating both the database and the combinatorial algorithm. In this way, the example neural networks are able to capture the complex relationships that can exist between query inputs and outputs.

In another implementation, the example neural network database can be seen as an approximate result materialization technique that takes advantage of query and data distribution to minimize the approximation error. Roughly speaking, regions with higher probability in the query space are materialized more accurately, allowing the framework to perform well for high-dimensional data such as images where queries can be seen as belonging to low dimensional manifolds. Intuitively, the neural network database can be thought of as memorizing the data points in the model weights of the neural network. Further, due to the existence of patterns in the data and the relationship between query input and output, the example neural network database can answer queries by only taking up a fraction of the data size and without the need to access the database. This differs from merely memorizing or caching the answers to query points in the training set. The neural network database learns generalizable patterns between the query inputs and outputs.

Although the example neural network database framework is query-type agnostic, and as such, can be applied to any query type, the example framework specifically provides orders of magnitude improvement for range aggregate queries and distance to nearest neighbor query. Both nearest neighbor and range aggregate queries are important building blocks of many real-world systems. For example, distance to nearest neighbor query is useful for various applications such as active learning, outlier detection, route planning and information retrieval. In the case of active learning, a nearest neighbor query can be used as a diversity score for selecting samples for training a model or outlier detection, where one is only interested in finding the distance to the k-th nearest neighbor and not the k-th nearest neighbor itself.

The development of the example neural network database framework involved formulating the problem of learning database queries with function approximators; proposing the first query-type agnostic framework to answer queries efficiently using neural networks; and designing the example framework that can efficiently answer distance to nearest neighbor and range aggregate queries. The operation of an example neural network database, NeuroDB, was verified through different testing. Based on the test results, the example NeuroDB enjoys orders of magnitude gain in query time over state-of-the-art and optimal algorithms for answering distance to nearest neighbor query on real datasets. Its query time is not affected by k and only marginally impacted by data size and dimensionality. The same architecture can be used to answer range aggregate queries with orders of magnitude improvements in query time over the state-of-the-art using real-world, TPC-benchmark and synthetic datasets. As a byproduct, the example neural network database NeuroDB can learn patterns in the data, and thus is useful for feature learning or when there is missing data.

The example neural network database avoids the curse of dimensionality by utilizing the query distribution explained above. In comparison, existing Voronoi diagrams materialize the query result for all potential queries exactly, which becomes impractical for high dimensional data. However, this can be redundant, because the space of potential queries can be a small proportion of the total high dimensional space (e.g., for images). Further, the example neural network database can provide answers for specific queries without unnecessary precomputations. For instance, a model can be trained to find the distance to the k-th nearest neighbor, without ever finding any of the k nearest neighbors or their distances to the query point. The example neural network database NeuroDB uses query and data distribution to learn patterns that allow for answering queries faster. As explained above, the example neural network database can be applied to both range aggregate queries and distance to nearest neighbor query, blurring the boundaries between the queries that are traditionally studied separately.

By using the example NeuroDB model, answering any query can be done, since any query is a function that can be approximated. Accordingly, multi-layer neural networks can efficiently and accurately answer range aggregate queries and distance to nearest neighbor queries, improving on the modeling choices of the previous work and the state-of-the-art in the studied query types.

FIG. 1 is a block diagram of the example neural network database system 100. The neural network database system 100 includes a standard database 110 that includes an index of previous queries and answers to such queries 112. In this example the queries may include queries of a specific type such as a nearest neighbor query or a range aggregate query. A CPU 120 is coupled to a storage device 122. The storage device 122 stores an evaluation module 132, a trained neural network database 134, and an input/output module 136. As will be explained, the CPU 120 executes the different modules 132, 134, and 136. The neural network database 134 includes a set of neural networks 140 organized in a tree structure 142.

The system 100 includes a training module 150 that is executed by a GPU 152. The training module 150 interfaces with the database index 112 and includes a partition map 154 that partitions queries of a specific type. Each of the neural networks 140 are directed toward a partition of the set of query data in the partition map 154. As will be explained, each of the neural networks is trained to accept a query from the respective partition and provide a trained output. As will be explained the database 110 requires relatively large storage and may include known query algorithms to produce responses to queries. In comparison, the neural network database 134 requires relatively smaller storage size and is trained to respond to types of queries in a similar manner to that of the database 110 more rapidly.

A specific query is received by the CPU 110 through the input/output module 136. The evaluation module 132 determines whether the query may be responded to using the conventional database 110 or is a query for which the neural network database 134 is trained for. Using the conventional database 110 may be required when queries with smaller ranges are involved. If the evaluator 132 selects the neural network database 134, for example, when queries with larger ranges are involved, the query will be matched to one of neural networks based on where the query fall in the partition map 154. A forward pass is performed by the selected neural network 140. As will be explained, for queries that have relatively larger ranges, the neural network database 134 will return accurate responses in a faster time based on the trained neural networks 140 in comparison to the database 110.

The disclosed example neural database is directed toward solving a learned database problem that may be defined as possible. In one implementation, a database D with n records and in d dimensions and a query distribution Q is considered. A query type or a query function on the database D is defined as a function $f_D(q)$: I→R, where I is the set of possible query inputs and R is the set of possible outputs. Let $\Delta_{f_D}(q,y) \geq 0$ be an error function that measures how bad the solution y to the input q is for the query function $f_D$. For instance, if exact answers are required, $\Delta_{f_D}(q,y)$ can be defined as 0 if $y=f_D(q)$; and 1 otherwise, or it can be defined as $\|f_D(q)-y\|$. Furthermore, for a function approximator $\hat{f}_D(q;\ \theta)$, let $\Sigma(\hat{f}_D)$ be its storage cost (e.g., for neural networks, number of parameters) and $\tau(\hat{f}_D)$ be its evaluation time or query time. For neural networks, the evaluation time or query time is the time the neural network takes for a forward pass).

The learned database (LDB) problem may be defined as follows. Given a storage requirement s, an evaluation time requirement t and a space of parameters, Θ, for function approximators, find $$\min_{\theta \in \theta} E_{q \sim Q}[\Delta_{fD}(q, \hat{f}_D(q;\theta))] \text{ s.t. } \sum(\hat{f}_D) \leq s \text{ and } \tau(\hat{f}_D) \leq t$$

The optimization in the problem statement is over the possible function approximators, which can include combinatorial algorithms. It is the problem of finding an algorithm that can answer queries for a given database within a given time and space requirement. s and t can be defined in terms of n and d.

Focus is directed on the class of function approximators that can be automatically searched, but yet have large expressive power. As such, neural networks are the focus. The parameter θ can be defined as the class of all possible neural networks, in which the problem becomes a neural architecture search problem.

However, a first natural question is "whether there exists a neural network architecture that given evaluation time and storage requirements can provide better accuracy compared to known methods for different query types or not." This question was answered for two query types: a range aggregate query and a distance to k-th nearest neighbor query. The k-th nearest neighbor query itself was studied as well, as it provides interesting insight into the learning process. Thus the problem addressed is to find a neural network architecture that can outperform existing combinatorial methods for the above-mentioned query types. These query types are building blocks of many real-world applications.

Seen from a different perspective, the example approach can also be considered as setting θ to a specific neural network architecture that satisfies the storage and the evaluation time requirements. Consequently, the LDB problem is the same problem as optimizing parameters of a neural network to answer a particular query type.

Finally, generally there is no access to the distribution Q itself, but only samples from the distribution. Thus, the example framework assumes only having access to a set of samples from Q. Thus, it is desirable to optimize:

$$\frac{1}{|Q|}\sum_{q\varepsilon Q}\Delta_{fD}(q, \hat{f}_D(q; \emptyset)) \text{ instead of } E_{q \sim Q}[\Delta_{fD}(q, \hat{f}_D(q; \emptyset)]$$

Figure 2:
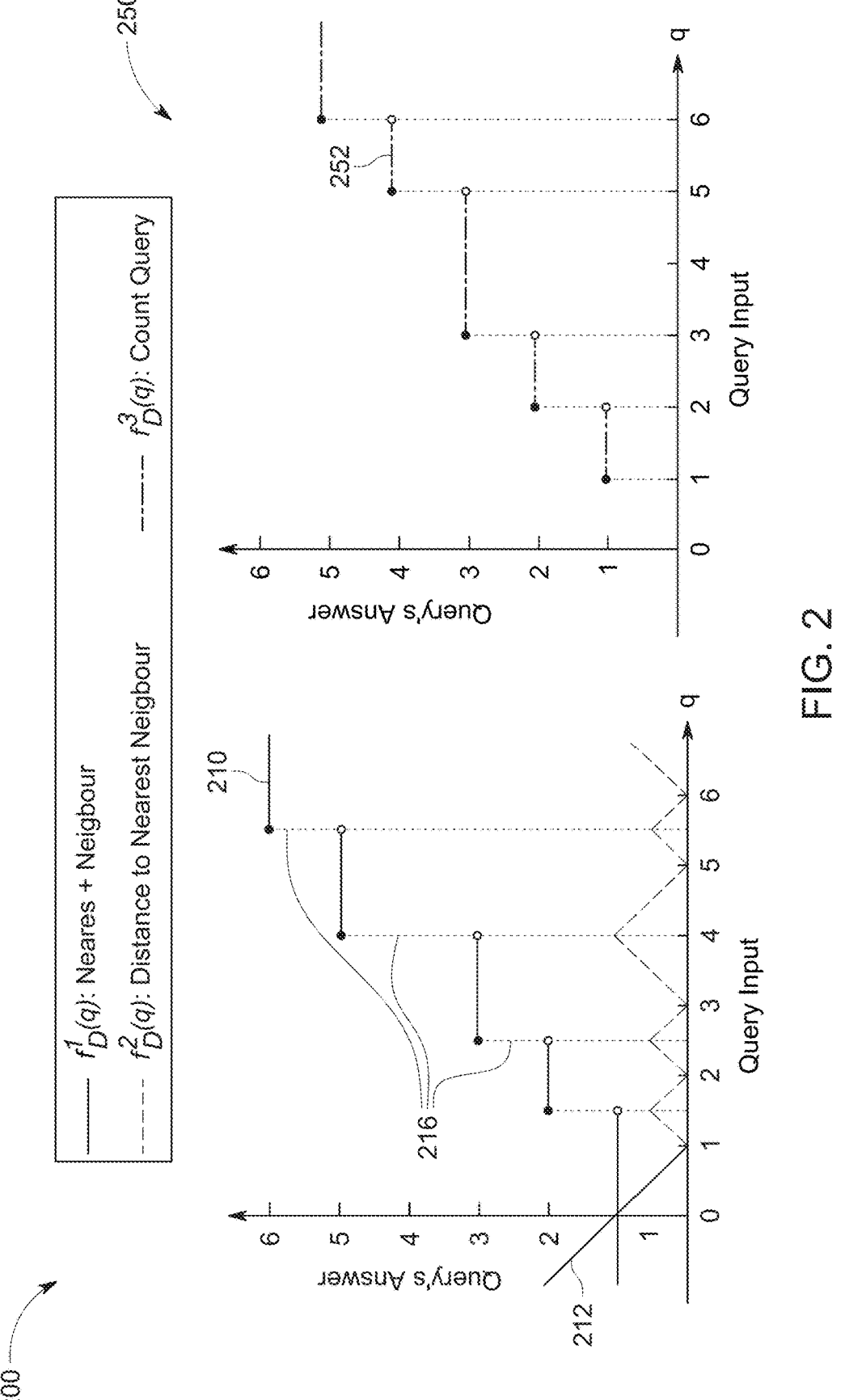
FIG. 2 shows graphs of query answers in relation to query inputs for different types of queries.

The range-aggregate query may be expressed as follows. Given a d-dimensional database D={$p_i \in R^d$}, an aggregation function g: $2^D \rightarrow R$ and a query $q \in R^{2 \times d}$, where q defines a hyper-rectangle in d dimensions, define $f_D(q)=g(\{p \in q \cap D\})$ where q∩D is the set of points in D that intersect the range defined by q. For instance, g can be a count function, in which case $f_D(q)$ is the number of data points in D that are in the query range q. If g is a count function, it may be observed that $f_D(q)$ is a step function, with points of discontinuity whenever boundaries of q intersect data points in D. For the one dimensional database D={1, 2, 3, 5, 6}. FIG. 2 shows a graph 200 that has an axis of the time to generate an answer to the query and an axis of the query input. A first plot 210 shows the nearest neighbor of the query function for the count aggregation function. A second plot 212 shows the distance to the nearest neighbor of the query function. The queries are assumed to be of the form (q, cc) (i.e., the only input is the beginning of the range).

The k-th nearest neighbor query may be expressed as follows. Given a d-dimensional database D={$p_i \in R^d$}, an integer k, and a query $q \in R^d$, k-th nearest neighbor query is to find the points in D whose distance to q is the k-th smallest. For this query, $f_D(q)$: $R^d \rightarrow R^d$.

For the one same one-dimensional database mentioned above, FIG. 2 shows a graph 250 that has an axis of the time to generate an answer to the query and an axis of the query input. The graph 250 shows a plot 252 for the range aggregate. The graph 250 shows the k-th nearest neighbor query function for k=1 (shown as $$f\frac{1}{D}(q)$$

in the graph 200).

$$f\frac{1}{D}(q)$$

is a step function, where the output of $$f\frac{1}{D}(q)$$

is always a point in the database.

$$f\frac{1}{D}(q)$$

is constant over the query inputs whose nearest neighbor is the same, and points of discontinuity occur when the nearest neighbor changes. This occurs at the mid-point between consecutive data points, shown by dashed lines 216.

The distance to k-th nearest neighbor query may be expressed as follows. That is, if p is the k-the nearest neighbor of a query point q, then $f_D(q)=d(p,q)$ for some distance metric and $f_D$: $R^d \rightarrow R$. Distance to k-th nearest neighbor query is not traditionally studied separately from the nearest neighbor query, because combinatorial methods use a nearest neighbor algorithms to find the distance to the nearest neighbor. However, using neural networks, the distance to the nearest neighbor may be directed calculated without ever finding any of the nearest neighbors. Thus, this query may be studied separately. As noted previously, the nearest neighbor query is useful for various application such as active learning or outlier detection, where finding the distance to the k-th nearest neighbor and not the k-th nearest neighbor itself is the sole focus.

Another application is for assessing probability of getting infected from a disease, such as COVID-19, based on user locations. Consider a database that contains the location of infected people and let the nearest neighbor queries be the location of healthy people. The goal is to find the probability of a healthy person getting infected based on how close they were to infected people, which is the distance to their nearest neighbor. The plot 212 in the graph 200 shows this query for d=1 and k=1 (on the same database explained above). In contrast to the nearest neighbor query, this query is continuous. Furthermore, the range of the query is a single real number, as opposed to $R^d$.

A neural network is trained to approximate the query function $f_D(q)$ with a typical supervised learning approach. Given a database D, a neural network architecture is selected the model is then trained.

Design of the neural network requires several considerations. One consideration is dependence on data size, n and dimensionality, d. The query function $f_D$ is a function dependent on the query type, as well as the database D. Thus, the complexity in approximating $f_D$ depends on the dataset as well as n and d. Generally, as n (and d) increases, the function to be approximated becomes more complicated and it is unlikely that the same neural network architecture is able to answer the query for different values of n since more parameters may be needed to be able to approximate the more complicated function. In practice, the number of parameters needs to be increased whenever data size increases. Moreover, for different values of d, the query space may change. This will change the dimensionality of the input to the neural network, which necessitates changing the number of parameters so that the first layer takes into account all the dimensions). Thus, the example architecture needs to depend on both n and d.

Another issue is designing a neural network with low query time as n and d increase. Assuming no parallelization, a forward pass of a neural network takes time that is linear to the number of its parameters. So as n increases, the number of parameters must be increased in the model, which may in turn increases the query time. A design is needed that can limit the increase in query time. In this example, parallelization is avoided to provide a fair comparison with existing combinatorial methods.

Another consideration is that the training processes should be fast and not consume too much memory. Since number of parameters needs to increase with n, training could become harder and take more time and space. Although training time is a preprocessing step and does not affect query time, training of the network is feasible with existing GPUs.

The example architecture of the neural network database consists of multiple neural networks each with identical structure. Each neural network is responsible to answer the queries for a unique part of the query space. In other words, the query space is split into a number of partitions, for a parameter Np, and a neural network is trained to answer the queries for each partition independently. The queries are answered by finding which neural network is responsible for them and then performing a forward pass of that neural network. The answer to the query is the output of the neural network and a fixed architecture is used for all the neural networks. Thus, the total number of parameters used is equal to the number of parameters per architecture times Np.

Figure 3B:
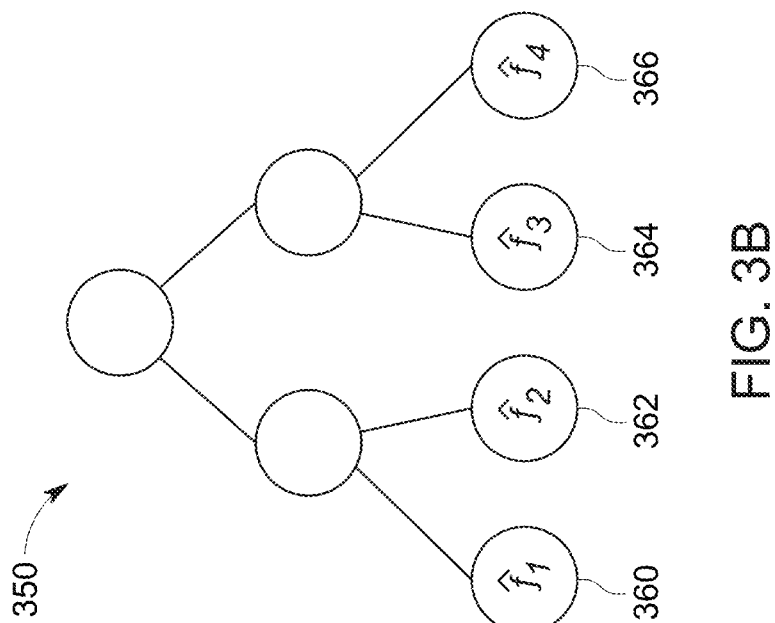
FIG. 3B shows an example tree using different neural networks corresponding to the partitions in FIG. 3A.
Figure 3A:
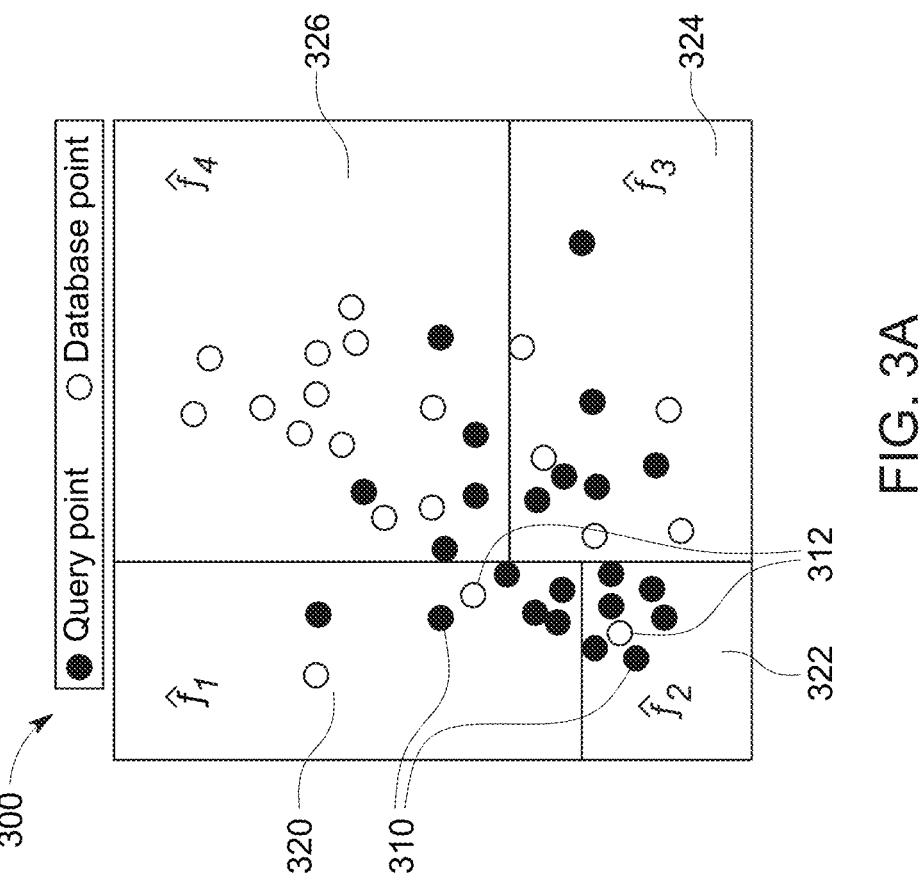
FIG. 3A shows a chart of query points and database points that are divided into different partitions.

FIG. 3A shows a graph 300 that plots the queries in the query space as points 310 and the database points as points 312 in four different partitions 320, 322, 324, and 326. The query space is thus partitioned into the smaller partitions. FIG. 3B shows a tree structure 350 that is built with a neural network at each leaf node 360, 362, 364, and 366. A query traverses the tree structure 350 until it reaches the appropriate leaf node 360, 362, 364, and 366. A forward pass of the neural network associated with the appropriate node 360, 362, 364, and 366 is then performed.

The example tree architecture 350 addresses the considerations explained above. The parameter Np may be used to control the size of the architecture. Increasing Np increases the number of neural networks used and thus allows for expressing more complicated functions. The query time depends on the time to find the partition the query belongs to, $t_p$, and the time of a forward pass for the neural networks, $t_n$. Using the example architecture, increasing Np increases $t_p$ but not $t_n$. Given that indexing can be used to search the partitions, $t_p$ is generally very small and increasing the time to find the partition has negligible impact on query time. In fact, query time increases logarithmically in the number of parameters. Training can be done independently for each neural network used. Thus, rather than training a large neural network, multiple smaller neural networks are trained. This has two benefits. First, each neural network can be trained in parallel and even on different devices, which can speed up training. Second, training requires less memory because all the networks do not need to be loaded at once. Thus, limited memory may be used by training one set of networks to the capacity of the memory and subsequently training another set of networks, as opposed to having to train all the network at once which requires larger memory.

To summarize, the example approach requires a method for partitioning the space and traversing the partitioning, as well as designing a neural network and training the neural networks for each partition.

Selecting an appropriate partitioning method includes the following. An aim is minimizing $E_{q \sim Q}[\Delta_{fD}(q, \hat{f}_D(q;\theta)]$ which is $\Sigma_i p(q \in Pi)E_{q \sim Qi}[\Delta_{fD}(q, \hat{f}_D(q; \theta)]$, where Pi is the i-th partition and $Q_i$ is the distribution of queries in partition Pi (i.e., if $g_Q(q)$ is p.d.f. of Q, p.d.f. of Q is $Q_i$ is $$\frac{g_Q(q)}{p(q \in P_i)}$$

if $q \in Pi$ and 0 otherwise). Thus, the contribution for each partition to the design objectives is dependent on the probability of the partition being queried, as well as the average approximation error. The probability of being queried depends on the query distribution while the average approximation error depends on the complexity of the function being approximated. This means that partitions must be selected such that high probability areas are approximated accurately, while the error for low probability partitions may be higher.

Reducing the size of the space approximated by a neural network allows for better approximations in the smaller space. Thus, partitions that are smaller are chosen where the queries are more frequent and larger partitions are chosen where queries are less frequent. This can be done by partitioning the space such that all partitions are equally probable.

Towards this end, a kd-tree is built on a sampled query set, Q, as shown by the query points 310 in FIG. 3A. The split points in the kd-tree can be considered as estimates of the median of the distribution Q (conditioned on the current path from the root) along one of its dimensions, obtained from the samples in Q. The goal of building a kd-tree is to partition the query space.

The kd-tree is built by specifying a maximum height, h, and partitioning every node until all leaf nodes have height h. This creates $2^h$ partitions and $2^h$ independent neural networks that need to be trained. Given a query set Q, each partition will have at least $$\left\lfloor \frac{|Q|}{2^{h-1}} \right\rfloor$$

training samples. In fact, one way to choose h is by making sure number of training samples per partition is not too small for training.

A fully connected neural network is used for each of the partitions. The architecture of the neural network is the same for all the partitions, consists of $n_l$ layers, the first layer consists of $l_{first}$ units, the next layers have $l_{rest}$ units and the last layer has d' units, where d' is the output dimensionality of the query function. Batch normalization is used for all the layers, sine activation for the first layer and swish activation for all the other layers (except the output layer). The network size is O(d), seen as a function of input dimensionality, where the number of parameters for the network architecture are considered to be constant.

To train the model, access was required to samples of the form $(q, f_D(q))$, where $f_D(q)$ is the correct answer for the query q. A set Q of sampled queries was available and thus access to some algorithm that can be used to answer q, for each $q \in Q$ was required. This implies that an algorithm is known that can solve the query. However, this is a pre-processing step and this sample collection step is only performed once and is only used to train the model. After training the example model, the neural network database (NeuroDB) can answer the queries orders of magnitude faster than the algorithm that was used in the learning process. This is particularly useful because polynomial time solutions exist for many database queries, and thus sample collection can be easily performed. Subsequently, a neural network database such as NeuroDB can be trained to answer the queries efficiently. Besides faster query performance in general, this is specifically beneficial when the queries need to be answered on resource constrained devices. For example, the model can be trained on a more powerful machine and deployed on less powerful IoT edge devices.

The process of training is similar to a typical supervised training of a neural network with stochastic gradient descent. $2^h$ different neural networks need to be trained and the kd-tree is used to determine which samples are used to train which neural network. In general, $\Delta_{f_D}$ may or may not be differentiable with respect to q. Thus, a squared error loss function is used (i.e., the minimization objective is $\|f_D(q) - \hat{f}_D(q; \theta)\|^2$).

In this example, given a value of h, there are 2 h partitions in the tree, and each contains a neural network. Let $$h = \log\frac{n}{c},$$

for some user parameter c denoting the capacity of a neural network, so that the number of partitions, $N_p$, is $$\frac{n}{c}.$$

partitions increases linearly in n. Intuitively, the capacity of a neural network denotes how complex of a function it can approximate well, which depends on the number of neural network parameters, number of points in the database (as well as their distribution) and number of training samples available. Regarding time and space complexity, for a fixed neural network architecture, there will be O (dn) number of parameters, which means the space complexity is O (dn). Furthermore, at query time, the kd-tree needs to be traversed which takes O (log n), and a forward pass of the neural network takes O(d). Thus, time complexity of the algorithm is O (log n+d).

Further, experiments described herein show that the example neural network database architecture can provide good accuracy in practice. In the experiments, model accuracy depends on number of training samples available, |Q|, number of partitions $N_p$ and the size of each neural network.

Due to partitioning, each neural network used is relatively small training time, which allows for fast training. Furthermore, each neural network is trained independently, which allows training in parallel. Overall, given a fixed network architecture, and assuming T iterations of stochastic gradient descent is applied, training time can be quantified as O(dnT), where each iteration for each network takes O(d) and there are O(n) networks.

An exact architecture of the neural network such as the number of layers and number of units can be determined via approaches in neural architecture search but such approaches may be computationally expensive. Thus in this example, a simple heuristic is used. One of the partitions is selected and a grid search is performed on the hyper-parameters. Since the example neural network architecture for each partition is small, this grid search can be done in a practical time-frame. Although size of each neural network has only a constant time impact on query time, in practice the size can be significant if large models are used, because number of computations performed for a forward pass is linear in the number of its parameters. Increasing the number of parameters of a model by creating deeper models allows for a more expressive network, which allows for better accuracy.

In some examples, learned partitions may be able to split the space to minimize redundancies in features learned by the models (e.g., by splitting the space where the underlying query functions are the most different). However, learning the partitioning may be complex and computationally intensive. Thus, in this example the kd-tree was used to perform the partitioning.

In the experiments conducted in relation to the example NeuroDB, there were four issues addressed: 1) the relationship between model hyperparameters and accuracy of the example neural network database, NeuroDB; 2) whether the example neural network database, NeuroDB provides better accuracy/time/space trade-offs than state-of-the-art and optimal combinatorial algorithms for the distance to nearest neighbor query; 3) whether the example neural network database architecture may be used to answer range aggregate queries better than the state-of-the-art and query specific algorithms; and 4) whether the example neural network database, NeuroDB learns any useful patterns for the nearest neighbor query.

The experiments were performed on a machine running Ubuntu 18.04 LTS equipped with an Intel i9-9980XE CPU (3 GHz), 128 GB RAM and a GeForce TRX 2080 Ti NVIDIA GPU. For all the experiments, building and training of the example neural network database, NeuroDB, were performed in Python 3.7 and Tensor-flow 2.1. Training of the model is done on a GPU. The model was saved after training. For evaluation, a separate program written in C++ and running on CPU loads the saved model, and for each query, performs a forward pass on the model. Thus, model evaluation was done with C++ and on a CPU, without any parallelism for any of the algorithms. The specific hyperparameters used are specified for each set of experiments.

A first set of experiments was conducted relating to the distance to k-th Nearest Neighbor Query. The example NeuroDB framework was employed to answer distance to nearest neighbor queries. The first set of experiments used four different real datasets (GloVe, GIST, KDD, and IPUMS) whose relevant statistics are shown in a table 400 in FIG. 4. The table 400 includes the name of the dataset, the number of records in the database, and the dimensions of the database. Uniformly distributed data and query points were used for the first set of experiments on hyperparameters. For each experiment, n points were sampled uniformly at random from the original dataset and are considered the database to perform the query on. The sub-sampling was done to ensure enough queries for training. Furthermore, all the points in the original dataset were split into a training set of size $N_{train}$ and a testing set of size $N_{test}$. Points in the database can also be training or testing queries. This assumes the queries are from the same distribution as the datapoints, which can be true for the datasets considered in this experiment. For instance, the GloVe dataset contains learned word representations. A distance to nearest neighbor query on this dataset can be interpreted as checking whether a set of words, D, contains a similar word to some query word q, or to check if a query q would be an outlier in D (e.g., to check whether a good representation for q is learned or not). Unless otherwise stated, n=10,000, d=25, k=100, $N_{test}$=10,000 and $N_{train}$ was set to the size of all the dataset except the test set.

The measurements include time taken to answer a query, space used (for a neural network this is the memory space needed to store all its parameters) and average relative error. Relative error, for the k-th nearest neighbor query q, when an algorithm returns the point $p_k$ while the correct answer is $p^*_k$ is defined as $$\frac{|d(p_i, q) - d(p_{i^*}, q)|}{d(p_{i^*}, q)},$$

where d(x, y) is the Euclidean distance between x and y Unless otherwise stated, the error requirement was set to 0.05.

The outputs of the example NeuroDB algorithm were compared with outputs from NSG and ANN. NSG is a state-of-the-art graph-based algorithm, shown to outperform various existing methods. The publicly available implementation of NSG was used. A grid search method was used to select the algorithm parameters. For each data dimensionality, when the relative error is required to be at most a threshold, e.g., 0.05, a grid search was performed on the hyper-parameters to find the parameters such that the query time is a minimum while relative error is at most the required threshold, a grid search is done by running the algorithm on a subsample of the dataset. 10,000 points were used as the sample size.

ANN is a worst-case optimal algorithm in the algebraic decision tree model of computation as ANN requires O (n) space and O (log n) query time for fixed, d, E and k, as implemented in the ANN library. The algorithm, given a worst-case relative error parameter, E, an integer k, a query point q and a dataset D, returns k nearest neighbors of q such that the relative error for the i-th nearest neighbor in D is at most E (where the relative error is defined as above). The algorithm is in the worst-case asymptotically optimal. In some of the experiments, the query time of ANN was reported where average relative error is at most some threshold, e.g., 0.05. Since ANN takes worst-case relative error as an input (and not average relative error), finding a value for the worst-case relative error such that average relative error is below 0.05 was required. To do this, a binary search was performed on values for worst-case relative error until a value was found such that the average relative error was below 0.05.

Figure 5A:
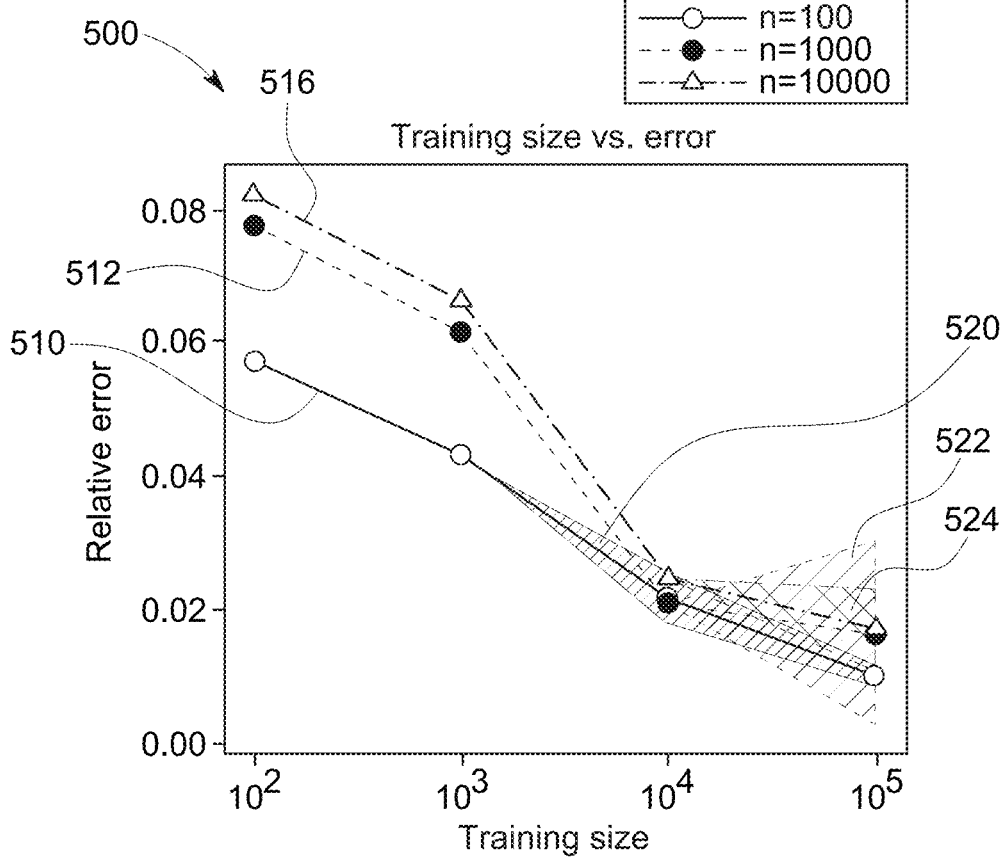
FIG. 5A is graph plotting errors against training size resulting from the first set of experiments.

Experiments in this subsection are performed on uniform data and query distribution, with d=20 and k=20. FIG. 5A shows a graph 500 that plots errors against the training size. A trace 510 represents a data size, n, of 100, a trace 512 represents a data size of 1000, and a trace 514 represents a data size of 10000. FIG. 5A shows the impact of training size on model accuracy. The results are average of three runs and the shaded areas 520, 522, and 524 show the respective standard deviations. In this example, three models were trained, where the randomness is due to the models being initialized randomly at the beginning of the training, as well as using stochastic gradient descent (SGD) for training. In this experiment, to keep the training time the same, the number of updates applied to the models, as well as the batch size, were kept the same across different training sizes. Fewer epochs were run for larger training sizes because each epoch contains more updates. As training size increases model accuracy improves. Furthermore, larger training size is more important for larger values of n. The increase in standard deviation for larger training sizes is due to the algorithm running for fewer epochs on larger training sizes.

Figure 5B:
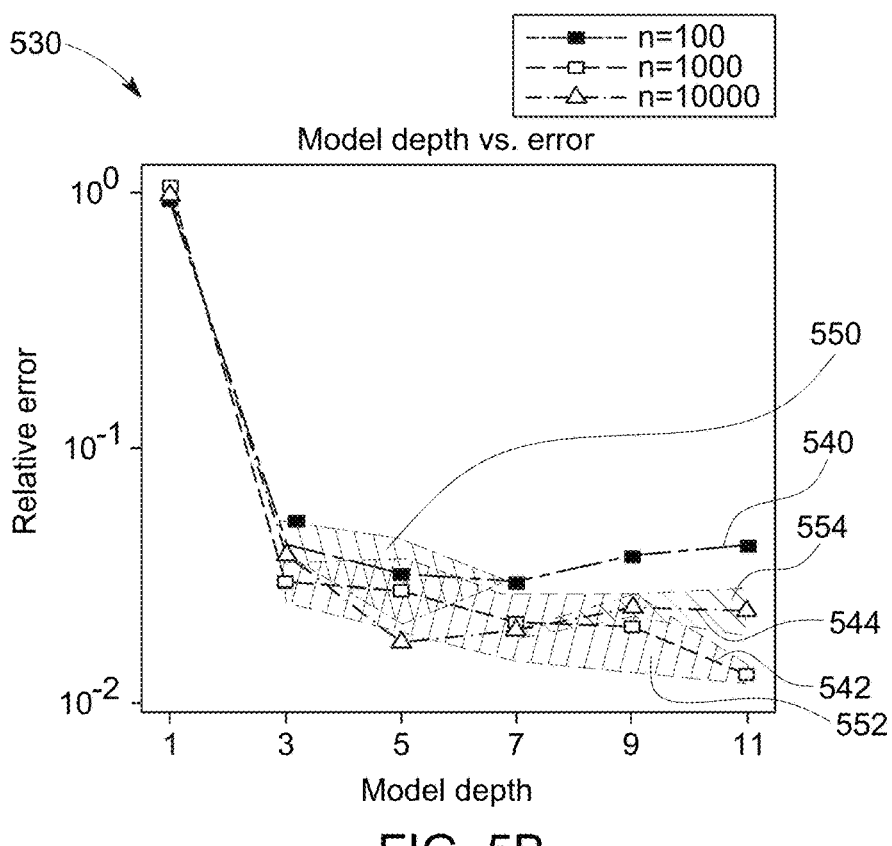
FIG. 5B is a graph plotting errors against model depth resulting from the first set of experiments.

FIG. 5B shows a graph 530 that plots errors against the model depth. A trace 540 represents a data size, n, of 100, a trace 542 represents a data size of 1000, and a trace 544 represents a data size of 10000. The shaded areas 550, 552, and 554 show the respective standard deviations. The graph 530 shows the impact of model depth on accuracy. A linear model (e.g., a neural network with only one layer) provides very poor accuracy, which justifies the use of deeper neural networks. Second, increasing model depth beyond a certain point does not necessarily improve accuracy. Increasing model depth can cause over-fitting, which explains the worsening of performance observed in FIG. 5B for larger model sizes.

Figure 5C:
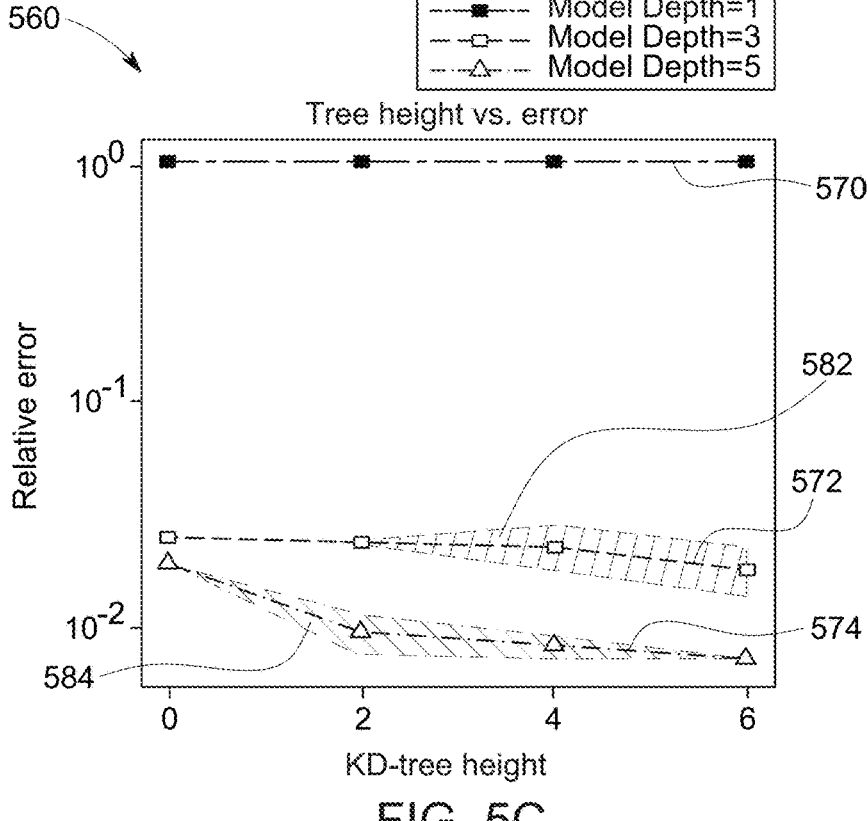
FIG. 5C is a graph plotting errors against tree height resulting from the first set of experiments.

FIG. 5C shows a graph 560 that plots errors against the tree height. A trace 570 represents a tree height of 1, a trace 572 represents a tree height of 3, and a trace 574 represents a tree height of 5. The shaded areas 582 and 584 show the respective standard deviations for the tree height of 3 and the tree height of 5. The graph 560 shows the impact of the height of the kd-tree, which determines number of partitions used. Increasing the height of the kd-tree generally increases accuracy, but with larger models benefiting more. In this experiment, for each partition, the number of training samples used are kept fixed (i.e., there are more training samples as more partitions are created). Overall, larger depth and more training size improve model accuracy. However, if the training size is fixed such as if there is no access to the query distribution, there is a limit to improvements obtained by increasing tree height, as number of training samples per model will be reduced. The standard deviations shown in FIG. 5C is over different models in the example NeuroDB and not multiple runs. The low standard deviation shows that all models responsible for different partitions obtain similar accuracy.

Unless otherwise stated, the model depth was set to 5 layers, with the first layer consisting of 60 units and the rest with 30 units. The height of the kd-tree is set to 4. For baseline comparison, the real datasets in table 400 of FIG. 4 were used for the results in this section, and the 25 dimensional dataset for GloVe was used unless otherwise stated. For the results in these experiments n was set to be 1% of the original dataset size.

Figure 4:
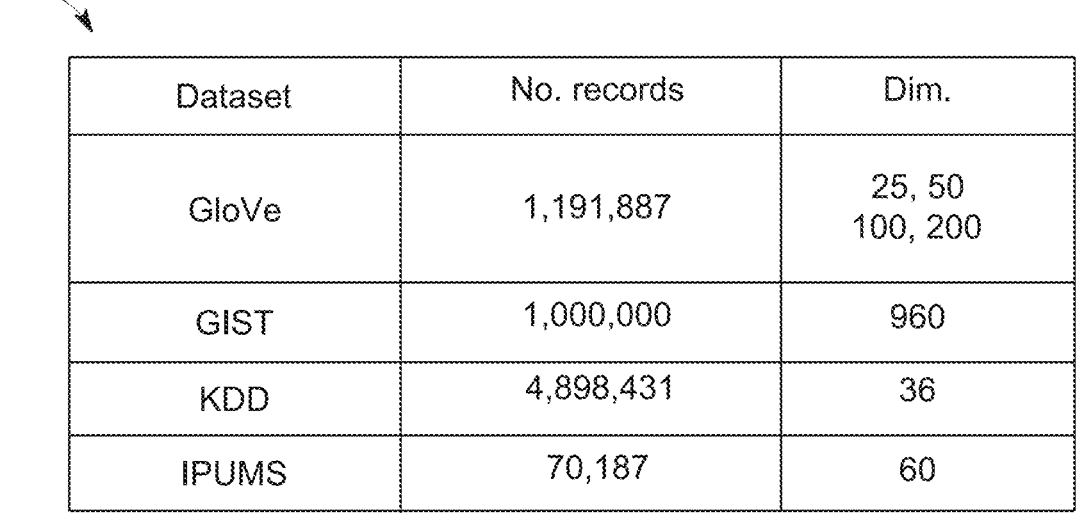
FIG. 4 shows a table of the datasets used for a first set of experiments testing the example neural network database answering distance to nearest neighbor queries.
Figure 6:
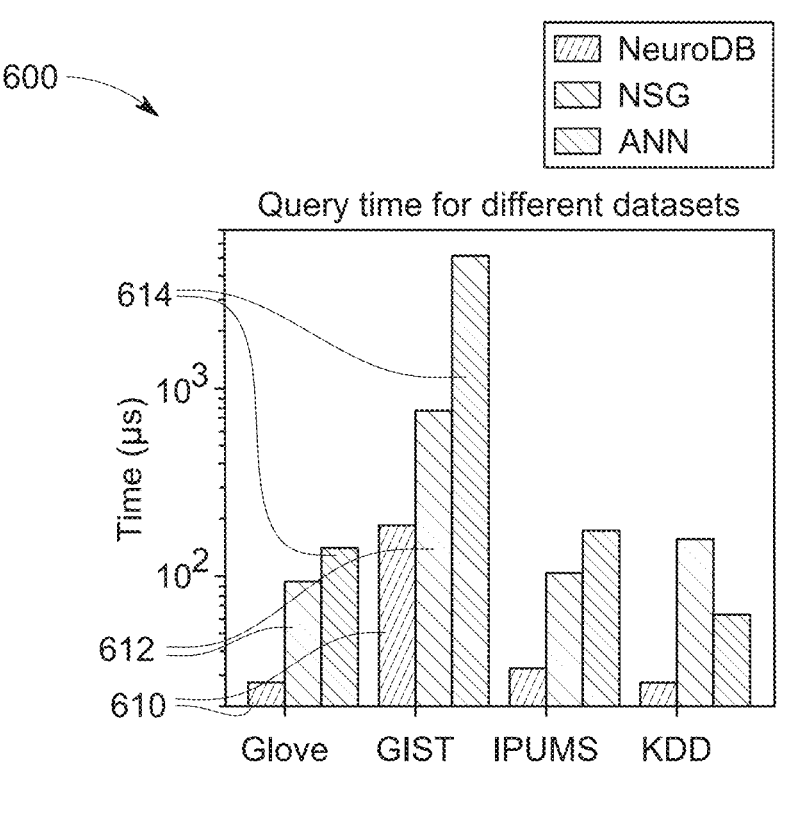
FIG. 6 is a graph showing a comparison of query times from the example neural network database against baseline known algorithms.

FIG. 6 is a graph 600 that shows the query time of the example neural network database in comparison with the ANN and NSG algorithms for the four different datasets in FIG. 4. One set of bars 610 shows the query times for the example neural network database. A second set of bars 612 shows the query times for the NSG algorithm. A third set of bars 614 shows the query times for the ANN algorithms. As may be seen in the graph 600, the example neural network database NeuroDB outperforms the other algorithms by an order of magnitude on all the datasets. Dimensionality has the most significant impact on query time, as all the algorithms took the longest on the GIST dataset. Furthermore, query time for the example NeuroDB changed very little for datasets with different sizes. Since the KDD dataset contained duplicate and near duplicate records, the distance to the nearest neighbor could be zero and relative error could be undefined. Thus, the error requirement is considered to be on mean absolute error for the reported result on the KDD dataset. For the remainder of the experiments in this section relating to the distance to k-th Nearest Neighbor Query, the GloVe dataset was used to study the impact of different parameters.

Figures 7A, 7B:
FIG. 7A shows a graph that plots relative errors against time from the example neural network database compared against baseline known algorithms.
FIG. 7B shows a graph that plots neighbor distance against query time from the example neural network database compared against baseline known algorithms.

FIG. 7A shows a graph 700 that plots relative errors against time. A trace 710 represents the errors from the example neural network database, a trace 712 represents the errors of the ANN algorithm, and a trace 714 represents errors of the NSG algorithm. The graph 700 shows the accuracy/time trade-off of the algorithms relative to the example neural network database. The NSG and ANN algorithms are plotted at different error levels, and as can be observed query time increases as lower error is required. For the example neural network database, NeuroDB, each point plotted in the plot 710 corresponds to a different neural network architecture. From left to right, the query time of the example NeuroDB increases because a larger network architecture is used. This reflects the use of a combination of increasing depth of the network as well as the width. Initially, as larger architectures are used, the ability of the model to learn increases and the accuracy improves. However, after a certain point, the model accuracy stops improving and even deteriorates. This can be attributed to two facts. First, as model size increases, it becomes more difficult to train the model (i.e., more training samples and more training iterations will be needed). Second, the model becomes more prone to over-fitting and may not perform well at evaluation time.

The example NeuroDB outperforms the NSG and ANN algorithms in the low accuracy regime by an order of magnitude. However, after a certain accuracy level it becomes difficult to learn a NeuroDB that learns the query with that accuracy. Thus, the benefit of the example NeuroDB can be seen when fast answers are required, but some accuracy can be sacrificed.

FIG. 7B shows a graph 720 that plots neighbor distance, k, against query time. A trace 730 represents the times from the example neural network database, a trace 732 represents the times of the ANN algorithm, and a trace 734 represents times of the NSG algorithm. The graph 720 shows the impact of k on query time. Generally, increasing k impacts query time for the conventional algorithms. However, k has no impact on the example neural network database, NeuroDB, because for any value of k the cost of using NeuroDB is just a forward pass of the neural network. However, the NSG and ANN algorithms need to find all the k nearest neighbors, and thus their performance deteriorates with higher k values. Better support for larger values of k is an advantage of using the example neural network database, NeuroDB, as it can find the distance to k-th nearest neighbor without unnecessary computations that the combinatorial methods perform to find all the k nearest neighbors.

Figures 7C, 7D:
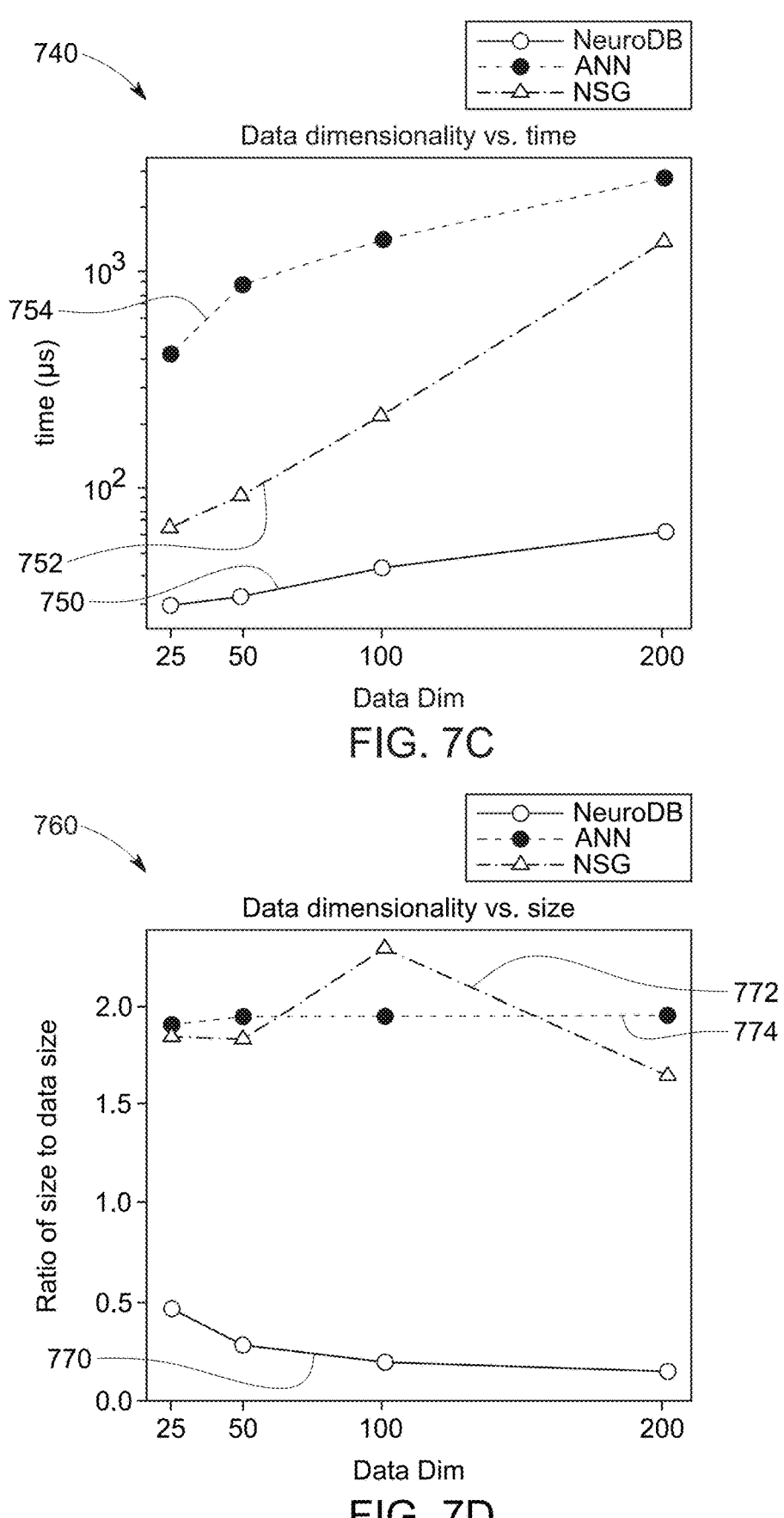
FIG. 7C shows a graph that plots data dimensionality against query time from the example neural network database compared against baseline known algorithms.
FIG. 7D shows a graph that plots neighbor distance against data size from the example neural network database compared against baseline known algorithms.

FIG. 7C shows a graph 740 that plots data dimensionality, d, against query time. A trace 750 represents the times from the example neural network database, a trace 752 represents the times of the ANN algorithm, and a trace 754 represents times of the NSG algorithm. The graph 750 shows the impact of increasing dimensionality on query time and space used. As may be seen in the graph 750, for larger dimensions, the performance of the NSG and ANN algorithms deteriorates but the performance of the example neural network database changes very little. The example NeuroDB outperforming the known NSG and ANN algorithms by more than an order of magnitude when d=200.

FIG. 7D shows a graph 760 that plots neighbor distance, k, against data size. A trace 770 represents the size ratios from the example neural network database, a trace 772 represents the size ratios of the ANN algorithm, and a trace 774 represents size ratios of the NSG algorithm. The graph 760 shows that the example neural network database, NeuroDB outperforms the conventional NSG and ANN algorithms by taking less space. The space consumption of the example neural network database as a proportion of data size decreases as d increases. In fact, the graph 760 shows that neural networks with a size less than the actual data size of a database are sufficient to calculate distance to the nearest neighbor query.

A second set of experiments related to range aggregate queries were performed. In this set of experiments, the same example neural network database, NeuroDB, architecture described above was used. In this set of experiments, the example neural network database was trained to learn to perform range aggregate queries for three aggregation functions, namely AVG, SUM and STD. No hyper-parameter tuning was performed for this set of experiments, but the same hyper-parameters that were used for distance to nearest neighbor experiments were used. This is to show that the example method even without query specific hyper-parameter tuning, can outperform query specific algorithms. As a consequence, the example neural network database NeuroDB can not only improve the performance of the systems, but can significantly save time when designing algorithms, as the same method can be adopted for different and unrelated query types.

Real, benchmark and synthetic datasets were used for evaluation in this set of experiments. FIG. 8 shows a table 800 of the three datasets (GMM, PM2.5, and TPC-DS) used for this set of experiments. The data size for each dataset is shown in the table 800. The PM2.5 dataset contains PM2.5 statistics for locations in Beijing. The PM2.5 dataset contains Fine Particulate Matter (PM2.5) measuring air pollution and other statistics (e.g., temperature) for locations in Beijing. PM2.5 was allowed to be the attribute aggregated. The Dew Point (DEWP), Pressure (PRES) or Temperature (TEMP) were considered as attributes for the range predicate. Here, the results only for the PRES attribute were reported as the performance of all algorithms on other attributes where similar.

TPC-DS is a synthetic benchmark dataset, with scale factors 1 and 10, respectively referred to as TPC1 and TPC10. Since range aggregate queries were studied, the store sales table only was considered. The net_profit as an aggregated attribute was used and range predicates on the quantity, wholesale_cost and sales_price attributes were considered.

Finally, to further study the impact of data distribution, synthetic data was generated from a Normal, Uniform and a Gaussian mixture model (GMM) with 100 and 10,000 components whose mean and co-variance are selected uniformly at random, respectively referred to as N, U, GMM2 and GMM4. GMMs are often used to model real data distributions. Unless otherwise stated, the results are reported on TPC1. For all datasets, unless otherwise stated, uniformly distributed queries were used. This can be thought of as a more difficult scenario for the example neural network database, NeuroDB as it requires approximating the query function equally well over all its domain. For a d-dimensional database, queries are 2×d-dimensional vectors, where for each dimension a minimum and maximum value is specified. In addition to query time and space used, the normalized absolute error for a query in the set of test queries, T, defined as $$\frac{\left|f_D(q) - \hat{f}_D(q, \theta)\right|}{\frac{1}{|T|}\sum_{q \in T}|f_D(q)|}$$

was reported. The error was normalized by average query result magnitude to allow for comparison over different data sizes when the results follow different scales. Finally, unless otherwise stated, the error for AVG aggregation function was reported, but SUM and STD were also considered.

The example neural network database was compared against DBEst, a state-of-the-art approximate query processing engine. The DBEst decomposes answering specific queries into regression and density estimation tasks and learns specific models for the tasks and outperforms known sampling based algorithms. The open-source implementation of DBEst was used. Hyper-parameter tuning was performed for each experiment, using the grid search method, which tries out different parameter values to find the best one. In these experiments, the DBEst performed much worse than the example neural network database, NeuroDB. As such, a sampling-based baseline designed specifically for range aggregate queries, referred to as TREE-AGG was implemented. In a pre-processing step and for a parameter k, the TREE-AGG sampled k data points from the database uniformly. Then, for performance enhancement and easy pruning, the TREE-AGG builds an R-tree index on the samples, which is well-suited for range predicates. At query time, by using the R-tree, finding data points matching the query is done efficiently, and most of the query time is spent on iterating over the points matching the predicate to compute the aggregate attribute required. To perform this step as fast as possible, the smallest value of k was found using the test query set. For a given error threshold, $\delta$, the minimum value of k was found experimentally such that the error on the test set falls below $\delta$ (using a binary search). Finally, $\delta$ was set to the error of DBEst, as the-state-of-the are algorithm, DBEst, is assumed to answer the queries with an acceptable error rate.

Figures 9A, 9B:
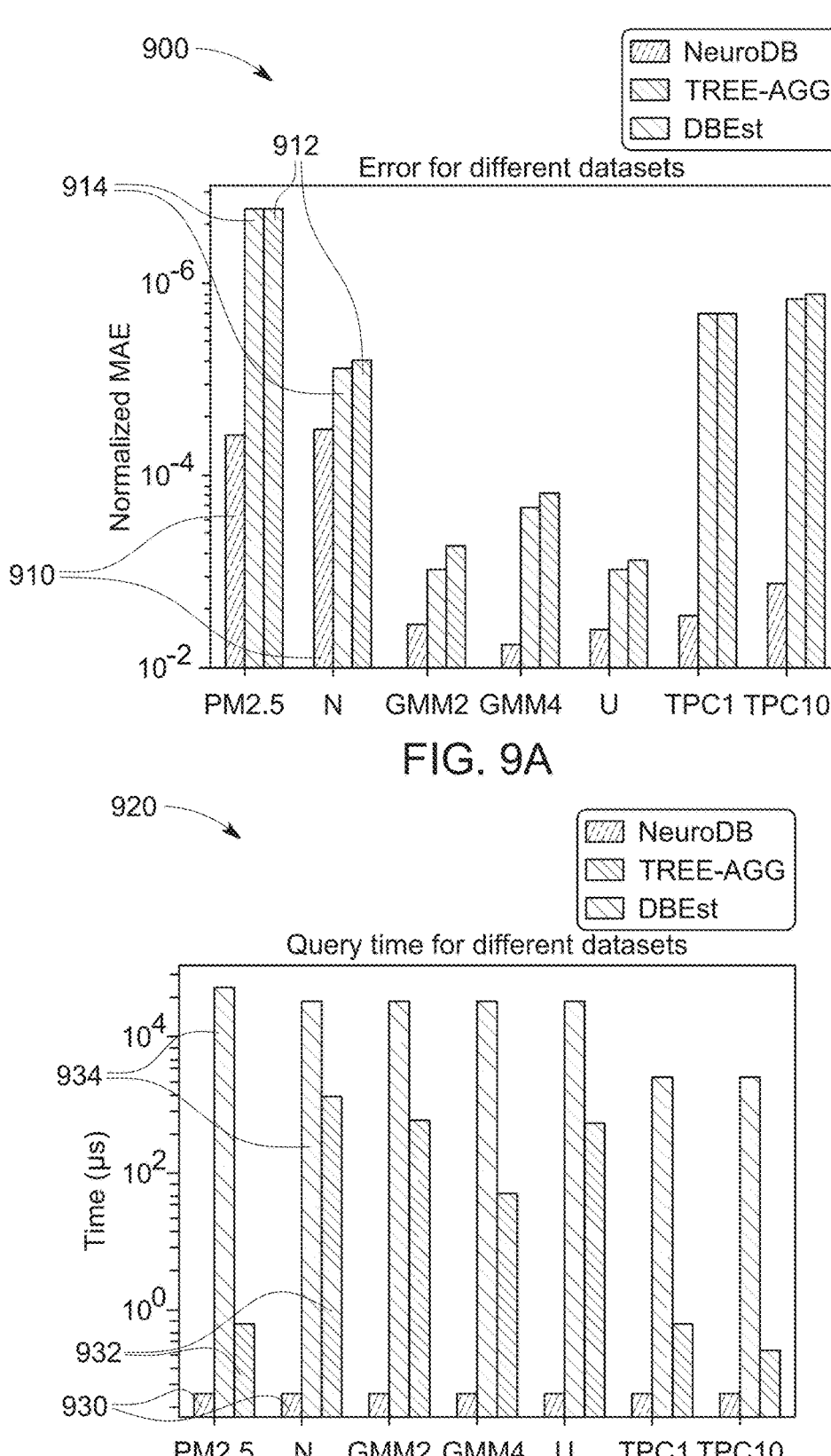
FIG. 9A shows a graph of errors of the example neural network database in comparison to baseline state of the art algorithms.
FIG. 9B shows a graph of query times of the example neural network database in comparison to baseline state of the art algorithms.

FIG. 9A is a graph 900 that shows the errors of the example neural network database in comparison with the TREE-AGG and DBEst engines for the three different datasets in FIG. 8. One set of bars 910 shows the errors for the example neural network database. A second set of bars 912 shows the errors for the TREE-AGG engine. A third set of bars 914 shows the errors for the DBEst engines. The example neural network database, NeuroDB provides a lower error rate than the baselines by an order of magnitude on all the datasets.

FIG. 9B is a graph 920 that shows the query times of the example neural network database in comparison with the TREE-AGG and DBEst engines for the three different datasets in FIG. 8. One set of bars 930 shows the queries for the example neural network database. A second set of bars 932 shows the queries for the TREE-AGG engine. A third set of bars 934 shows the queries for the DBEst engines. The graph 920 shows that the example neural network database, NeruoDB does this while providing multiple orders of magnitude improvement in query time. Overall, for both DBEst and NeuroDB the error rate of the algorithms depends on the data distribution, and is not correlated with data size. This is an artifact of learning, as the error in learning depends on whether patterns can be found or not. Furthermore, both NeruoDB and DBEst have relatively constant query time, as the query time in both cases is the time it takes to perform inferences on the models. Due to the use of small neural networks, the model inference time for the example NeuroDB is very small and in the order of few microseconds, while the modeling choices of DBEst leads to query time multiple orders of magnitude larger.

Figures 10A, 10B:
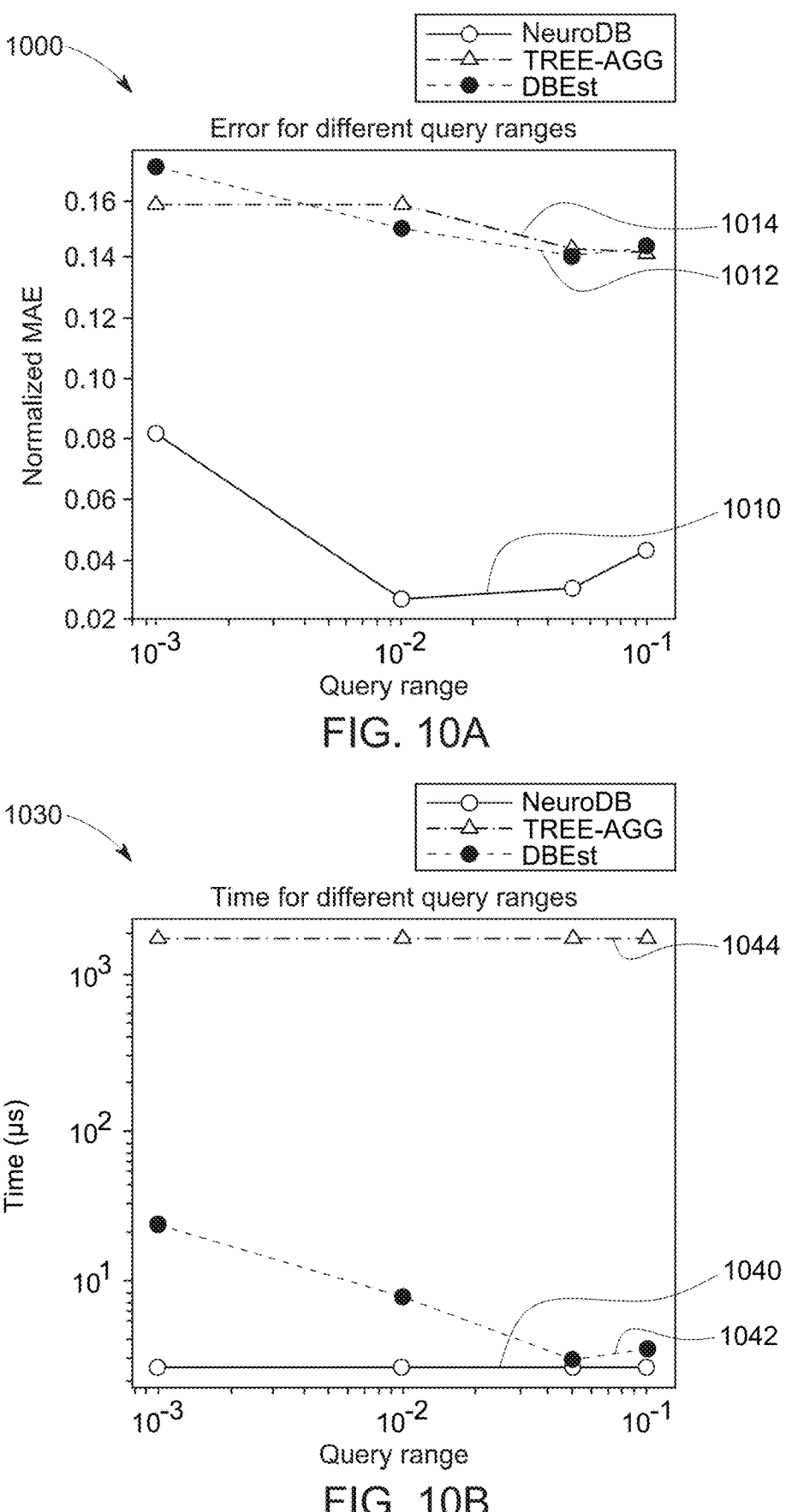
FIG. 10A shows a graph plotting errors against the query range of the example neural network database in comparison to baseline state of the art algorithms.
FIG. 10B shows a graph plotting query time against the query range of the example neural network database in comparison to baseline state of the art algorithms.

Experiments were conducted setting the query range to x percent of the query space, for $x \in \{0.1, 1, 5, 10\}$. FIG. 10A is a graph 1000 that plots the errors against the query range of the example neural network database in comparison with the TREE-AGG and DBEst engines for the three different datasets in FIG. 8. One plot 1010 shows the errors for the example neural network database. A second plot 1012 shows the errors for the TREE-AGG engine. A third plot 1014 shows the errors for the DBEst engine. FIG. 10B is a graph 1030 that plots the query time against the query range of the example neural network database in comparison with the TREE-AGG and DBEst engines for the three different datasets in FIG. 8. One plot 1040 shows the query times for the example neural network database. A second plot 1042 shows the query times for the TREE-AGG engine. A third plot 1044 shows the query times for the DBEst engine. The example neural network database NeuroDB outperforms the other algorithms for all ranges. Accuracy of the example neural network database, NeuroDB, improves when the range increases, since for larger ranges the example NeuroDB can learn overall distribution of datapoints rather than memorizing where exactly each data point is, which is required for smaller ranges.

Figure 11A:
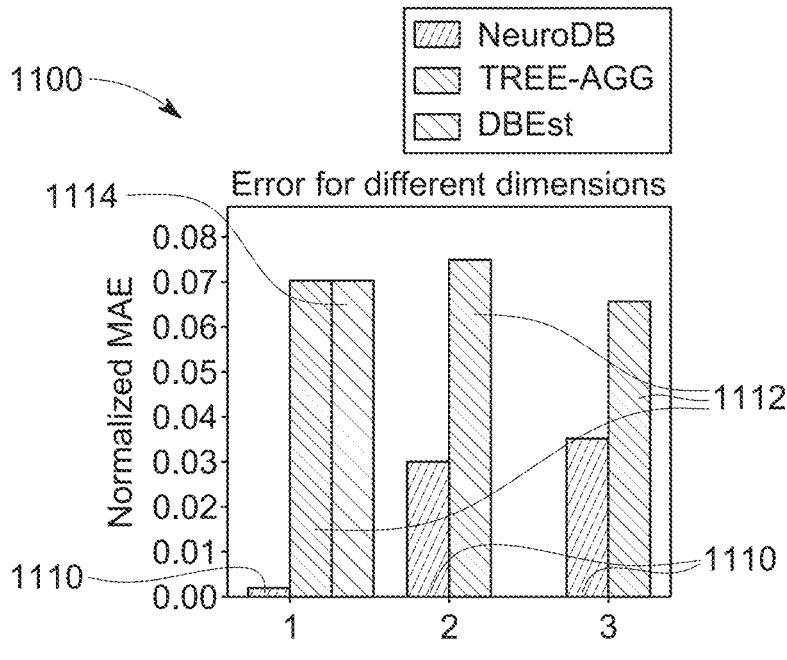
FIG. 11A shows a graph plotting errors against different dimensions of the example neural network database in comparison to baseline state of the art algorithms.
Figure 11B:
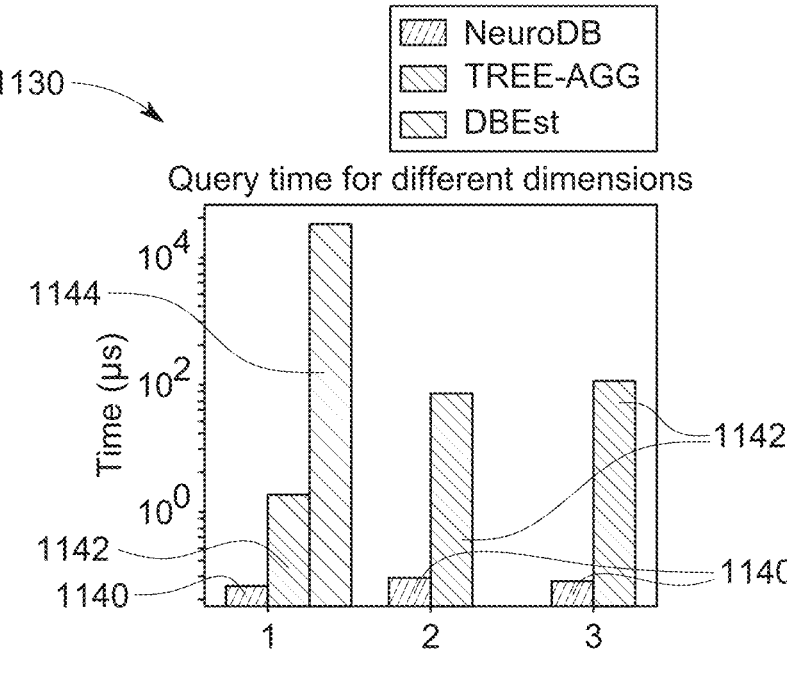
FIG. 11B shows a graph plotting query time against different dimensions of the example neural network database in comparison to baseline state of the art algorithms.

The set of experiments also examined the impact of dimensionality, d on query time. FIG. 11A is a graph 1100 that plots the errors against different dimensions of the example neural network database in comparison with the TREE-AGG and DBEst engines for the three different datasets in FIG. 8. One set of bars 1110 shows the errors for the example neural network database for the different dimensions. A second set of bars 1112 shows the errors for the TREE-AGG engine for the different dimensions. A third bar 1114 shows the errors for the DBEst engine for the one dimension. FIG. 11B is a graph 1130 that plots the query time against the different dimensions of the example neural network database in comparison with the TREE-AGG and DBEst engines for the three different datasets in FIG. 8. One set of bars 1140 shows the query times for the example neural network database for the different dimensions. A second set of bars 1142 shows the query times for the TREE-AGG engine for the different dimensions. A third bar 1144 shows the query times for the DBEst engine for one dimension. The dimensionality of the range predicate was varied from one to three by increasing the attributes used in the predicate. The DBEst source code did not contain the implementation for dimensionality larger than one, and thus was not included. The performance of the example neural network database, NeuroDB, even on the 3-dimensional data is better than the performance of DBEst on one dimensional data. Performance of TREE-AGG deteriorated with dimensionality, which can be due to, first, difficulty in indexing, and second, that more samples are required to obtain similar accuracy. Although the query time of the example NeuroDB remains similar, the accuracy worsens for larger dimensionality. This can be due to larger training size needed for higher dimensional data to achieve the same accuracy, while the training procedure is the same for all dimensions.

Figure 12A:
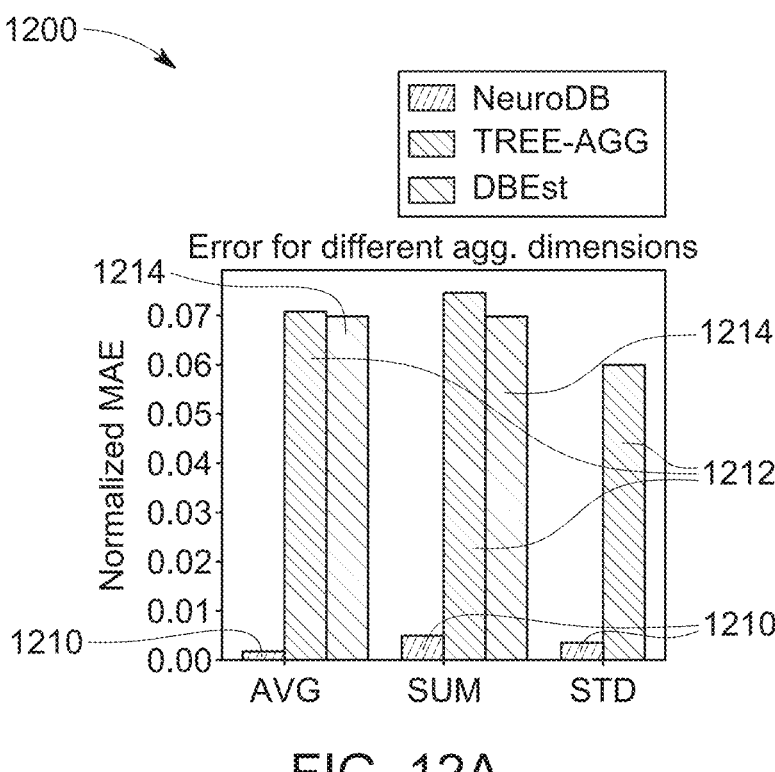
FIG. 12A shows a graph plotting errors against different aggregate functions of the example neural network database in comparison to baseline state of the art algorithms.
Figure 12B:
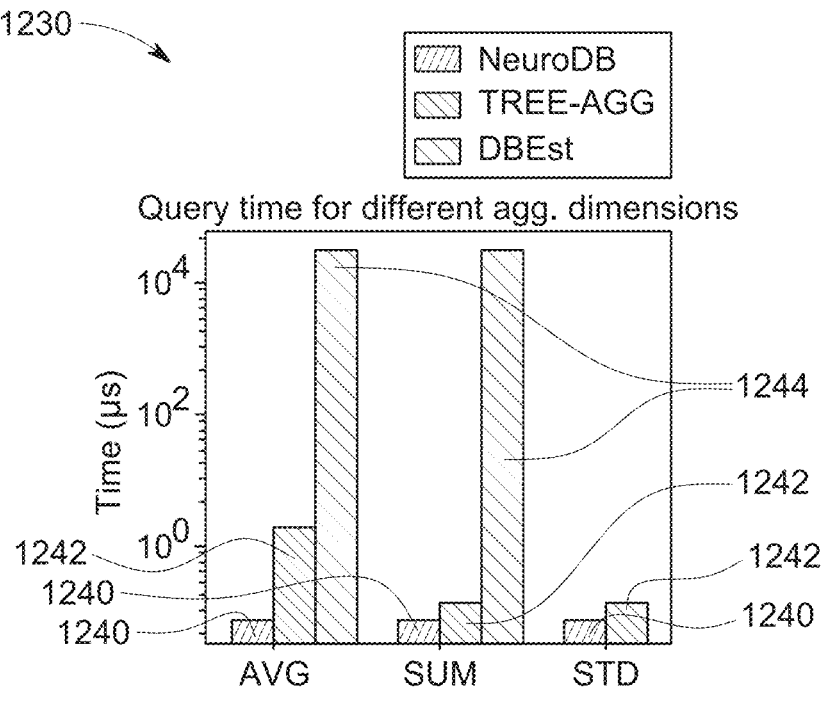
FIG. 12B shows a graph plotting query times against different aggregate functions of the example neural network database in comparison to baseline state of the art algorithms.

The impact of different aggregate functions AVG, SUM, and STD was also examined. FIG. 12A is a graph 1200 that plots the errors against the different aggregate functions of the example neural network database in comparison with the TREE-AGG and DBEst engines for the three different datasets in FIG. 8. One set of bars 1210 shows the errors for the example neural network database for the different aggregate functions. A second set of bars 1212 shows the errors for the TREE-AGG engine. A third set of bars 1214 shows the errors for the DBEst engine for the different aggregate functions. FIG. 12B is a graph 1230 that plots the query time against the different aggregate functions of the example neural network database in comparison with the TREE-AGG and DBEst engines for the three different datasets in FIG. 8. One set of bars 1240 shows the query times for the example neural network database for the different aggregate functions. A second set of bars 1242 shows the query times for the TREE-AGG engine for the different aggregate functions. A third set of bars 1244 shows the query times for the DBEst engine for different aggregate functions. As shown in the graphs 1200 and 1230, the example neural network database, NueroDB was able to outperform the algorithms for all aggregation functions. The DBEst source code did not contain the implementation for STD and thus was not included for that aggregation function in the graph 1230.

A third set of experiments was conducted for learned patterns for nearest neighbor queries. A smaller dataset was used to study how the example NeuroDB performs nearest neighbor queries. In practice, the example NeuroDB needs larger models and more training samples to be able to answer nearest neighbor queries accurately for large high-dimensional datasets. This is because the output space for nearest neighbor query is $R^d$, so the example NeuroDB needs to learn d different functions (one for each dimension). This shortcoming may be alleviated with the advancement of specialized training hardware and inference of neural networks.

Figure 13A:
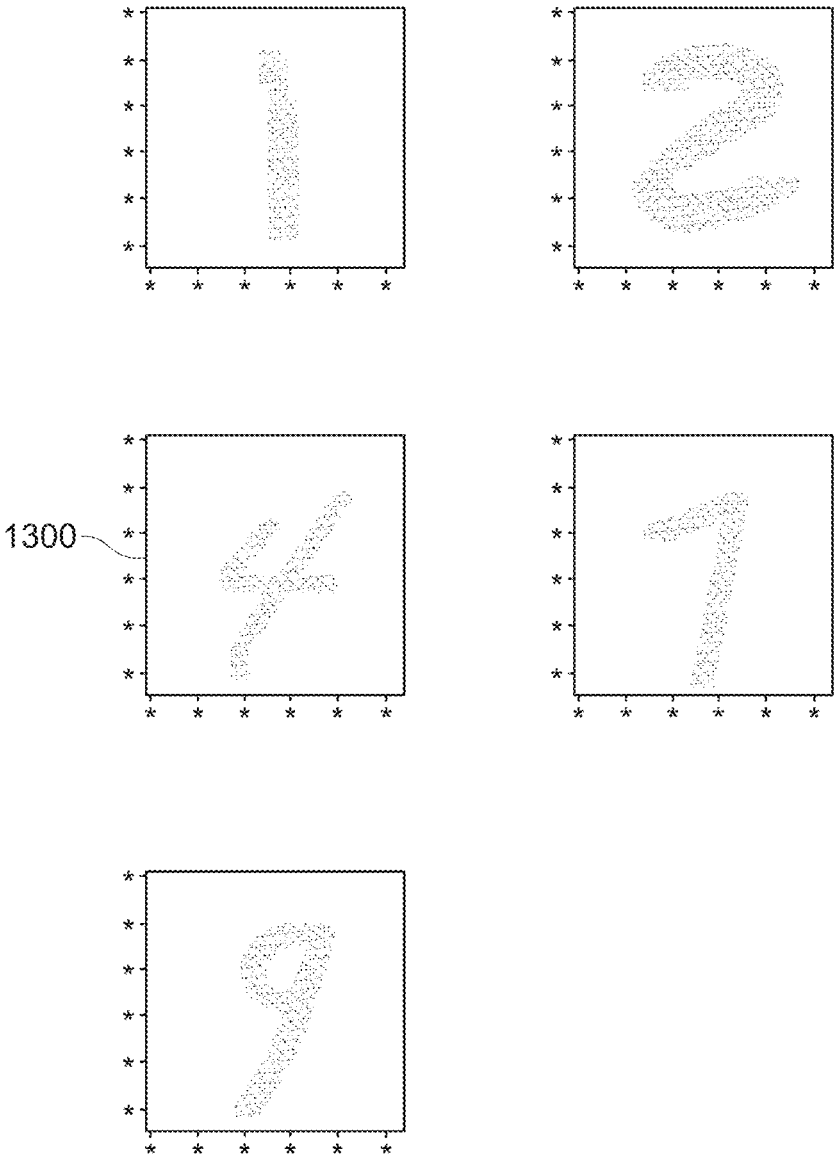
FIG. 13A is a set of images in a database used in a third set of experiments relating to learned patterns for nearest neighbor queries.

This set of experiments used the mnist dataset, a data set of images of handwritten digits, represented as 28×28 gray-scale pixel handwritten digits. Each image has 784 dimensions. A variational auto-encoder (VAE) was used to first learn a 30-dimensional representation of each image. Then, databases, D, containing 10 different digits were created. The remaining images in the mnist dataset were used as training and testing sets. Five of the digit images 1300 in the database are shown in FIG. 13A. The database contains five more digit images not shown.

This set of experiments was directed toward: (1) gaining insight about the output of the example NeuroDB; and (2) demonstrate the potential of NeuroDB in assisting machine learning methods perform better feature learning. The set of experiments show the potential of the example NeuroDB in helping VAEs learn better features. The query can be thought of as a style transfer task where the goal is to replace an image with the same digit in D. This can be done with a nearest neighbor query if a good representation of each image is learned.

Figure 13B:
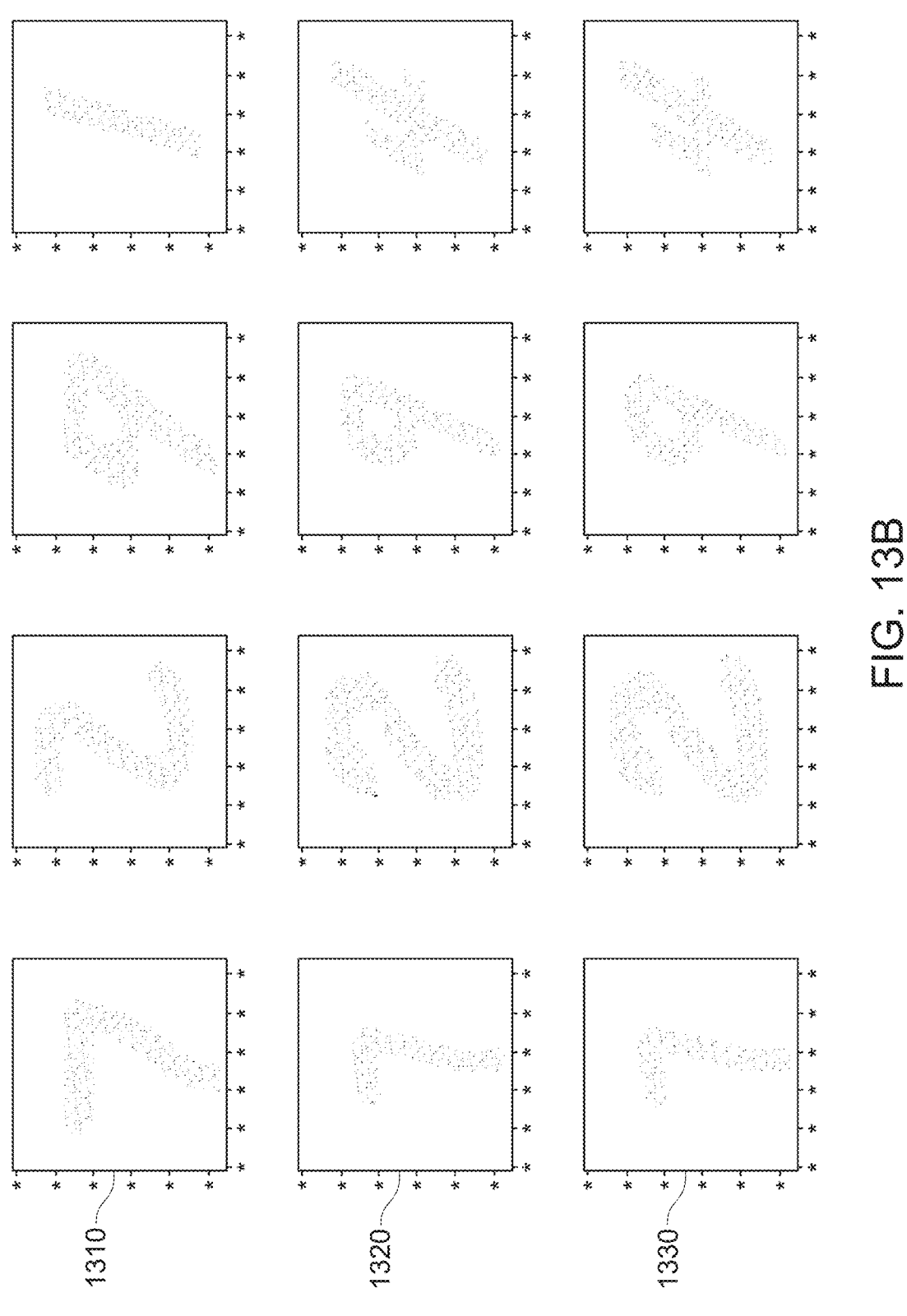
FIG. 13B are the results of the third set of experiments for queries and the corresponding outputs of the example neuro network database and outputs of a VAE.

FIG. 13B shows multiple input queries in a first row 1310, their corresponding output of NeuroDB in a second row 1320, and the true nearest neighbor shown in a third row 1330. The images in FIG. 13B are plotted as the output of the VAE. As shown by the rows 1320 and 1330, the output of the example NeuroDB and the true results are visually indistinguishable when decoded, even though their representations are not exactly the same. For instance, in the first row 1310, the relative error is 0.026. This shows that small approximation error can be tolerated in practice.

In the fourth column of FIG. 13B, the digit 1 is mapped to the digit 4. This can be attributed to the fact that the VAE has not learned a good representation for the digit 1, and has mapped it to a location closer to the digit 4 in the feature space. This is not caused by the error in the example NeuroDB as performing nearest neighbor search with no approximation error (shown in the third row 1330) also returns digit 4 and not 1. That is, the nearest neighbor query shows the problem in the feature learning.

The example NeuroDB may be useful in fixing this issue in feature learning. NeuroDB provides a differentiable nearest neighbor query operator, and thus can be back-propagated through (in contrast with combinatorial methods that perform nearest neighbor search). For instance, a loss on distance to nearest neighbor, which can be calculated by the example neural network database, can enforce the representations being similar to the digits in the database. Another simple potential use case is to use the example neural network database as part of the encoder, that is, to consider the output of the neural network database as the final encoding. If good enough representations are learnt by the VAE, the example neural network database can help create a unique representation for each digit, which can make a downstream classification task easier.

The set of experiments was also directed to determining whether the example neural network database learned any interesting patterns between the input and its nearest neighbor. To do so, a similar experiment was performed as that described above, but the digit 9 was removed from the dataset during training. That is, the digit 9 is removed from the database as well as the training set. The rest of the training is done as before. At test time, what the neural network outputs when digit 9 is being input was examined.

Figure 13C:
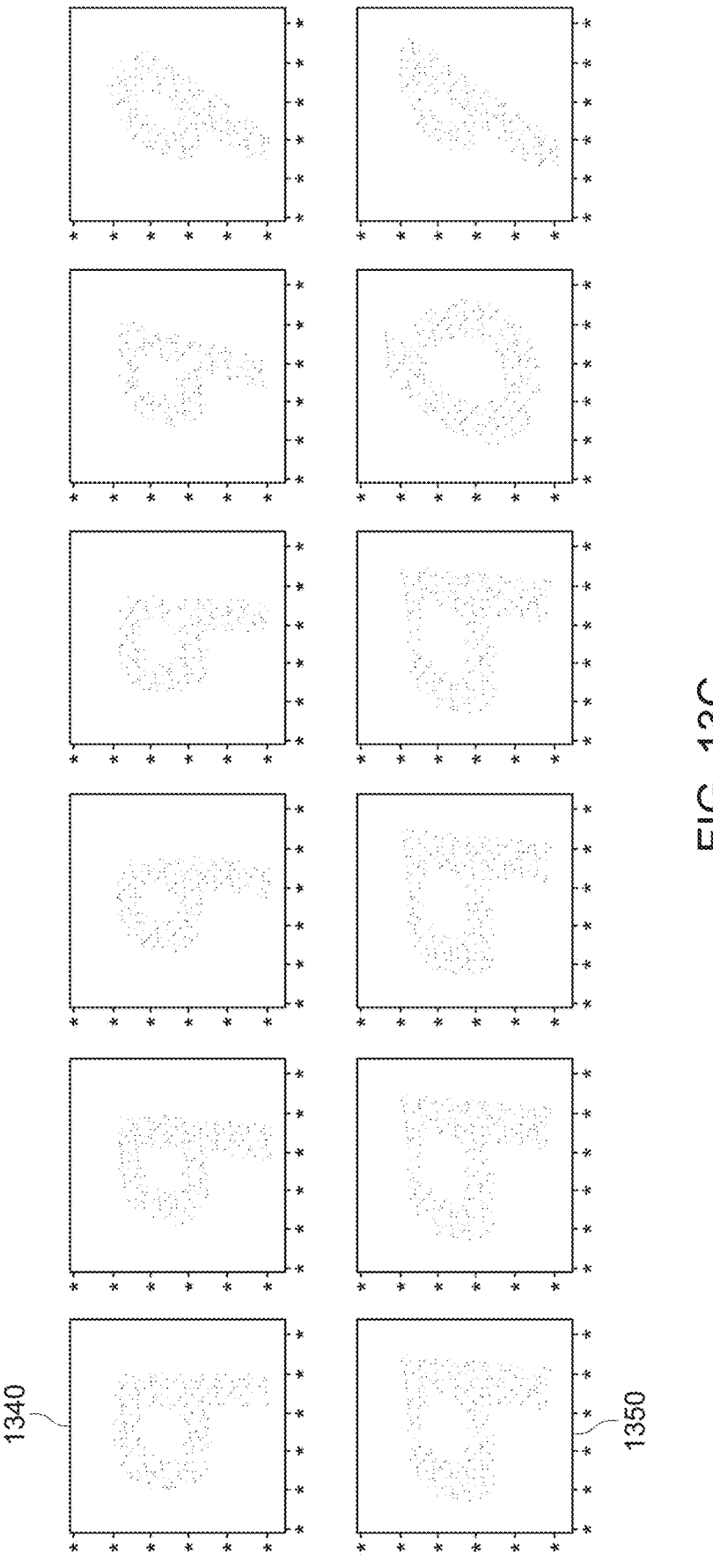
FIG. 13C are the results of the third set of experiments conducted where data was removed from the training set.

FIG. 13C shows the results of this set of experiments. A first row 1350 shows the queries and a second row 1360 shows the output of the example neural network database. The example neural network database was able to output a digit 9, when a 9 was input to the model. Although this does not always happen such as in the tests recorded in the last two columns of FIG. 13C, the fact that it is possible is in itself significant. This is because a combinatorial method used to answer the query will always output another digit, i.e., a digit from 0-8 given the digit 9 as a query because 9 is not in the database, and the output of the combinatorial method is always in the database. In contrast, the example NeuroDB learned a mapping for the nearest neighbor query, which is general enough so that a digit 9 as an input is still mapped to a digit 9. This behavior is beneficial when there is missing data in the database. This also shows that the example NeuroDB is not merely memorizing training instances, but rather learning generalizable patterns. Another interesting observation is that the digit 9s that are output by the model are similar (e.g., the images depicted in the first 4 columns of FIG. 13C).

Figure 14:
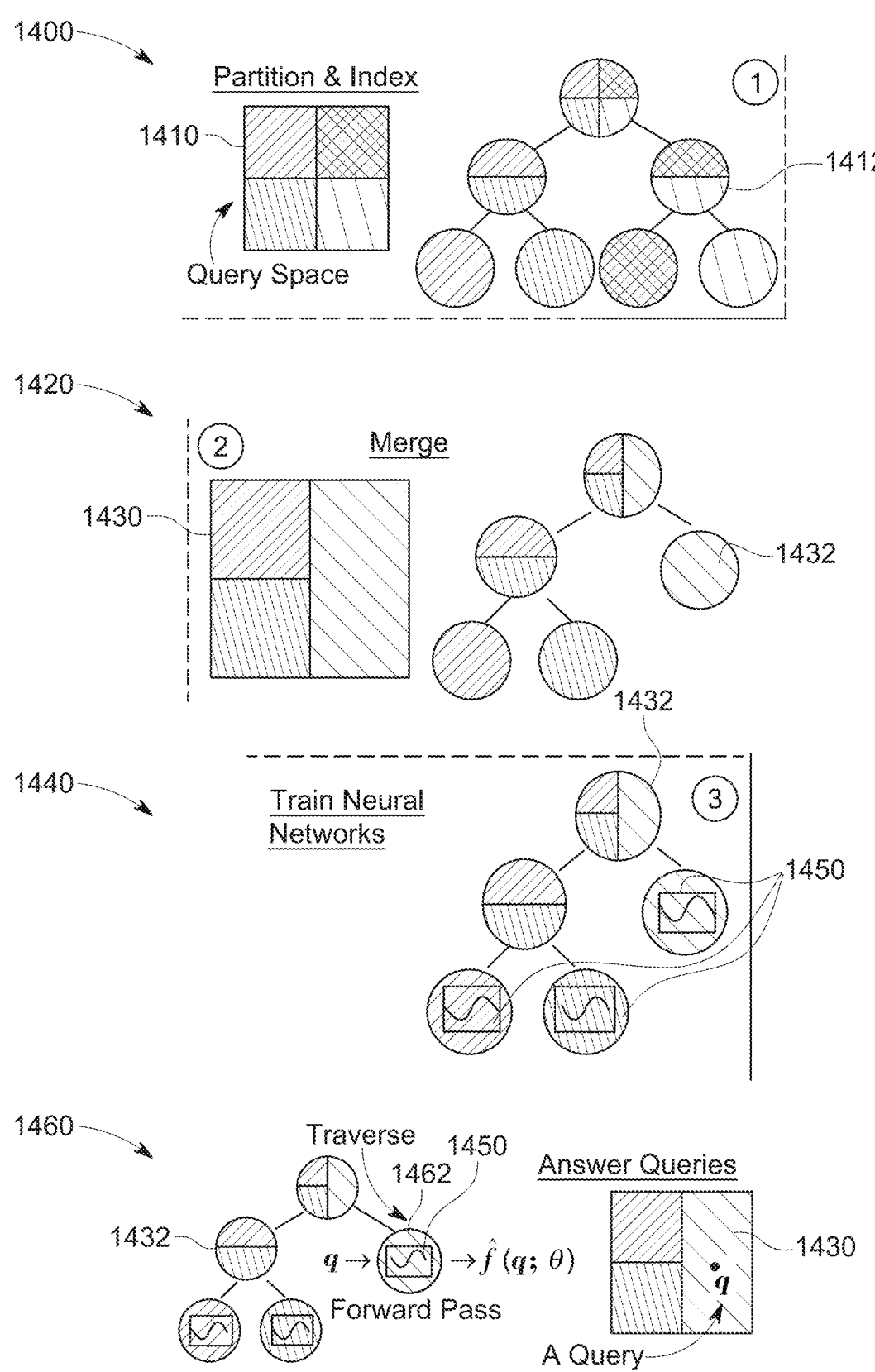
FIG. 14 shows a process of training another example neural network database directed toward answering range aggregate queries.

Another example of a complexity-aware neural network database framework is termed NeuroSketch. The example NeuroSketch neural network database design is based on allocating more model capacity to queries that are more difficult to improve performance. Similar to the above examples, the query space is partitioned and independent neural networks are trained for each partition. The partitioning allows diverting model capacity to harder queries, which may be quantified by methods such as data distribution and query dependent error (DQD). By creating models specialized for a specific part of the query space, query specialization allows control of how model capacity is used across query space. FIG. 14 shows the process of creating the example NeuroSketch neural network database. During a pre-preprocessing step 1400, a query space 1410 is queried and indexed using a kd-tree 1412. The partitioning is done based on a query specialization principle, with the goal of training a specialized neural network for different parts of the query space. A second step 1420 is merging nodes of the kd-tree 1412 to account for the complexity of the underlying function in the partitioning. Thus, a modified space 1430 is created by merging certain partitions. The nodes of the kd-tree 1412 that are easier to answer are merged, so that the model only has to specialize for the certain parts of the space that are estimated to be more difficult to produce a modified kd-tree 1432. In a third step 1440, neural networks 1450 are trained for all of the remaining leaves of the modified kd-tree 1432. Once the neural networks are trained, the framework may be executed to respond to queries (1460). Thus, to answer queries at query time, the modified kd-tree 1432 is traversed to find the leaf node 1462 that a query falls inside (corresponding to the partition in the query space 1430). The routine then performs a forward pass of the neural network 1450 associated with leaf node to produce an output to the query.

The example NeuroSketch framework used a training query set $Q \subseteq \mathcal{Q}$. Q was sampled from $\mathcal{Q}$ according to a workload distribution. The training query set may also be a uniform sample in the absence of any workload information. The training does not require access to workload information but can take advantage of the query workload if available.

To partition the query space, partitions were chosen that were smaller where the queries are more frequent and larger where they were less frequent. This allows diverting more model capacity to more frequent queries, thereby boosting their accuracy if workload information is available. This is achieved by partitioning the space such that all partitions are equally probable.

To do so, a kd-tree was built on the query set, Q, where the split points in the kd-tree can be considered as estimates of the median of the workload distribution (conditioned on the current path from the root) along one of its dimensions. The kd-tree was built by specifying a maximum height, h, and splitting every node until all leaf nodes have height h, which creates $2^h$ partitions. Splitting of a node N is performed based on median of one of the dimensions of the subset N·Q of the queries, Q, that fall in N. FIG. 15A shows a code listing of an algorithm to build the kd-tree.

To build an index with height h rooted at a node, $N_{root}$ (note that $N_{root} \cdot Q = Q$), termed partition\_&\_index ($N_{root}$, h, 0). Other partitioning methods (e.g., clustering the queries to perform partitioning) are also possible, but the kd-tree is a simple practical solution with little overhead that performed well.

Some of the initial kd-tree leaf nodes were merged using a data distribution and a query dependent error (DQD) bounding method. The bound uses the Lipschitz constant of the distribution query function to provide a high probability bound on the error of the neural network when answering queries. Since the Lipschitz constant of the distribution query function (LDQ) as a measure of function complexity is difficult to measure, average query function change (AQC) is used as a proxy. FIG. 15B is a code listing for an algorithm to merge partitions using AQC. At each iteration, the approximation complexity for the leaf nodes was measured in line 3 of FIG. where the approximation complexity, $AQC_N$ for a leaf node Nis calculated based on queries that fall in the node N. Then, the node with the smallest $AQC_N$ was marked for merging. When two sibling leaf nodes are marked, they are merged together, as shown in line 8 of FIG. 15B. The process continues until the number of remaining leaf nodes reaches the desired threshold. In practice, the quantity $AQC_N$ is correlated with the error of the neural networks, which empirically justifies this design choice.

An independent model is trained for each of the remaining leaf nodes after merging similar nodes. For a leaf node, N, the training process is a typical supervised learning procedure and shown in a code listing for a supervised learning algorithm as shown in FIG. 15C. The answer to queries for training, used in line 4 of FIG. 15C, can be collected through any known algorithm, where a typical algorithm iterates over the points in the database, is pruned by an index, and for a candidate data point checks whether the data point matches the RAQ predicate or not. This is a preprocessing step and is only performed once to train the example model. The process is parallelizable across training queries if preprocessing time is a concern. Furthermore, if the data is resident on a storage device, partial SUM/COUNT answers may be kept for each training query while scanning data from the storage device, so a single scan of data is sufficient (similar to building disk-based indexes) to collect training query answers. Once trained, the example NeuroSketch is much smaller in size than the database and thus requires smaller storage space. The example NeuroSketch framework will be much faster than solutions requiring larger space on storage devices. In this example, the Adam optimizer was used for training a fully connected neural network for each of the partitions. The architecture is the same for all the partitions and consists of $n_l$ layers, where the input layer has dimensionality d, the first layer consists of $l_{first}$ units, the next layers have $l_{rest}$ units and the last layer has 1 unit. Relu activation was used for all layers except the output layer. $n_l$, $l_{first}$ and $l_{rest}$ are hyper-parameters of the example model. Although approaches in neural architecture search can be applied to find the hyperparameters, such approaches are computationally expensive. Instead, a grid search was performed to find the hyper-parameters so that the example NeuroSketch satisfies space and time constraints while maximizing its accuracy.

FIG. 15D shows code for an algorithm executed using the example NeuroSketch framework to answer a query, q. First, the kd-tree is traversed to find the leaf node that the query q falls into. The answer to the query is determined from a forward pass of the neural network corresponding to the leaf node.

The example NeuroSketch can be used for more general RAQs than the above examples. An RAQ consists of a range predicate, and an aggregation function AGG. Range predicates can be represented by a query instance q, and a binary predicate function, $P f(q, x)$, that takes a point in the database, x, $x \in D$, and the query instance q as inputs, and outputs whether x matches the predicate or not. Then, given a predicate function and an aggregation function, range aggregate queries can be represented by the query function $f_D(q)=AGG (\{x:x\in D, P_f(x, q)=1\})$. One representation of RAQs is where q can be defined as lower and upper bounds on the attributes and (q, x) defined as the WHERE clause. Another definition is where $P f(q, x)=x[1]>x[0]\times q[0]+q[1]$, so that $P f(q, x)$ and q define a half-space above a line specified by q. For many applications, WHERE clauses in SQL queries are written in a parametric form such as WHERE $x_1>$?param1 OR $x_2>$?param2, where ?param is the common SQL syntax for parameters in a query. Such queries can be represented as query functions by setting q to be the parameters of the WHERE clause.

Possible RAQs correspond to various query functions and the example NeuroSketch learns different models for different query functions. This follows the query specialization design principle, where a specialized model is learned to answer a query function well. A query processing engine can be used to decide which query functions to use the example NeuroSketch for. This can happen both on the fly, when answering queries, and during database maintenance. During database maintenance, a DQD bound can be used to decide which queries, the example NeuroSketch should be built from such as queries with small LDQs. Moreover, after the example NeuroSketch is built for a query function, a DQD bound can be used to decide whether to use NeuroSketch for a specific query instance or to use the database itself on the fly. For instance, queries with large ranges that the example NeuroSketch answers accurately according to the DQD bound can be answered by the example NeuroSketch framework, while queries with smaller ranges can be asked directly from the database.

Figure 16A:
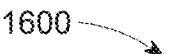
FIG. 16A is a table of datasets used to conduct experiments on the example neural network database of FIG. 14.
Figure 16B:
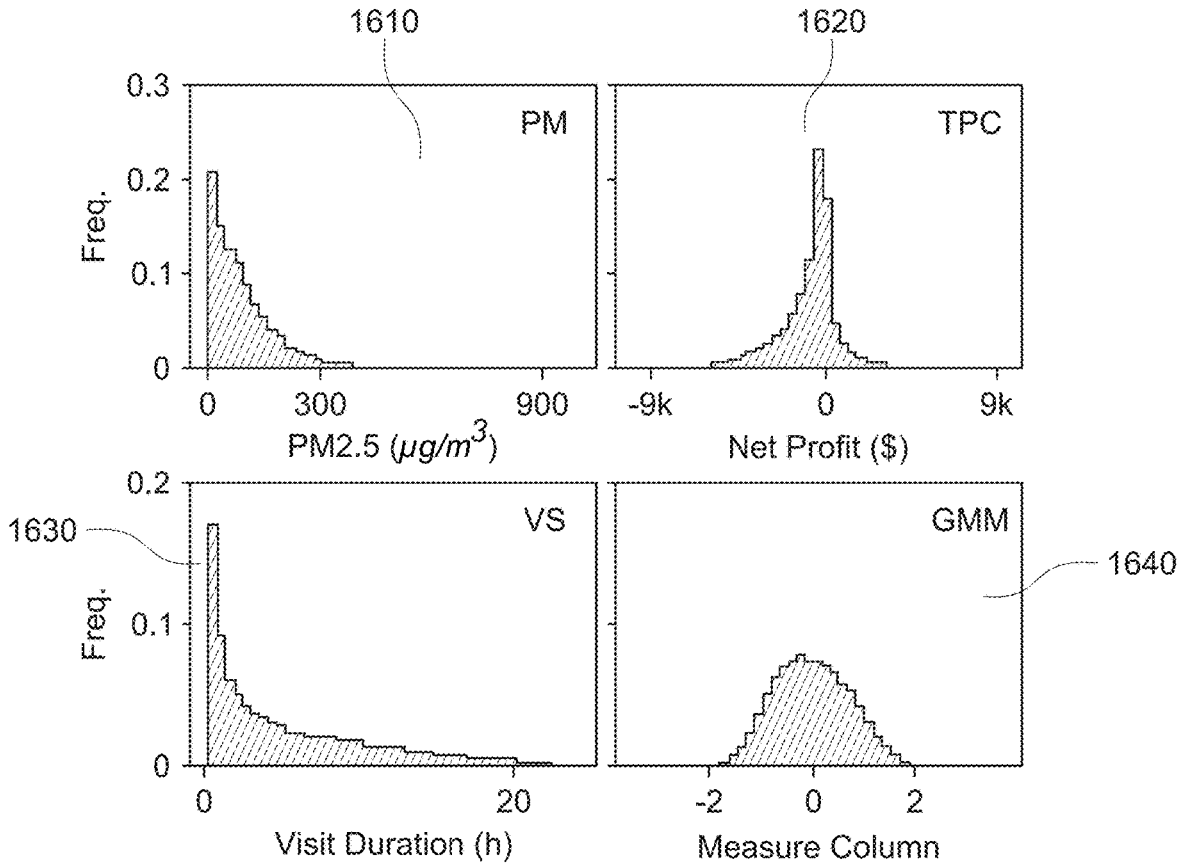
FIG. 16B is a series of histograms showing measured column values for datasets in FIG. 16A used in the experiments.

Another set of experiments were conducted to evaluate the example NeuroSketch framework using the same physical hardware described above. FIG. 16A is a table 1600 that shows the datasets, number of points, and dimensions, used in this set of experiments. The datasets include the PM2.5 and TPC-DS datasets described above, as well as the Veraset (VS) dataset and a GMM dataset. FIG. 16B shows histograms 1610, 1620, 1630, and 1640 of measured column values for the respective PM, TPC, PM2.5, and GMM datasets used in the experiments. For the PM2.5 dataset, the attribute PM2.5 was used as the measure attribute, the attribute whose average value is calculated. For TPC-DS since RAQs are studied, the numerical attributes in store sales table are used as the dataset, and net_profit is used as the measure attribute. The Veraset dataset contains anonymized location signals of cell phones across the US collected by Veraset, a data-as-a-service company. Each location signal contains an anonymized id, timestamp, and the latitude and longitude of the location. Stay point detection was performed on this dataset for removing location signals when a person is driving. Extracted location visits where a user spent at least 15 minutes were determined as well as recording the duration for each visit. 100,000 of the extracted location visits in downtown Houston were sampled to form the dataset used in the experiments, which contains three columns: latitude, longitude and visit duration. Visit duration was the measure attribute. The GMMs dataset was used for studying data dimensionality with synthetic 5, 10, and 20 dimensional data from Gaussian mixture models (GMM) (100 components, random mean and co-variance), referred to as G5, G10 and G20. GMMs are often used to model real data distribution.

This set of experiments considered query functions consisting of AVG, SUM, STDEV (standard deviation) and MEDIAN aggregation functions together with two different predicate functions. The set of experiments show the performance on the predicate function defined by the WHERE clause. Up to three active attributes were considered in the predicate function. To generate a query instance with r active attributes, r activate attributes from a total of d possible attributes were uniformly selected at random. Then, for the selected active attributes, a range was randomly generated. Unless otherwise stated, the range for each active attribute was uniformly distributed. This is a more difficult scenario for the example NeuroSketch as it requires approximating the query function equally well over all its domain, while also giving a relative advantage to other baselines, since they are unable to utilize the query distribution. Unless otherwise stated, for all datasets except Veraset, results for one active attribute were reported and the AVG aggregation function was used. For Veraset, the results setting latitude and longitude as active attributes were reported.

In addition to query time and space used, the normalized absolute error for a query in the set of test queries, T, defined as:

$$\frac{|f_D(q) - \hat{f}_D(q, \theta)|}{\frac{1}{|T|}\sum_{q \epsilon T}|f_D(q)|}$$

It was ensured that none of the test queries were in the training set. The error was normalized by average query result magnitude to allow for comparison over different data sizes and datasets when the results follow different scales.

DBEst and DeepDB, state-of-the-art model-based AQP engines, were used as baselines for the set of experiments. Both existing algorithms learn data models to answer RAQs. Open-source implementations of DBEst and DeepDB were used. A gird search on the DBEst MDN architecture (number of layers, layer width, number of Gaussian components) was performed and the DBEst architecture was optimized per dataset. The RDC threshold for each dataset was optimized for the DeepDB.

The publicly available implementation of VerdictDB was used as the sampling-based baseline. The sampling-based baseline designed specifically for range aggregate queries, TREE-AGG, described above was also used. For both TREE-AGG and VerdictDB, the number of samples was set so that the error is similar to that of DeepDB.

In this set of experiments, the training of the example NeuroSketch framework was performed in Python 3.7 and Tensorflow 2.1 using a GPU. Models were saved after training. For evaluation, a separate program written in C++ and running on a CPU loads the saved model, and for each query performs a forward pass on the model. Model evaluation was performed with C++ code on a CPU, without any parallelism for any of the algorithms. Unless otherwise stated, model depth was set to 5 layers, with the first layer consisting of 60 units and the rest of 30 units. The height of the kd-tree was set to 4, and parameter s=8 so that the kd-tree has 8 leaf nodes after merging.

Figure 17A:
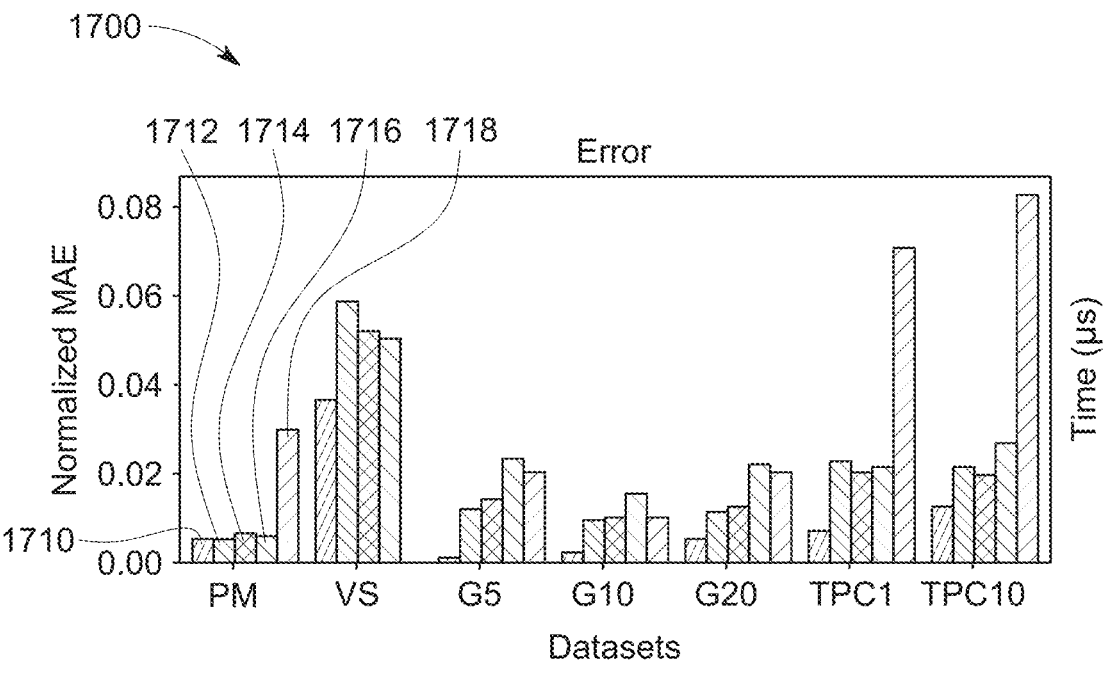
FIG. 17A is a graph that plots normalized error for the example neural network database in comparison to baseline state of the art algorithms for the datasets.

FIG. 17A is a graph 1700 that plots the normalized mean absolute error (MAE) for each of the datasets, PM2.5, Veraset (VS), G5, G10, G20, TPC1, and TPC10 for the baseline algorithms and the example Neurosketch framework. Bars 1710 represent the results of the Neurosketch, bars 1712 represent the results of the DeepDB, bars 1714 represent the results of the TREE-AGG, bars 1716 represent the results of VerdictDB, and bars 1718 represent the results of the DBEst. The graph 1700 shows that the example NeuroSketch framework provides a lower error rate than the baselines.

Figure 17B:
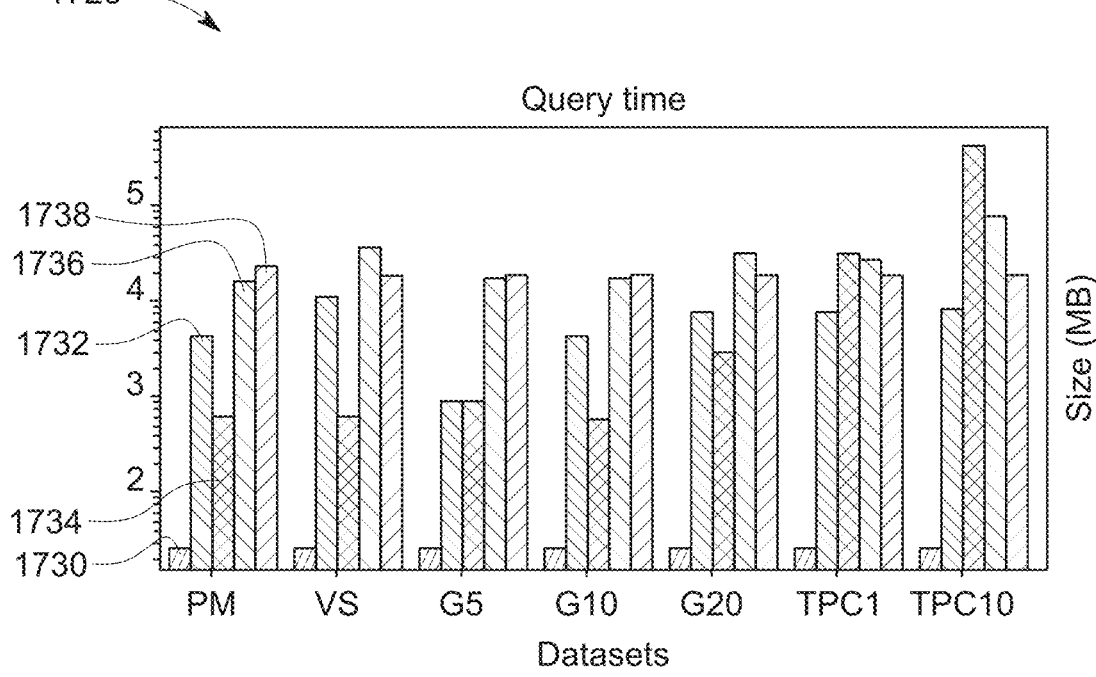
FIG. 17B is a graph that plots query time for the example neural network database in comparison to baseline state of the art algorithms for the datasets.

FIG. 17B is a graph 1720 that plots the query time for each of the datasets, PM2.5, Veraset (VS), G5, G10, G20, TPC1, and TPC10 for the baseline algorithms and the example Neurosketch framework. Bars 1730 represent the results of the Neurosketch, bars 1732 represent the results of the DeepDB, bars 1734 represent the results of the TREE-AGG, bars 1736 represent the results of VerdictDB, and bars 1738 represent the results of the DBEst. The graph 1720 shows that the example NeuroSketch achieves the results in FIG. 17A while providing multiple orders of magnitude improvement in query time. The example NeuroSketch framework has a relatively constant query time because, across all datasets, the architecture only differs in its input dimensionality, which only impacts number of parameters in the first layer of the model and thus changes model size by very little. Due to the use of small neural networks, the model inference time for the example NeuroSketch framework is very small and in the order of few microseconds, while DeepDB and DBEst answers queries multiple orders of magnitude slower. DBEst does not support multiple active attributes and thus its performance is not reported for the VS database. The results on G5 to G20 show the impact of data dimensionality on the performance of the algorithms. For the example NeuroSketch, the error increases as dimensionality increases. A similar impact can be seen for DeepDB, manifesting itself in increased query time. The R-tree index of the TREE-AGG often allows it to perform better than the other baselines, especially for low dimensional data.

Figure 17C:
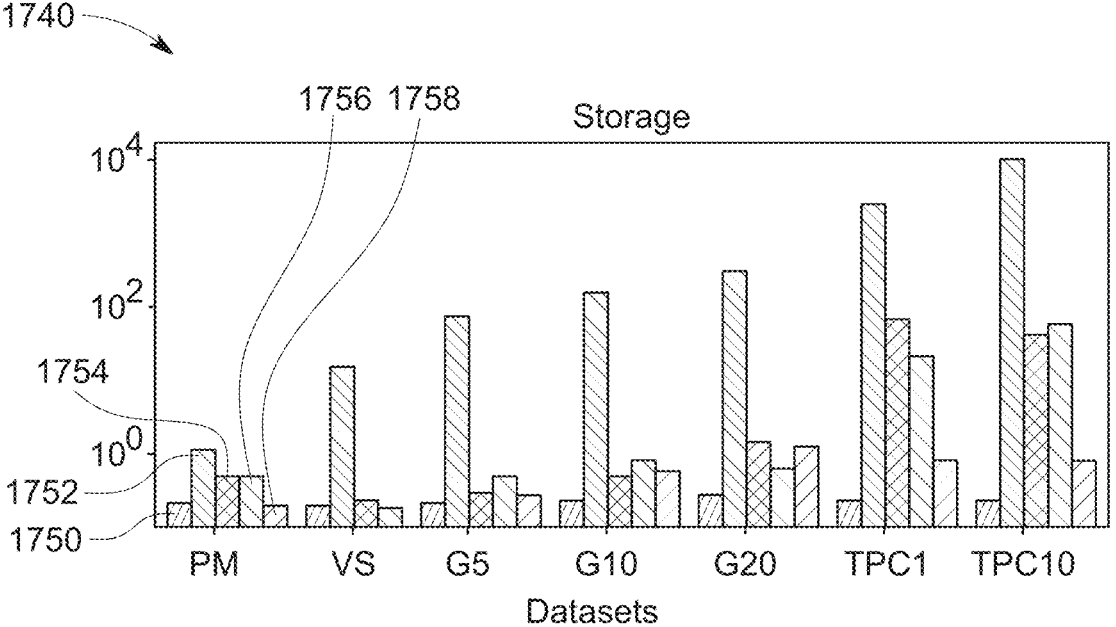
FIG. 17C is a graph that plots storage for the example neural network database in comparison to baseline state of the art algorithms for the datasets.

FIG. 17C is a graph 1740 that plots the storage in MB required for the baseline algorithms and the example Neurosketch framework in relation to each of the datasets, PM2.5, Veraset (VS), G5, G10, G20, TPC1, and TPC10. Bars 1750 represent the storage required for the Neurosketch, bars 1752 represent the storage required for the DeepDB, bars 1754 represent the storage required for the TREE-AGG, bars 1756 represent the storage required for the VerdictDB, and bars 1758 represent the storage required for the DBEst. The graph 1740 shows the example NeuroSketch answers queries accurately by taking less than one MB space, while the storage overhead of DeepDB increases with data size, to more than one GB.

Figure 18A:
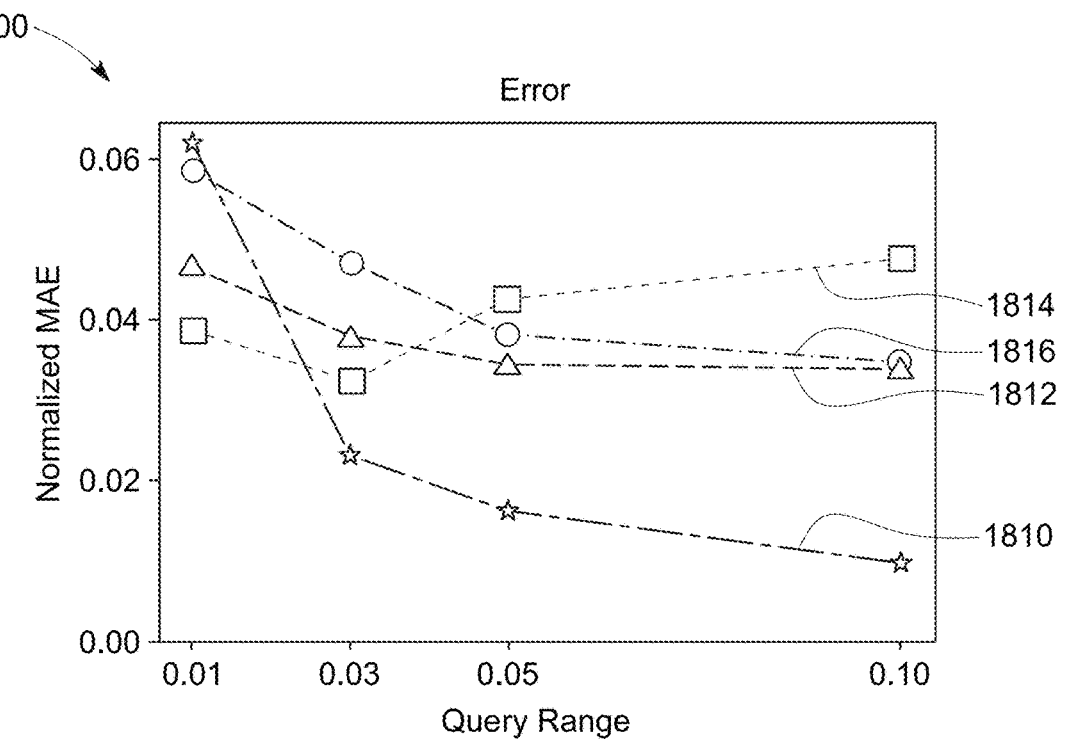
FIG. 18A is a graph that plots normalized error against the query range for the example neural network database in comparison to baseline state of the art algorithms.
Figure 18B:
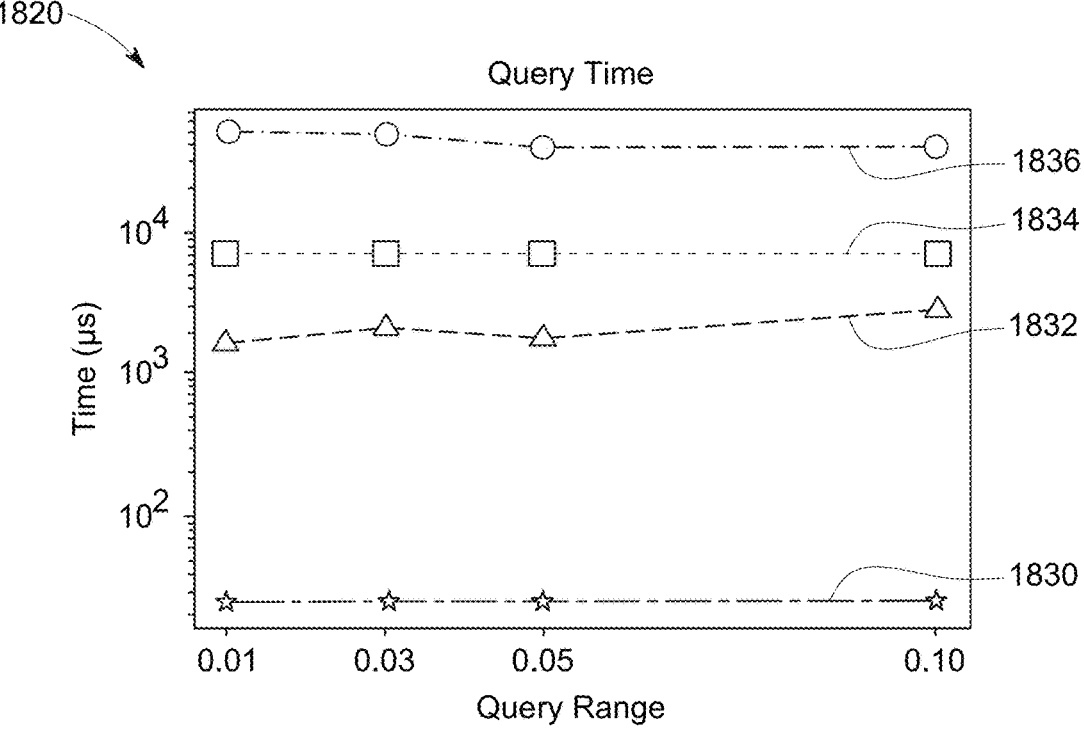
FIG. 18B is a graph that plots time against the query range for the example neural network database in comparison to baseline state of the art algorithms.

The TPC1 and VS datasets were used to study the impact of query workload on performance of the algorithms. Unless otherwise stated, results are on the TPC1 dataset. Due to its poor performance on TPC1 and not supporting multiple active attributes (for VS queries), the DBEst was excluded from the experiments. The query range was set to x percent of the domain range, for $x \in \{1, 3, 5, 10\}$. FIG. 18A shows a graph 1800 of normalized MAE plotted against the query range for the different algorithms. A plot 1810 represents the results of the example NeuroSketch. Plots 1812, 1814, and 1816 represent the results of the baseline algorithms VerdictDB, DeepDB, and TREE-AGG, respectively. FIG. 18B shows a graph 1820 of time plotted against the query range for the different algorithms. A plot 1830 represents the results of the example NeuroSketch. Plots 1832, 1834, and 1836 represent the results of the baseline algorithms VerdictDB, DeepDB, and TREE-AGG respectively.

As shown in the graphs 1800 and 1820, the error of the example NeuroSketch increases for smaller query ranges because for smaller ranges the example NeuroSketch needs to memorize where exactly each data point is, rather than learning the overall distribution of data points. Nevertheless, the example NeuroSketch provides better accuracy than the baselines for query ranges by at least 3%, and performs queries orders of magnitude faster for all ranges. If more accurate answers are needed for smaller ranges, increasing the model size of the example NeuroSketch can improve its accuracy at the expense of query time.

Figure 19A:
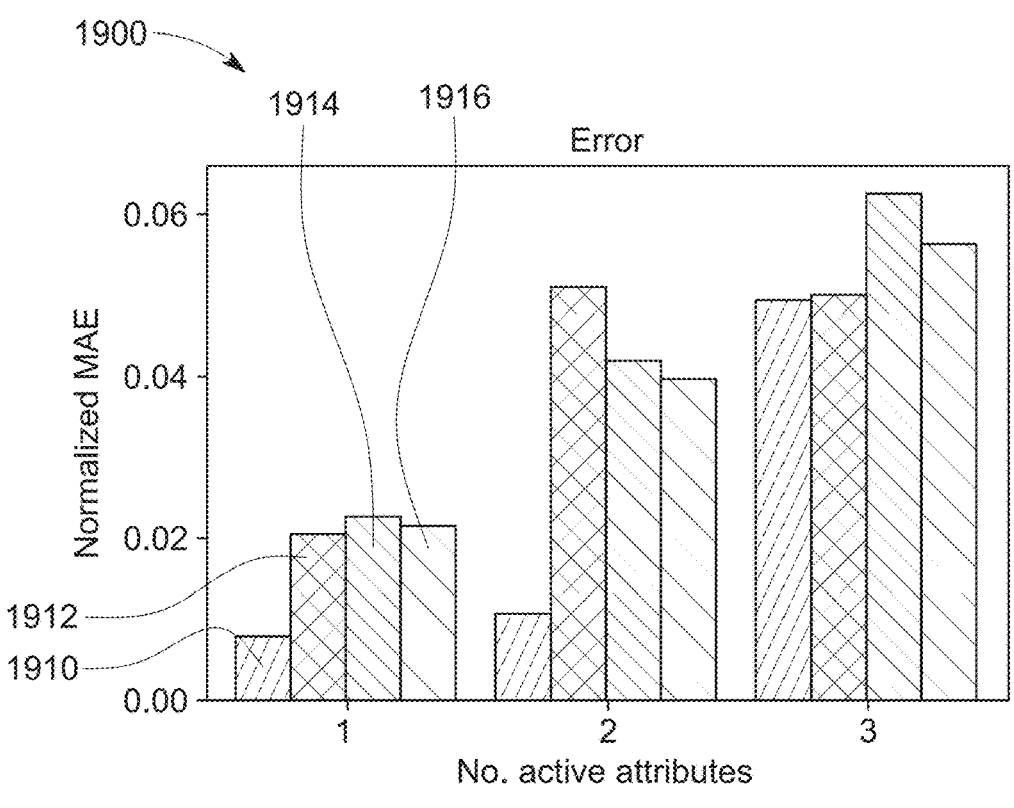
FIG. 19A is a graph that plots the normalized error against the number of attributes for the example neural network database in comparison to baseline state of the art algorithms.
Figure 19B:
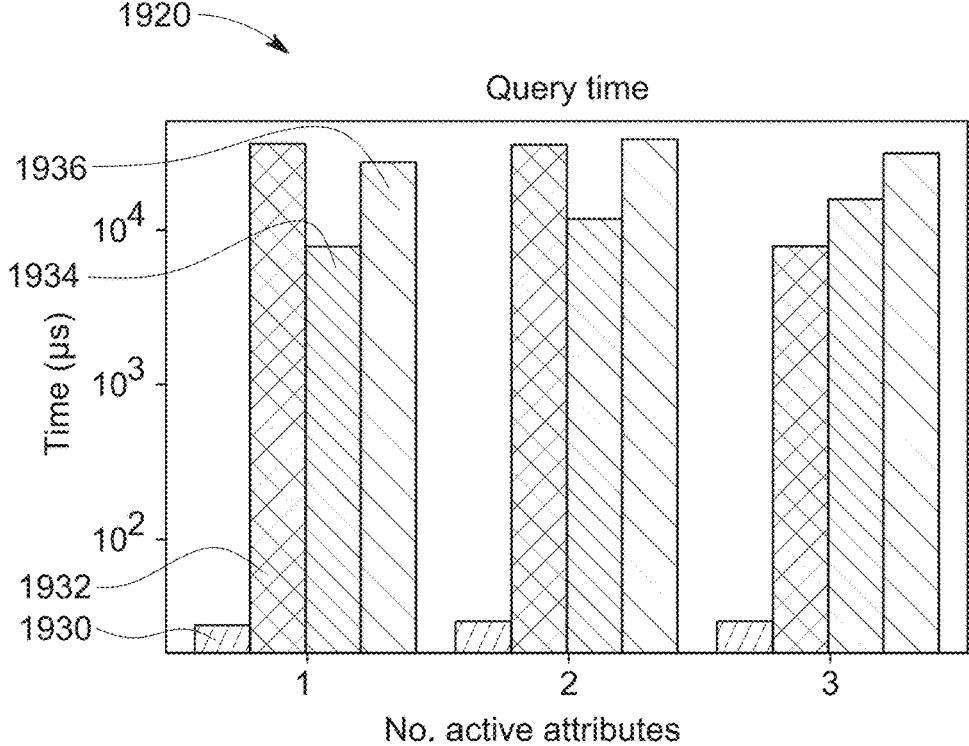
FIG. 19B is a graph that plots query time against the number of attributes for the example neural network database in comparison to baseline state of the art algorithms.

The effect of varying the number of active attributes was examined. FIG. 19A is a graph 1900 that plots the normalized MAE for one, two, or three active attributes. Bars 1910 represent the results of the Neurosketch, bars 1912 represent the results of the TREE-AGG, bars 1914 represent the results of the DeepDB, and bars 1916 represent the results of VerdictDB. FIG. 19B is a graph 1920 that plots the query time for one, two or three active attributes. Bars 1930 represent the results of the Neurosketch, bars 1932 represent the results of the TREE-AGG, bars 1934 represent the results of the DeepDB, and bars 1936 represent the results of VerdictDB. Accuracy of all the algorithms drops when there are more active attributes, with the example NeuroSketch outperforming the compared baseline algorithms both in accuracy and query time. Having more active attributes is similar to having smaller ranges, since fewer points will match the query predicate.

Figure 20A:
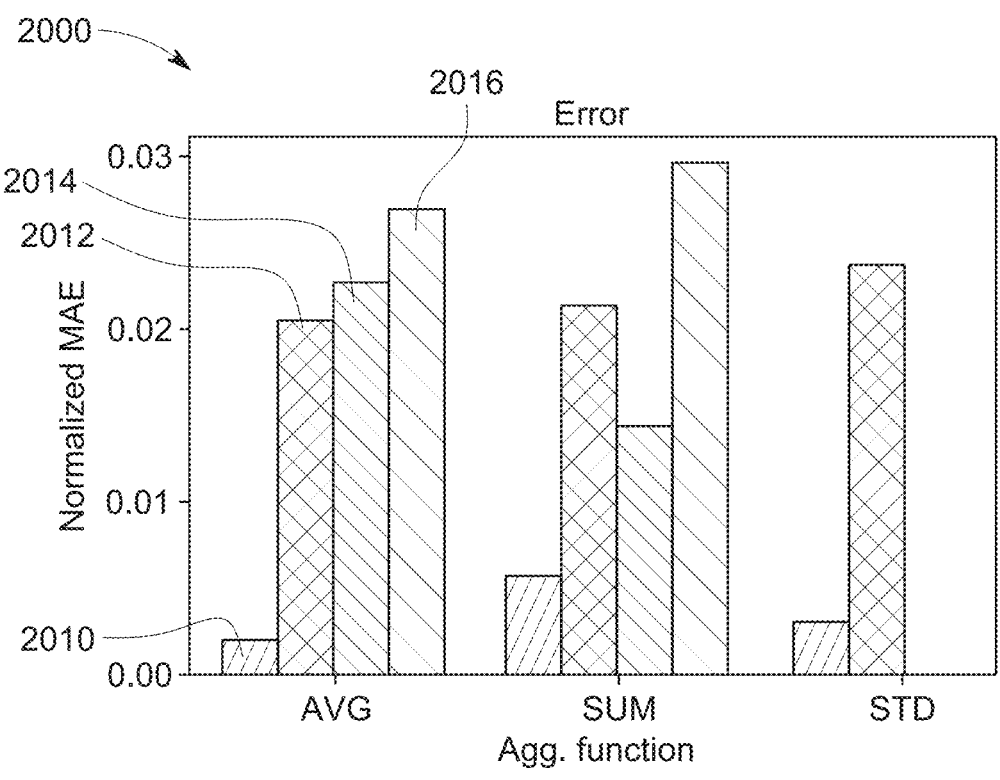
FIG. 20A is a graph that plots the normalized error against different aggregation functions for the example neural network database in comparison to baseline state of the art algorithms.
Figure 20B:
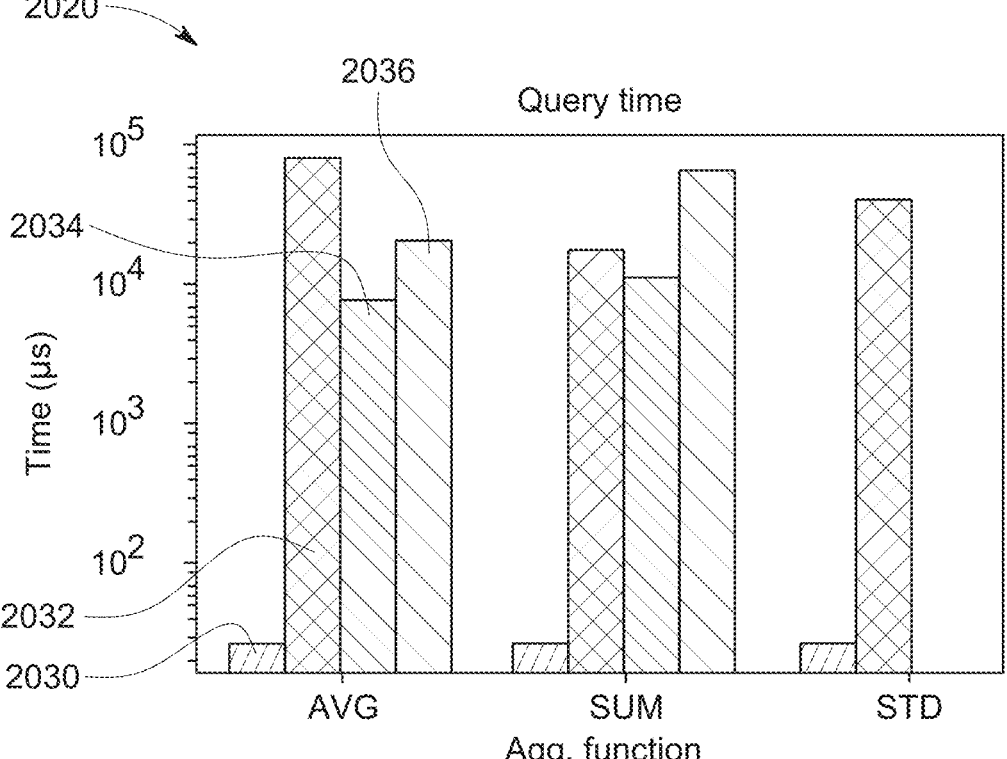
FIG. 20B is a graph that plots query time against different aggregation functions for the example neural network database in comparison to baseline state of the art algorithms.

The effect of different aggregations functions was examined. FIG. 20A is a graph 2000 that plots the normalized MAE for the AVG, SUM, and STD aggregation functions. Bars 2010 represent the results of the Neurosketch, bars 2012 represent the results of the TREE-AGG, bars 2014 represent the results of the DeepDB, and bars 2016 represent the results of VerdictDB. FIG. 20B is a graph 2020 that plots the query time for the AVG, SUM, and STD aggregation functions. Bars 2030 represent the results of the Neurosketch, bars 2032 represent the results of the TREE-AGG, bars 2034 represent the results of the DeepDB, and bars 2036 represent the results of VerdictDB. The graphs 2000 and 2020 show how different aggregation functions impact performance of the algorithms. The example NeuroSketch is able to outperform the algorithms for all aggregation functions. The VerdictDB and DeepDB implementation did not support the STDEV function and thus no result was reported for STDEV for these methods.

The median visit duration query function was examined given a general rectangular range. The predicate function takes as input coordinates of two points p and p', representing the location of two non-adjacent vertices of the rectangle, and an angle, $\phi$, that defines the angle the rectangle makes with the x-axis. Given $q=(p, p', \phi)$, the query function returns the median of visit duration of records falling in the rectangle defined by q. This is a common query for real-world location data, and data aggregators such as SafeGraph publish such information.

Neither DeepDB nor DBEst can answer this query. Although VerdictDB can be extended to support this query function, the current implementation does not support the aggregation function and thus no results were obtained. The predicate function is not supported by those methods, and extending those methods to support them is not trivial. The example NeuroSketch can answer this query function with a normalized MAE of 0.045 and a query time of 25 μs, with similar performance to other queries on the VS dataset. In comparison, the TREE-AGG algorithm answered this query function with a normalized MAE of 0.052 and a query time of 601 μs.

Different time/space/accuracy trade-offs achievable by the example NeuroSketch in comparison to the other baseline methods explained above based on different system parameters were studied. The number of layers (referred to as depth of the neural network), d, number of units per layer (referred to as width of the neural network), w, and height of the kd-tree, h, were varied for the example NeuroSketch framework to determine impact on time/space/accuracy. No kd-tree nodes were merged. For each of the plots of the outputs, the example NeuroSketch framework was run with two of the hyperparameters kept constant and changing third hyperparameter. The line labels are of the form (height, width, depth), where two of height, width or depth have numerical values and are the constant hyperparameters for that particular plot. Furthermore, the value of one of height, width or depth is {d, w, h} is the variable hyperparameter for the plotted line. For example, the line labelled (h, 120, 5) means the experiments for the corresponding line are with a NeuroSketch architecture with 120 number of units per layer, 5 layers and each point plotted corresponds to a different value for the kd-tree height, and label (0, 30, d) means the experiments are run with varying depth of the neural network, with kd-tree height 0 (i.e. only one partition) and the neural width network is 30.

Figure 21A:
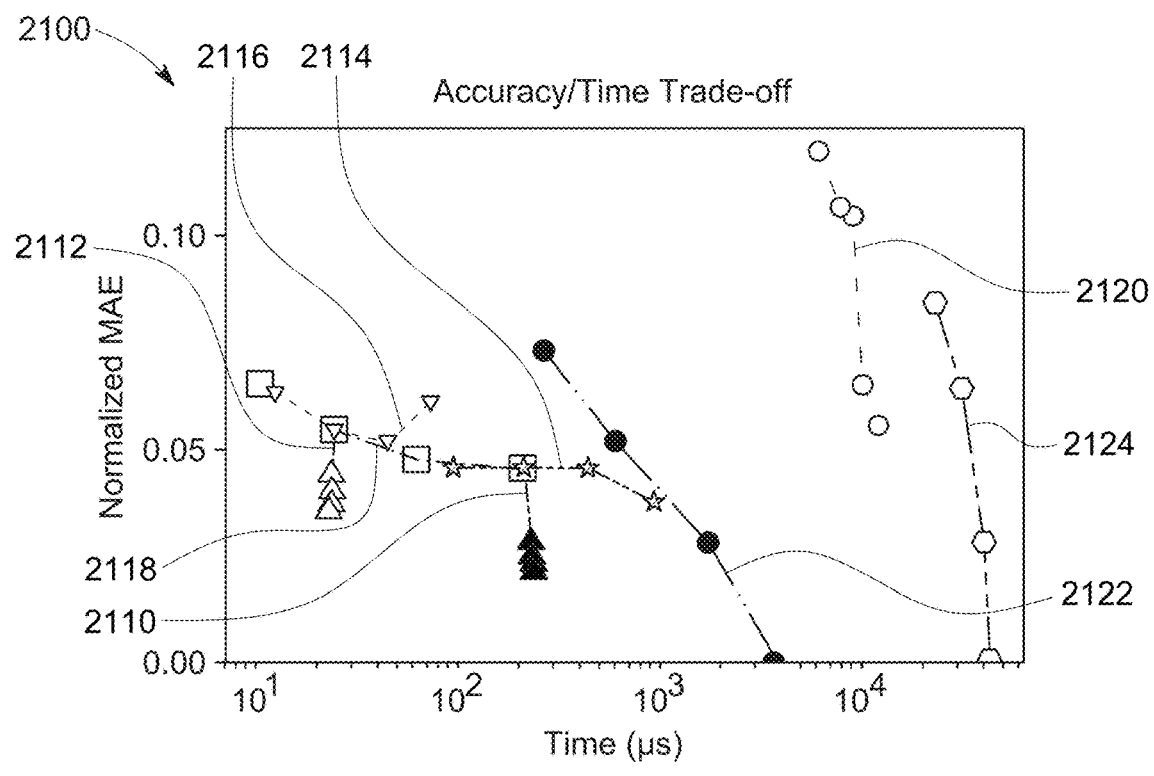
FIG. 21A is a graph that plots the normalized error against the different hyperparameters for the example neural network database in comparison to baseline state of the art algorithms.
Figure 21B:
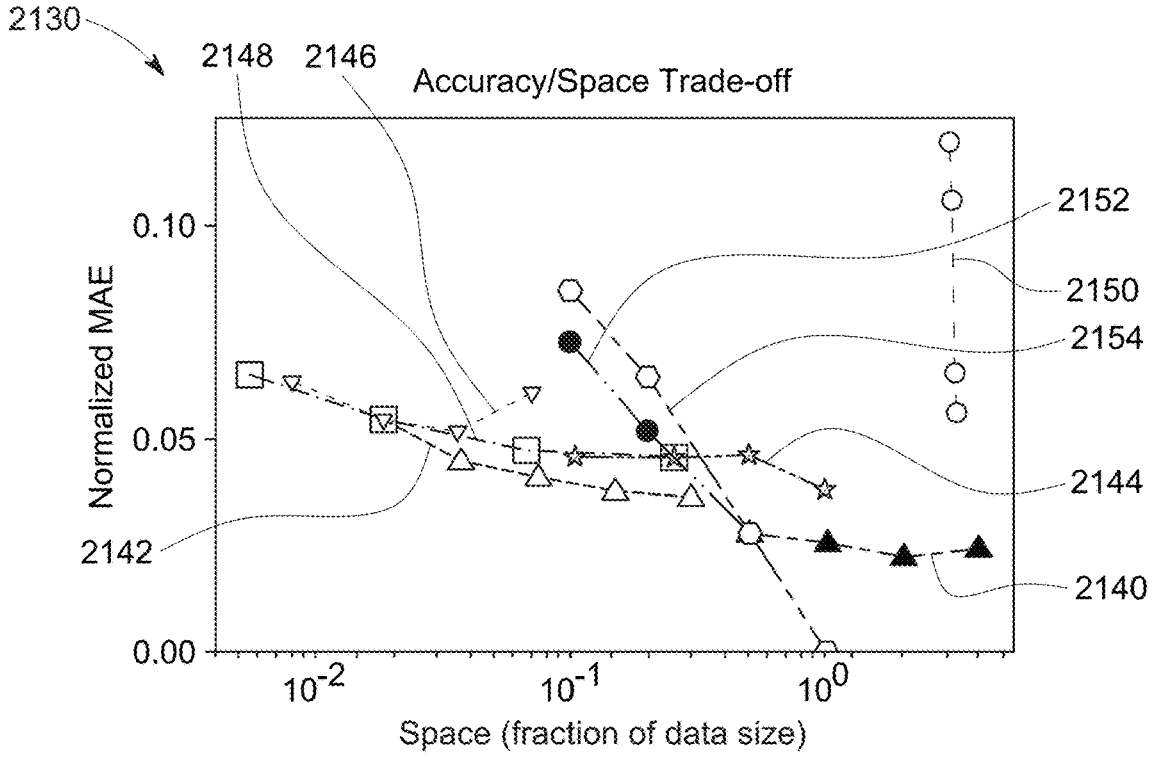
FIG. 21B is a graph that plots normalized error against the fraction of data size for the example neural network database in comparison to baseline state of the art algorithms.

FIG. 21A shows is a graph 2100 that shows several possible combinations of the hyperparameters resulting in normalized MAE against query response time. The graph 2100 includes two plots 2110 and 2112 that reflected varying the height hyperparameter, two plots 2114 and 2116 that reflected varying the depth hyperparameter, and a plot 2118 that reflected varying the width hyperparameter. Plots 2120, 2122, and 2124 represent the results from the DeepDB, TREE-AGG, and VerdictDB algorithms respectively. FIG. 21B shows is a graph 2130 that shows several possible combinations of the hyperparameters resulting in normalized MAE against the storage space consumption of the method. The space consumption is reported as a fraction of space consumption of the data. The graph 2130 includes two plots 2140 and 2142 that varied height, two plots 2144 and 2146 that varied depth, and a plot 2148 that varied width. Plots 2150, 2152, and 2154 represent the results from DeepDB, TREE-AGG, and VerdictDB algorithms respectively. The hyperparameter values are as follows. For the plots 2110 and 2112 (h, 120, 5) and (h, 30, 50), kd-tree height is varied from 0 to 4; for the plot 2118 labelled (0, w, 5) neural network width is {15, 30, 60, 120}; and for the plots 2114 and 2116 (0, 120, d) and (0, 30, d) neural network depth is {2, 5, 10, 20}. The results of the TREE-AGG and the VerdictDB algorithms are plotted for sampling sizes of 100%, 50%, 20% and 10% of data size. For the DeepDB, results for RDC thresholds in [0.1, 1] (minimum error is at RDC threshold=0.3) were obtained. Error increases for values less than 0.1 or more than 1).

The graph 2100 shows the trade-off between query time and accuracy. The example NeuroSketch performs well when fast answers are required but some accuracy can be sacrificed, while if accuracy close to an exact answer is required, TREE-AGG can perform better. Furthermore, the graph 2130 in FIG. 21B shows the trade-off between space consumption and accuracy. Similar to time/accuracy trade-offs, when the error requirement is not too stringent, the example NeuroSketch can answer queries by taking a very small fraction of data size. Finally, NeuroSketch outperforms DeepDB in all the metrics. Furthermore, comparing TREE-AGG with VerdictDB shows that, on this particular dataset, the sampling strategy of VerdictDB does not improve upon uniform sampling of TREE-AGG while the R-tree index of TREE-AGG improves the query time over that of VerdictDB.

FIGS. 21A-21B show the interplay between different hyperparameters of the example NeuroSketch framework. Increasing depth and width of the neural networks improves the accuracy, but after a certain accuracy level the improvement plateaus and accuracy even worsens if depth of the neural network is increased but the width is too small (as shown by the plots 2116 and 2146). Nevertheless, using the partitioning method described here allows for further improving the time/accuracy trade-off as it improves the accuracy at almost no cost to query time. The kd-tree improves the space/accuracy trade-off, compared with increasing the width or depth of neural networks. The query specialization provided by the example neural network database is beneficial, as learning multiple specialized models each for a different part of the query space performs better than learning a single model for the entire space.

Figure 22:
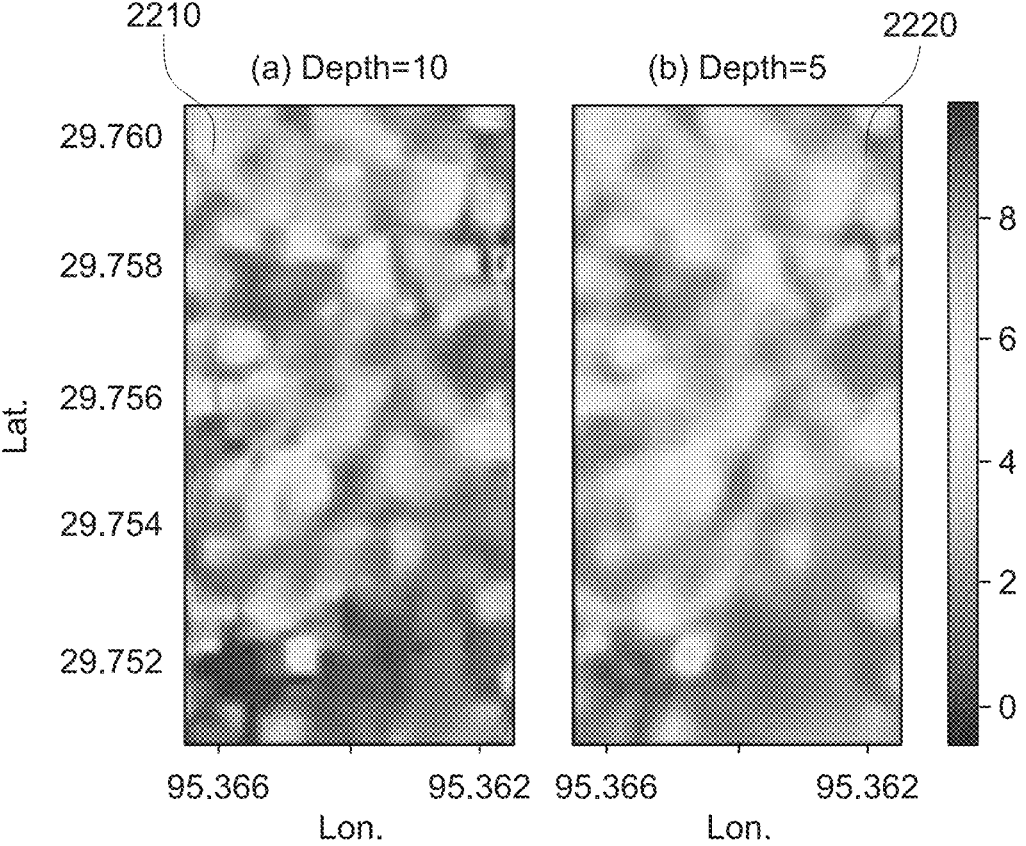
FIG. 22 shows maps of learned visualization outputs from the example neural network database with different depths.

FIG. 22 shows a chart 2210 of the learned visualization of a neural network according to the present method with a depth of 10 and a chart 2220 of the learned visualization of a neural network with a depth of 5. In this example, the example neural network database output a query of the average visit duration relating to the locations (in latitude and longitude) for users from the VS dataset. The example NeuroSketch framework learned the function for the examples above for two neural networks with the same architecture, but with different depths of 5 and 10. Compared with a ground truth mapping, it may be seen that the example NeuroSketch learns a function with similar patterns as the ground truth but the sharp drops in the output are smoothened out. The learned function becomes more similar to the ground truth as the number of parameters is increased. Neural networks are about 9% and 3.8% of the size of the database and thus conserve storage as explained above.

Figure 23A:
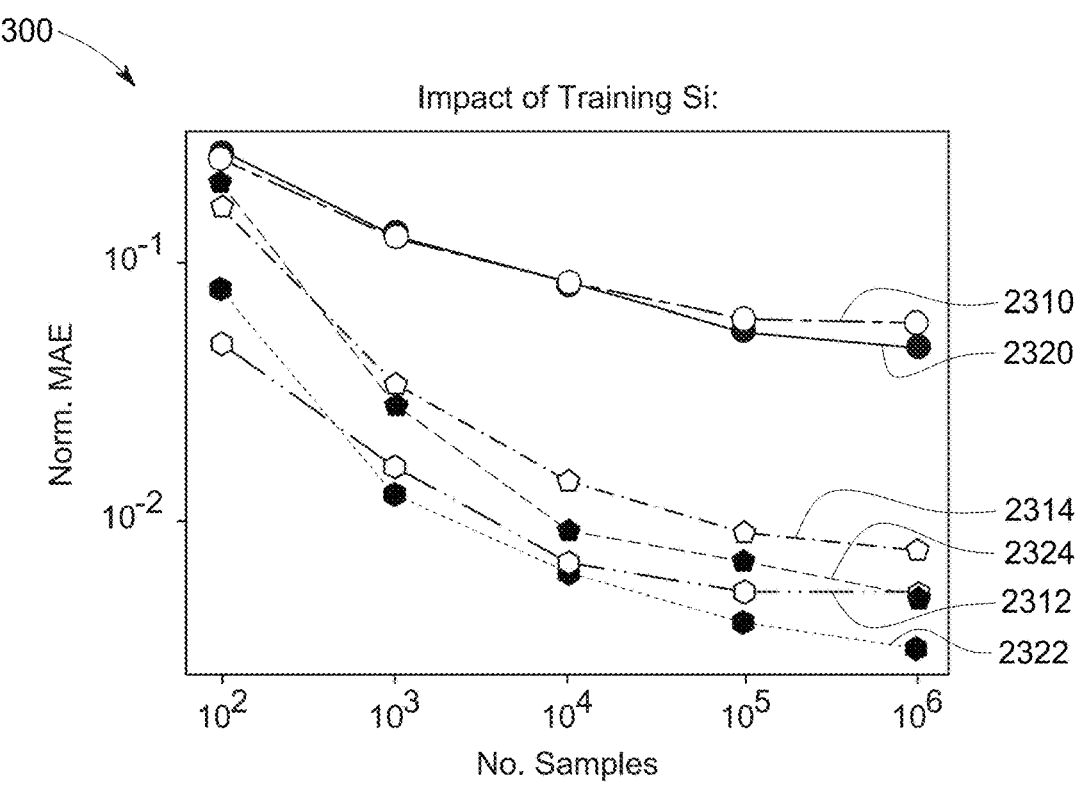
FIG. 23A is a graph that plots the normalized error against the number of samples in different training sets for the example neural network database.
Figure 23B:
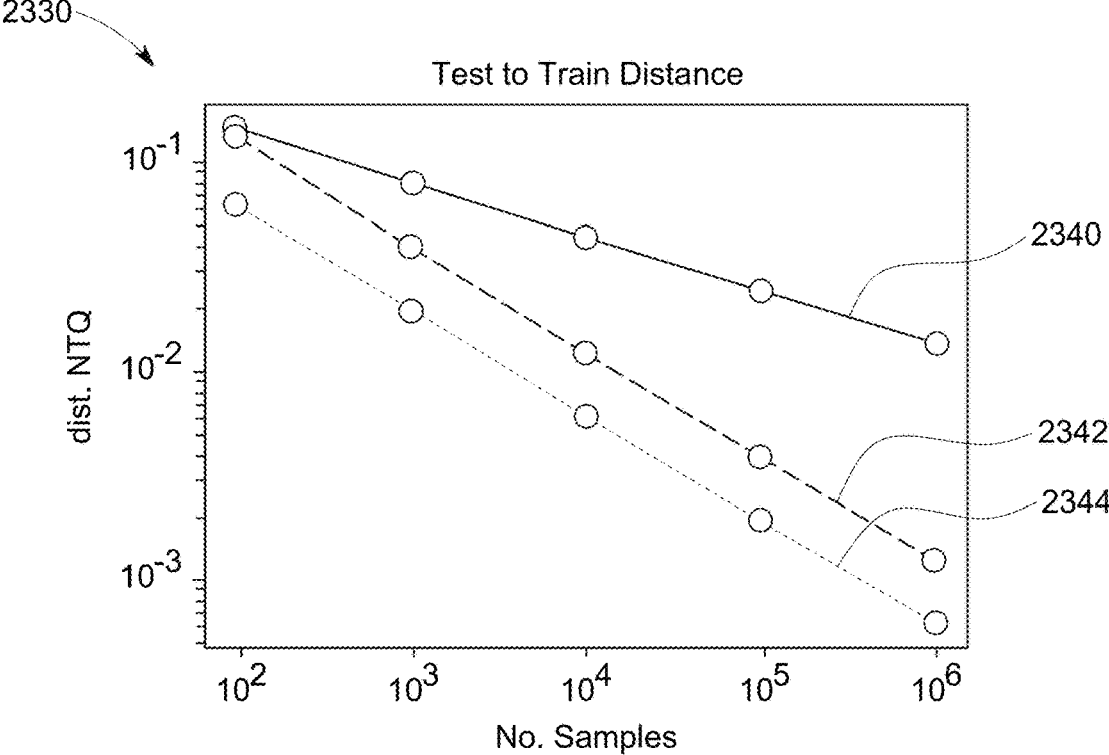
FIG. 23B is a graph that plots test to train distance against the number of samples in different trainings set for the example neural network database.

The generalization ability of the example NeuroSketch from train to test queries across datasets was studied. The results are for a NeuroSketch based neural network database with tree height 0 (i.e., no partitioning), neural network. FIG. 23A is a graph 2300 that plots the normalized MAE against the number of samples in the training sets. A plot 2310 shows the errors relative to the VS training set for a width of 30, a plot 2312 shows the errors relative to the PM training set for a width of 30, and a plot 2314 shows the errors relative to the TPC1 training set for a width of 30. A plot 2320 shows the errors relative to the VS training set for a width of 120, a plot 2322 shows the errors relative to the PM training set for a width of 120, and a plot 2324 shows the errors relative to the TPC1 training set for a width of 120. FIG. 23B shows a graph 2330 plotting the test to train distance against a number of samples from the different datasets. A first plot 2340 shows the test to train distance for the VS dataset, a second plot 2342 shows the test to train distance for the PM2.5 dataset, and a third plot 2344 shows the test to train distance for the TPC1 dataset.

Figure 24A:
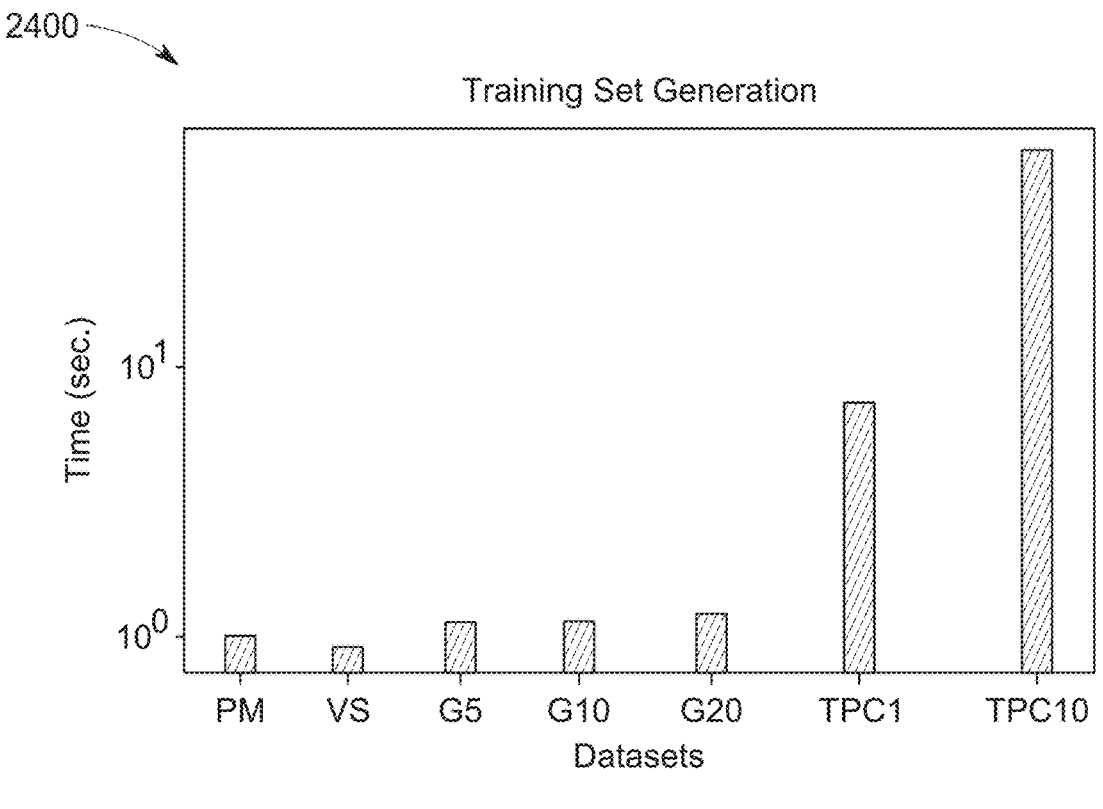
FIG. 24A is a graph that plots the training set generation time for the different datasets in FIG. 16A.

FIG. 24A is a graph 2400 that plots the time required for generating a training set for the different datasets, PM, VS, G5, G10, G20, TPC1, and TPC10. The graph 2400 shows that a training size of about 100,000 sampled query points is sufficient for both architectures to achieve close to their lowest error. Furthermore, when sample size is very small, a smaller architecture generalizes better, while the larger neural network improves performance when enough samples are available.

Figure 24B:
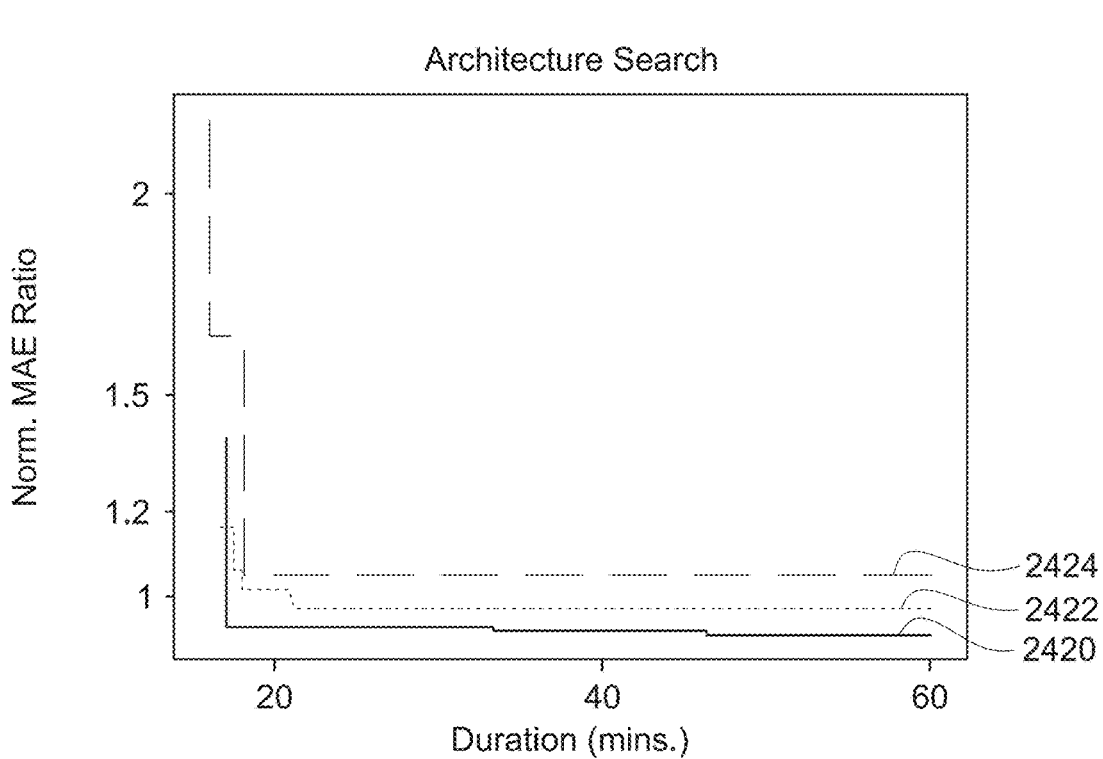
FIG. 24B is a graph that plots the average Euclidean distance from test queries to training queries for some of the different datasets in FIG. 16A.

In FIG. 24B is a graph 2410 that plots the average Euclidean distance from test queries to their nearest training query, referred to as "dist. NTQ" for different datasets. A plot 2420 represents the VS dataset, a plot 2422 represents the PM dataset, and a plot 2424 represents the TPC dataset. To compare across datasets, datasets are scaled to be in [0, 1] for this plot, and the difference in dist. NTQ values is due to different data dimensionality and number of active attributes in the queries. As the number of training samples increases, dist. NTQ decreases. Nonetheless, when model size is small, even though increasing number of samples beyond 100,000 decreases dist. NTQ, model accuracy does not improve. This suggests that for small neural networks, the error is due to the capacity limit of the model to learn the query function, and not due to lack of training data.

Figures 24C, 25:
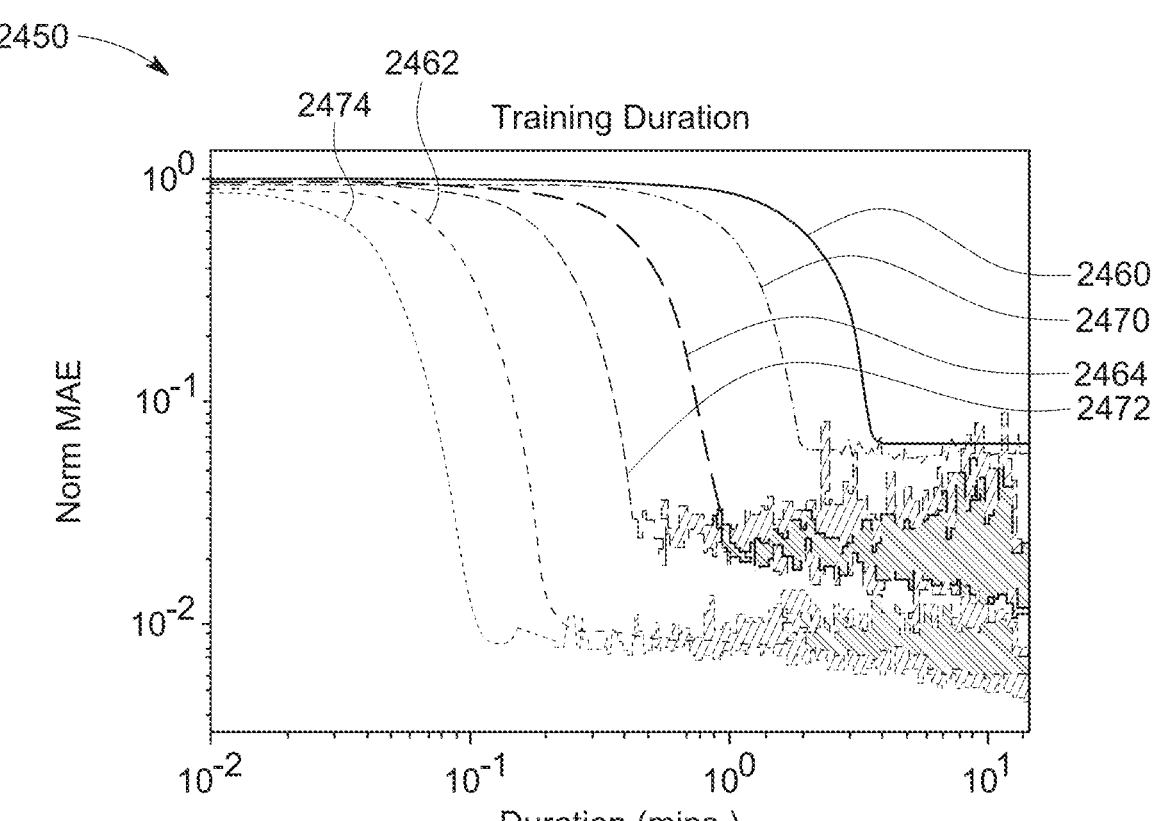
FIG. 24C is a graph that plots the normalized error against training duration for different architectures of the example neural network database for some of the different datasets in FIG. 16A.
FIG. 25 is a table showing improved processing times for trees with merged nodes against a tree with no merged nodes for the datasets in FIG. 16A.

FIG. 24C is a graph 2450 that plots normalized MAE against training duration for the two architectures. A plot 2460 shows the training duration relative to the VS training set for a width of 30, a plot 2462 shows the training duration relative to the PM training set for a width of and a plot 2464 shows the training duration relative to the TPC1 training set for a width of 30. A plot 2470 shows the training duration relative to the VS training set for a width of 120, a plot 2472 shows the training duration relative to the PM training set for a width of 120, and a plot 2474 shows the training duration relative to the TPC1 training set for a width of 120.

The impact of merging leaf nodes in the prepossessing step of developing the example NeuroSketch was studied. The tree height was set to 4, so that the partitioning step creates 16 partitions that are merged using AQC, after which 8 partitions remain. This approach was compared to two alternatives. A single neural network was trained to answer any query. The tree height was set to 3 so that 8 partitions were obtained without performing any merging. FIG. 25 is a table 2500 that shows the results of this comparison. Table 2500 charts the normalized AQC STD, the percent improvement with merging and percent improvement without merging for datasets VS, PM, TPC1, G5, G10 and G20 The data in the table 2500 shows that performing partitioning, either with merging or without merging, is better than not partitioning across all datasets. Second, for almost all datasets, merging provides better or equal performance compared with an unmerged tree. Thus, in practice, using AQC as an estimate for function complexity to merge nodes is beneficial.

A correlation coefficient of 0.61 was observed between AQC and the error of trained models, which quantifies the benefits of using AQC as an estimate for function complexity. It also implies that AQC can be used to decide whether a query function is too difficult to approximate. For instance, in a database system, a query optimizer may build the example NeuroSketch based frameworks for query functions with a smaller AQC, and use a default query processing engine to answer query functions with a larger AQC.

Furthermore, the table 2500 shows that the benefit of partitioning is dataset dependent. There is a strong correlation between the standard deviation of AQC estimates across leaf nodes of the kd-tree and the improvement gain from partitioning. Specifically, let R={AQC$_N$, ∀leaf N} be the set of leaf nodes of the kd-tree, as calculated in line 3 of the algorithm in FIG. The STD(R)/AVG(R) is calculated as the normalized AQC STD for each dataset. This measurement is in the second column of table 2500. The last row of the table 2500 shows the correlation of the improvement for the partitioning methods with this measure. The large correlation suggests that when the difference in the complexity of approximation for different parts of the space is large, partitioning is more beneficial. This shows that partitioning is beneficial if there are parts of the space that are more complex than others.

The graph 2400 in FIG. 24A shows the time it takes to generate the training set of 100,000 queries is at most 60 seconds, with most datasets taking only a few seconds. The reported results are obtained by answering the queries in parallel on GPU. The queries are answered by scanning all the database records per query and with no indexing. Faster training set generation may be obtained by building indexes.

The graph 2410 in FIG. 24B shows the time to perform an architecture search for each dataset. Optuna, a tool that uses Bayesian optimization, was employed to perform a hyperparameter search. Query time and space requirements were used to limit the maximum number of neural network parameters. Optuna was used to find the width and depth of the neural network that minimizes error. In this example, Optuna was run for a total of one hour and the model size limit was set to be equal to the neural network size in the default setting. For a point in time, t. the ratio of error of the best model found by Optuna was reported up to time, t, divided by the error of the default model architecture. This ratio over time is plotted in the graph 2410 in FIG. 24B The graph 2410 in FIG. 24B shows that Optuna finds a model that provides accuracy within 10% of the default architecture in around 20 minutes. Optuna also finds a better architecture for the VS dataset than the default architecture, showing that the accuracy of the method can be improved by performing dataset specific parameter optimization. Optuna trains models in parallel (multiple models fitting in a single GPU), and also stops training early if a setting is not promising, so that more than 300 parameter settings are evaluated in the presented one hour for each dataset.

The graph 2450 in FIG. 24C shows the accuracy of neural networks during training. Models converge within 5 minutes of training across datasets, and error fluctuates when training for longer. Models with larger width (plots 2470, 2472, and 2474) converge faster.

In this example, as shown in FIGS. 21A-21B, the overall trend of improved accuracy for larger models matches the DQD bound. The graphs 2100 and 2130 in FIGS. 21A-21B show increase in data size increases accuracy, but only up to a certain point, after which increasing model size has little impact.

The observations made in the DQD bound are corroborated with NeuroSketch using synthetic datasets, so that the corresponding LDQs can be calculated. n points were sampled from uniform, Gaussian, and two-component GMM datasets. RAQs with the COUNT aggregation function on the sampled datasets were answered while varying the value of n. The example NeuroSketch framework was trained with partitioning disabled to isolate the neural network ability to answer queries.

Figure 26A:
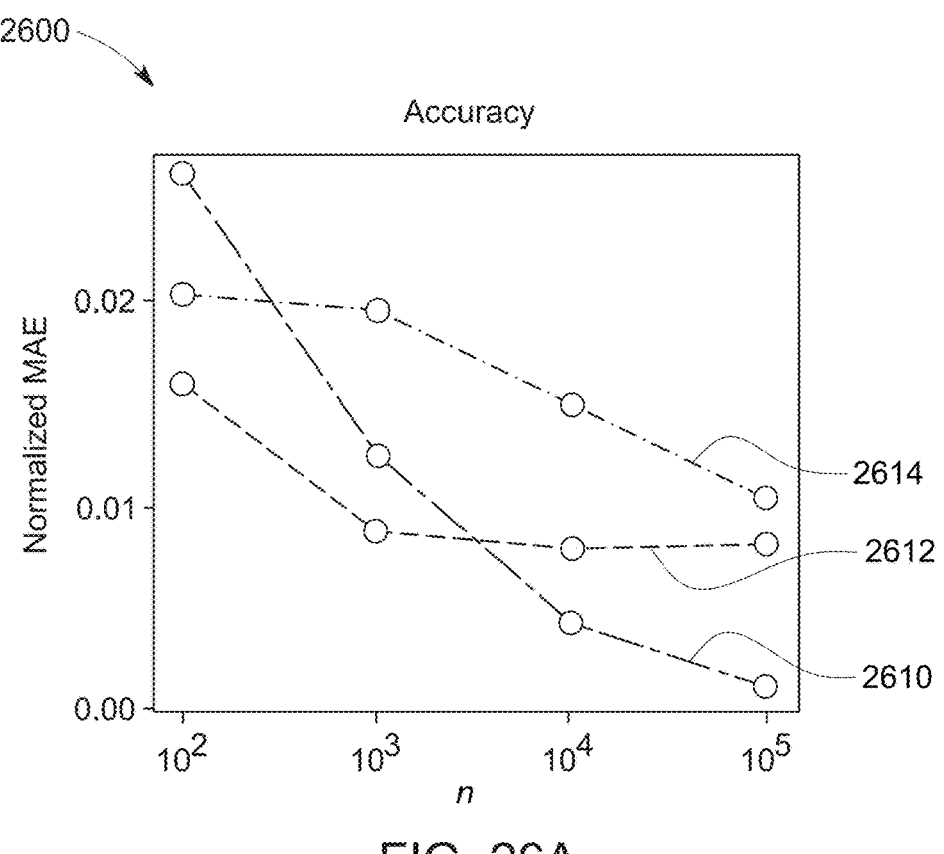
FIG. 26A is a graph that plots normalized error against the number of sample points in different datasets.

FIG. 26A is a graph 2600 that plots normalized MAE against the number of sample points, n in different datasets. A plot 2610 shows the results from a uniform dataset, a plot 2612 shows the results from the Gaussian dataset, and a plot 2614 shows the results from the GMM dataset. The neural network architecture was fixed so that query time and space complexity was fixed, using one hidden layer with 80 units and the example NeuroSketch framework was trained for different data sizes and distributions. The error decreases for larger data sizes. Furthermore, uniform distribution, which has a smaller LDQ, achieves the lowest error, then Gaussian whose LDQ is larger and finally GMM which has the largest LDQ.

Figure 26B:
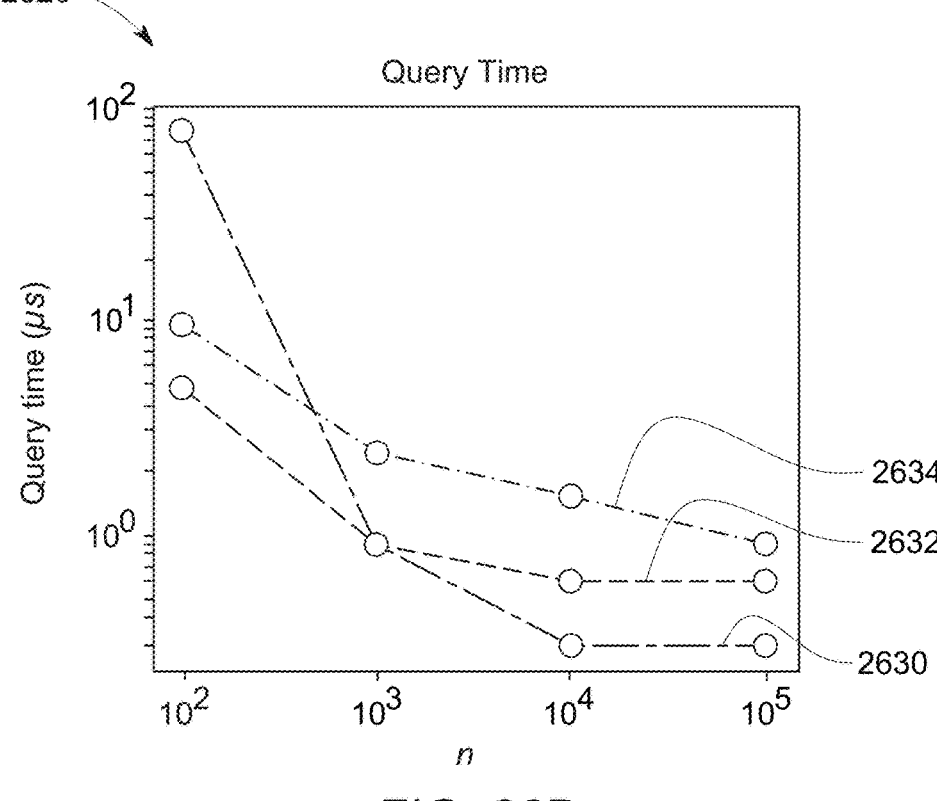
FIG. 26B is a graph that plots query time against the number of sample points in different datasets.

FIG. 26B is a graph 2620 that plots query time against the number of sample points, n. A plot 2630 shows the results from a uniform dataset, a plot 2632 shows the results from the Gaussian dataset, and a plot 2634 shows the results from the GMM dataset. The graph 2620 shows similar observations to those from the graph 2600, but with accuracy fixed to 0.01 and space and time complexity allowed to change. Specifically, a grid search on model width was performed, where the example NeuroSketch framework was trained for different model widths and the smallest model width where the error is at most 0.01 was found. Query time of the model found with the grid search is reported in the graph 2620 in FIG. 26B. The query time and space consumption decrease when data size increases.

Moreover, the same observations hold for storage cost, where the results look identical to that of the graph 2620 in FIG. 26B. Both storage cost and query time are a constant multiple of the number of parameters of the neural network, so both storage cost and query time are constant multiples of each other.

Interestingly, for small data sizes, the difficulty of answering queries across distributions does not follow their LDQ order, where uniform distribution is harder when n=100 compared with a Gaussian distribution. When data size is small, a neural network has to memorize the location of all the data points, which can be more difficult with uniform distribution as the observed points may not follow any recognizable pattern. Nonetheless, as data size increases, the error, query time and space complexity improve, and the difficulty of answering queries from different distributions depends on the LDQ.

Figure 27A:
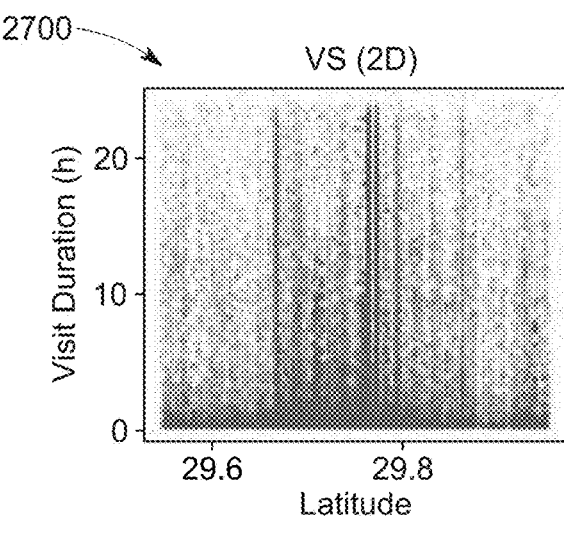
FIG. 27 shows graphs of results from the example neural network database to queries of different datasets.
Figure 27B:
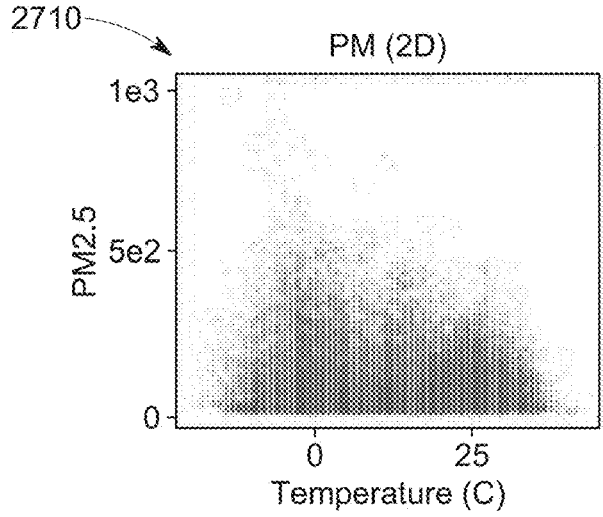
Figure 27C:
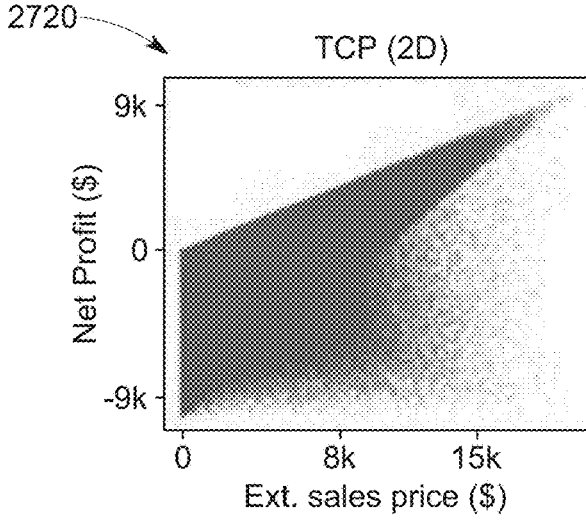
Figure 28A:
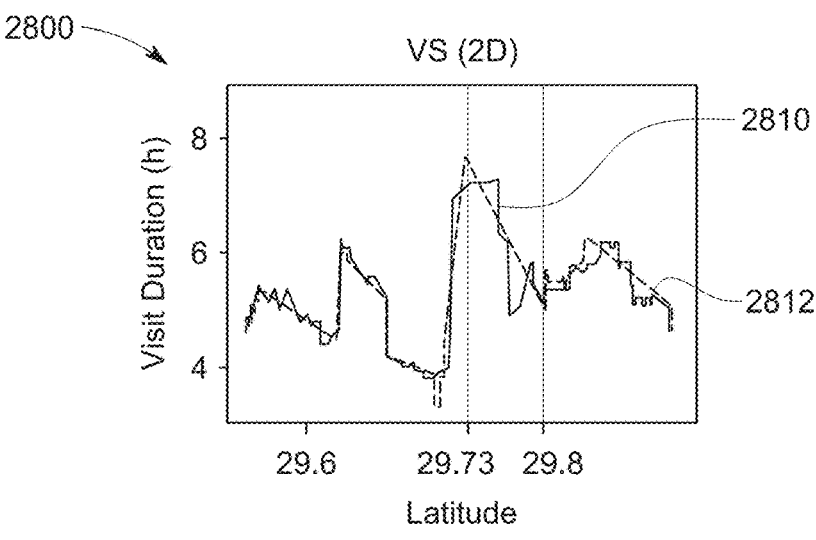
FIG. 28 shows graphs of results from the example neural network database and the baseline algorithms to queries of different datasets.
Figure 28B:
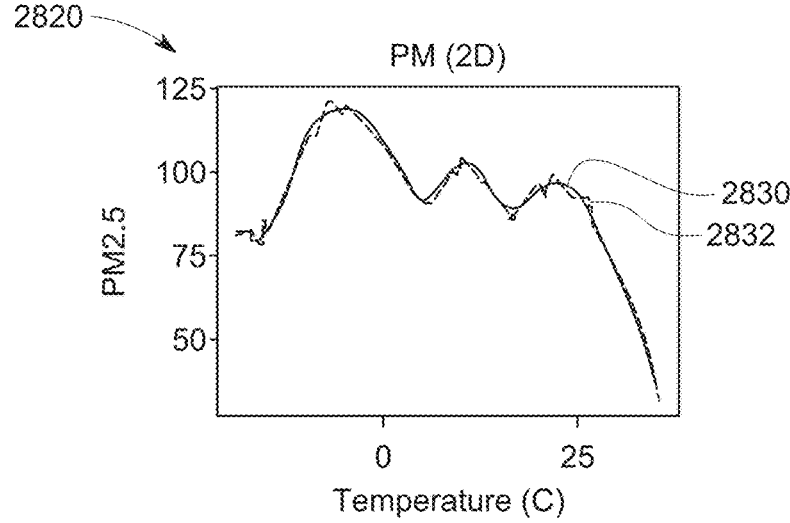
Figure 28C:
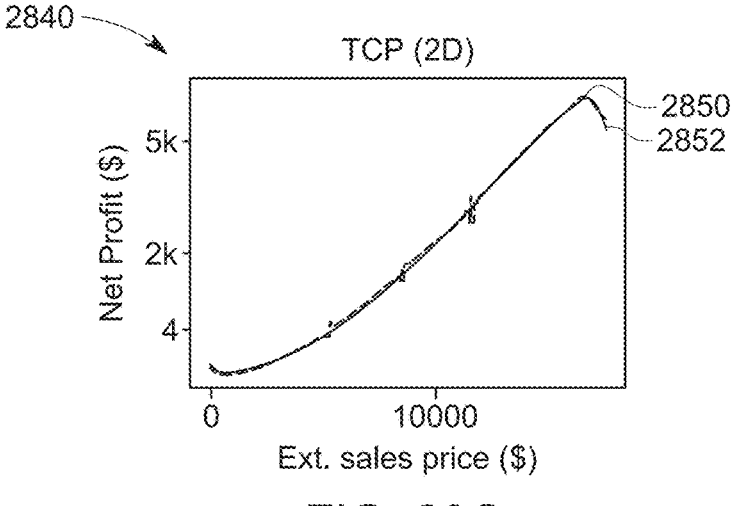

To further investigate the impact of data distribution on accuracy, 2D subsets of the PM, VS, and TPC1 datasets were visualized. RAQs were performed that asked for the AVG of the measure attribute where the predicate column falls between c and c+r, where r is fixed to 10% of column range and c is the query variable (and input to the query function). FIG. 27 shows a first graph 2700 that plots the visit duration and latitude of the VS dataset, a second graph 2710 that plots the PM2.5 count and temperature of the PM dataset, and a third graph 2720 that plots the net profit and extended sales price of the TCP dataset. FIG. 28 shows graphs 2800, 2820, and 2840 of the corresponding true query functions and the function learned by the example NeuroSketch algorithm without partitioning. The first graph 2800 shows a plot 2810 of the ground truth algorithm and a plot 2812 of results the example Neurosketch functions learned from visit duration in relation to latitude. The second graph 2820 shows a plot 2830 of the ground truth algorithm and a plot 2832 of results the example Neurosketch functions learned from PM2.5 in relation to temperature. The third graph 2840 shows a plot 2850 of the ground truth algorithm and a plot 2852 of results the example Neurosketch functions learned from net profit in relation to sales price. Sharp changes in the VS dataset causes difficulties for NeuroSketch, leading to inaccuracies around such sharp changes as shown in the graph 2800. This is reflected in both normalized MAE values of 0.035, 0.014, and 0.0029 for the respective VS, PM, and TPC datasets and normalized AQC values of 1.28, 0.95, and 0.77 for the respective VS, PM, and TPC datasets. The normalized AQC is the AQC of the functions after they are scaled to [0, 1] to allow for comparisons across datasets, where PM and TPC, which have less such changes, have smaller AQC and MAE values.

The graphs in FIG. 28 illustrate why abrupt changes (i.e., large LDQ) make function approximation difficult. The graph 2800 shows such an abrupt change in query function where lat. is between 29.73 and 29.8 (the beginning and end of the linear piece are marked in the figure with vertical lines). A single linear piece is assigned to approximate the function in that range (recall that ReLU neural networks are piece-wise linear functions). Such a linear piece has high error, as it cannot capture the (non-linear) change in the function. The error resulting from this approximation grows as the magnitude of the abrupt change in the true function increases. Alternatively, more linear pieces are needed to model the change in the function, which results in a larger neural network.

Similar to the above NeuralDB example, the experiments show that the example NeuroSketch allows for orders of magnitude of performance improvement over known models. Known data models can answer specific queries, (e.g., only COUNT, SUM, AVG, VARIANCE, STDDEV and PERCENTILE aggregations) while the example neural network database framework can be applied to any aggregation function. The example NeuroSketch framework trained for a query function is typically much smaller than the database and answers RAQs without accessing the data. This is beneficial for efficient release and storage of data. For instance, location data aggregators, such as SafeGraph, can train an example NeuroSketch framework to answer the average visit duration query, and release the trained framework to interested parties instead of releasing the dataset. This improves storage, transmission, and query processing costs for all parties. Additionally, support for dynamic data can be employed. One approach is to frequently test the trained neural network database, and re-train the neural networks whose accuracy fall below a certain threshold. A bounding routine such as DQD can be used to decide how often retraining is required.

The example neural network database framework avoids accessing points altogether in comparison to known nearest neighbor algorithms, and learns a function based on the points that can answer the queries accurately. Since the example neural network database only requires distance to the k-th nearest neighbor, the example neural network database can directly output the answer, without the value of k affecting query time.

The example neural network database framework is query-type agnostic and can be applied to any aggregation function. While some known sampling-based methods may be applied to any aggregation function and selection predicate, these sampling-based methods fail to capitalize on information available on either data points or query distribution, which results in worse performance. The example neural network database methods and systems may answer any query using a model, since any query is a function that can be approximated. Solving this requires a learning method with strong representation power, which motivates the use of neural networks. This is in contrast with simpler models. While machine learning has been used to solve various combinatorial optimization problems, no known methods consider performing different queries on the same database.

The present disclosure thus relates to a query-type agnostic neural network framework for efficiently answering different database queries approximately. The example neural network database can be used to answer distance to nearest neighbor query with orders of magnitude performance improvement over existing state-of-the-art as well as theoretically optimal algorithms. The example framework and neural network architecture can be used to answer range aggregate queries with different aggregation functions with significant improvement over state-of-the-art. Thus, a single framework may be used to answer different query types, which minimizes human time spent on designing algorithms for different query types. The example neural network database provides a differentiable query operator which may find applications in machine learning and feature learning. The example neural network database learns generalizable patterns between query inputs and outputs which may prove useful when there is missing data.

In some examples, when there is difficulty in obtaining a corresponding algorithm for training, the methods described herein are useful when some polynomial algorithm is known for the query, which is used to obtain the correct answer for queries during training. In practice, if the above issues exist in a system, an existing method can first be used to answer queries, while every answered query is also used to train the example neural network database. After the neural network database reaches a certain accuracy threshold, it can replace the method it learned from for better efficiency.

In one example, insertion of a new data point may change the function that is approximated by a neural network in a specific and query dependent way. In some examples, the neural network database may be tested on a (potentially changing) test set, and re-train the neural networks whose accuracy fall below a certain threshold. Not all the neural networks may need to be re-trained, as only some of the partitions may be affected by new data points.

The principles in this disclosure may be incorporated in a number of below described implementations.

Implementation 1: A system for training a neural network database to respond to a first type of query, the system comprising:

a database including queries and answers;

a training module executed by the processor coupled to the database, the training module operable for partitioning a set of queries of a first type and corresponding answers from the database into partitions; selecting a neural network for each of the partitions; and training each of the neural networks with a dataset from the database corresponding to the partition.

Implementation 2: The system of implementation 1 wherein at least two of the plurality of neural networks are trained in parallel.

Implementation 3: The system of implementation 1, wherein the partitions are determined based on higher probability of queries in the partition in the distribution of queries being approximated accurately.

Implementation 4: The system of implementation 1, wherein each of the neural networks has an identical structure.

Implementation 5: The system of Implementation 1, wherein each of the neural networks is trained by minimizing the average approximation error.

Implementation 6: The system of Implementation 4, wherein each neural network includes a plurality of layers, including a first layer and a last layer including a number of units corresponding to the output dimensionality of the query function.

Implementation 7: The system of Implementation 6, wherein batch normalization is used for all the layers, sine activation for the first layer and swish activation for the first layer and a set of intervening layers between the first layer and last layer.

Implementation 8: The system of Implementation 1, wherein each of the neural networks are retrained to respond to queries corresponding to a second query type different from the first query type.

Implementation 9: The system of Implementation 1, wherein the first query type includes one of a nearest neighbor, a distance to nearest neighbor query and a range aggregate query.

Implementation 10: The system of Implementation 1, wherein the partitions include a merged partition that combines two initial partitions, wherein the merged partition corresponds to one of the plurality of neural networks.

Implementation 11. The system of Implementation 1, wherein the data in the database is multi-dimensional data.

Implementation 12: A method of for training a neural network database to respond to a first type of query, the method comprising:

partitioning queries of the first type of a database;

organizing the partitions of the queries in leaf nodes of a decision tree;

assigning a neural network to each of the leaf nodes; and training each of neural networks assigned to the leaf nodes with a training set of queries in the partition and associated answers.

Implementation 13: The method of Implementation 11 wherein at least two of the neural networks are trained in parallel.

Implementation 14: The method of Implementation 12, wherein the partitions are determined based on higher probability of queries in the partition in the distribution of queries being approximated accurately.

Implementation 15: The method of Implementation 12, wherein each of the plurality of neural networks has an identical structure.

Implementation 16: The method of Implementation 12, wherein each of the neural networks is trained by minimizing the average approximation error.

Implementation 17: The method of Implementation 15, wherein each neural network includes a plurality of layers, including a first layer and a last layer including a number of units corresponding to the output dimensionality of the query function.

Implementation 18. The method of Implementation 17, wherein batch normalization is used for all the layers, sine activation for the first layer and swish activation for the first layer and a set of intervening layers between the first layer and last layer.

Implementation 19. The method of Implementation 12, further comprising: retraining the neural networks to respond to queries of the database corresponding to a second query type different from the first query type.

Implementation 20. The method of Implementation 12, wherein the first query type includes one of a nearest neighbor, a distance to nearest neighbor query and a range aggregate query.

Implementation 21. The method of Implementation 12, further comprising:

determining whether two partitions include similar queries;

merging the two partitions; and assigning a neural network to the merged partition.

Implementation 22. The method of Implementation 12, wherein the data in the database is multi-dimensional data.

Implementation 23: A non-transitory computer readable medium having stored thereon software instructions that, when executed by a processor, cause the processor to:

partition queries of a database;

organize the partitions of the queries in leaf nodes of a tree;

assign a neural network to each of the leaf nodes; and train each of the leaf nodes with a training set of queries in the partition and associated answers.

It should initially be understood that the disclosure herein may be implemented with any type of hardware and/or software, and may be a pre-programmed general purpose computing device. For example, the system may be implemented using a server, a personal computer, a portable computer, a thin client, or any suitable device or devices. The disclosure and/or components thereof may be a single device at a single location, or multiple devices at a single, or multiple, locations that are connected together using any appropriate communication protocols over any communication medium such as electric cable, fiber optic cable, or in a wireless manner.

It should also be noted that the disclosure is illustrated and discussed herein as having a plurality of modules which perform particular functions. It should be understood that these modules are merely schematically illustrated based on their function for clarity purposes only, and do not necessary represent specific hardware or software. In this regard, these modules may be hardware and/or software implemented to substantially perform the particular functions discussed. Moreover, the modules may be combined together within the disclosure, or divided into additional modules based on the particular function desired. Thus, the disclosure should not be construed to limit the present invention, but merely be understood to illustrate one example implementation thereof.

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a "control system" on data stored on one or more computer-readable storage devices or received from other sources.

The term "control system" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

While various embodiments of the present invention have been described above, it should be understood that they have been presented by way of example only, and not limitation. Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above-described embodiments. Rather, the scope of the invention should be defined in accordance with the following claims and their equivalents.

The invention claimed is:

1. A system for answering database queries, comprising:
a query input for accepting a query of a first type of query to a database;
a decision tree including a plurality of leaf nodes, each leaf node corresponding to a partition of queries from the database;
a plurality of neural networks executed by a processor coupled to the query input, each of the neural networks trained to output a response to the first type of query corresponding to one of the partitions, wherein the training is based on a training set of queries in the partition and correct answers to the queries from the database, wherein a corresponding partition is determined by the decision tree for the query, wherein each neural network includes a plurality of layers, including a first layer and a last layer including a number of units corresponding to the output dimensionality of the first query type, and wherein batch normalization is used for all the layers, sine activation is used for the first layer and swish activation is used for the first layer and a set of intervening layers between the first layer and last layer; and
an output that outputs the output of a corresponding neural network to the determined partition in response to the query.

2. The system of claim 1, wherein each of the plurality of neural networks is trained by minimizing the average approximation error.

3. The system of claim 1, wherein each of the plurality of neural networks are retrained to respond to queries corresponding to a second query type different from the first query type.

4. The system of claim 1, wherein the first query type includes one of a nearest neighbor, a distance to nearest neighbor query and a range aggregate query.

5. The system of claim 1, wherein the partitions include a merged partition that combines two initial partitions, wherein the merged partition corresponds to one of the plurality of neural networks.

6. The system of claim 1, further comprising an evaluation module executed by the processor operable to evaluate the first type of query and selecting either the database or the corresponding neural network of the plurality of neural networks to answer the query.

7. The system of claim 1, wherein the data in the database is multi-dimensional data.

8. A method of querying a database, comprising:
receiving a query of a first query type;
matching the query to a partition of a plurality of partitions of queries of a database, the plurality of partitions organized in a decision tree;
selecting a neural network corresponding to the matched partition from a plurality of neural networks each having an identical structure, wherein each neural network includes a plurality of layers, including a first layer and a last layer including a number of units corresponding to the output dimensionality of the first query type, and wherein batch normalization is used for all the layers, sine activation is used for the first layer and swish activation is used for the first layer and a set of intervening layers between the first layer and last layer, wherein the selected neural network is trained from a dataset of queries and answers from the database; and
activating the selected neural network to output an answer to the query.

9. The method of claim 8, wherein each of the plurality of neural networks is trained by minimizing the average approximation error.

10. The method of claim 8, further comprising retraining the plurality of neural networks to respond to queries corresponding to a second query type different from the first query type.

11. The method of claim 8, wherein the first query type includes one of a nearest neighbor, a distance to nearest neighbor query and a range aggregate query.

12. The method of claim 8, wherein the partitions include a merged partition that combines two initial partitions, wherein the merged partition corresponds to one of the plurality of neural networks.

13. The method of claim 8, further comprising evaluating the query and selecting either the database or the corresponding neural network of the plurality of neural networks to answer the query.

14. A non-transitory computer readable medium having stored thereon software instructions that, when executed by a processor, cause the processor to:

receive a query of a first query type;

match the query to a partition of a plurality of partitions of queries of the database, the plurality of partitions organized in a decision tree;

select a neural network corresponding to the matched partition from a plurality of neural networks each having an identical structure, wherein each neural network includes a plurality of layers, including a first layer and a last layer including a number of units corresponding to the output dimensionality of the first query type, and wherein batch normalization is used for all the layers, sine activation is used for the first layer and swish activation is used for the first layer and a set of intervening layers between the first layer and last layer, wherein the selected neural network is trained from a dataset of queries and answers from the database; and activate the selected neural network to output an answer to the query.

\*　　\*　　\*　　\*　　\*